(12) United States Patent
Grosz et al.

(10) Patent No.: US 9,507,506 B2
(45) Date of Patent: Nov. 29, 2016

(54) AUTOMATIC TARGET BOX IN METHODS AND SYSTEMS FOR EDITING CONTENT-RICH LAYOUTS IN MEDIA-BASED PROJECTS

(71) Applicant: Interactive Memories, Inc., Palo Alto, CA (US)

(72) Inventors: Aryk Erwin Grosz, Henderson, NV (US); Yedidya Medina, San Francisco, CA (US); Max Di Capua, San Mateo, CA (US); Daniel Andrew Laffoon, Mountain View, CA (US)

(73) Assignee: Interactive Memories, Inc., Palo Alto, CA (US)

( * ) Notice: Subject to any disclaimer, the term of this patent is extended or adjusted under 35 U.S.C. 154(b) by 0 days.

(21) Appl. No.: 14/941,526

(22) Filed: Nov. 13, 2015

(65) Prior Publication Data

US 2016/0139761 A1  May 19, 2016

Related U.S. Application Data

(63) Continuation of application No. 14/678,817, filed on Apr. 3, 2015, now Pat. No. 9,219,830.

(60) Provisional application No. 62/079,424, filed on Nov. 13, 2014.

(51) Int. Cl.
*G03F 3/10* (2006.01)
*G06F 3/0486* (2013.01)
(Continued)

(52) U.S. Cl.
CPC ............ *G06F 3/0486* (2013.01); *G06F 3/125* (2013.01); *G06F 3/1208* (2013.01); *G06F 3/1243* (2013.01); *G06F 3/1256* (2013.01); *G06F 3/1268* (2013.01); *H04N 1/0044* (2013.01); *H04N 1/00145* (2013.01); *H04N 1/00164* (2013.01); *H04N 1/00167* (2013.01); *H04N 1/00177* (2013.01); *H04N 1/00188* (2013.01); *H04N 1/00196* (2013.01)

(58) Field of Classification Search
None
See application file for complete search history.

(56) References Cited

U.S. PATENT DOCUMENTS

| | | |
|---|---|---|
| 4,888,648 A | 12/1989 | Hirose et al. |
| 6,097,389 A | 8/2000 | Morris et al. |
| 6,147,768 A | 11/2000 | Norris |

(Continued)

OTHER PUBLICATIONS

Picaboo, "Picaboo photo uploading," Picaboo website, available at http://picaboo.com/ Accessed on Mar. 4, 2014.

(Continued)

*Primary Examiner* — Miya J Cato
(74) *Attorney, Agent, or Firm* — American Patent Agency PC; Daniar Hussain; Xiaomeng Shi

(57) ABSTRACT

Methods and systems for editing media rich photo projects are disclosed. In one embodiment, the present invention uses drag and drop features to add a photo to a spread, to remove a photo from the spread, and/or to create a new spread. In another embodiment, drop areas are utilized to facilitate addition and removal of photos at an editor. In another embodiment, drop targets are determined by an animated highlight of a drop target, a time delay allowing a user to wait until a drop target is auto-selected by the pre-set rules of the editor, and pre-set rules of a drop target as determined by the location of a drop. Furthermore, drop targets are determined by location coordinates of a photo over the spread before being dropped, proximity of a dragged photo with a photo slot, or a pre-calculated photo slot based on pre-set rules.

20 Claims, 61 Drawing Sheets

(51) Int. Cl.
*G06F 3/12* (2006.01)
*H04N 1/00* (2006.01)

(56) References Cited

U.S. PATENT DOCUMENTS

| | | |
|---|---|---|
| 6,389,181 B2 | 5/2002 | Shaffer et al. |
| 6,583,799 B1 | 6/2003 | Manolis et al. |
| 6,931,147 B2 | 8/2005 | Colmenarez et al. |
| 7,117,519 B1 | 10/2006 | Anderson et al. |
| 7,146,575 B2 | 12/2006 | Manolis et al. |
| 7,383,282 B2 | 6/2008 | Whitehead et al. |
| 7,474,801 B2 | 1/2009 | Teo et al. |
| 7,479,949 B2 | 1/2009 | Jobs et al. |
| 8,013,874 B2 | 9/2011 | Reid et al. |
| 8,024,658 B1 | 9/2011 | Fagans et al. |
| 8,326,945 B2 | 12/2012 | Grosz et al. |
| 8,345,934 B2 | 1/2013 | Obrador et al. |
| 8,358,846 B2 | 1/2013 | Gibbs |
| 8,363,888 B2 | 1/2013 | Chen et al. |
| 8,365,084 B1 | 1/2013 | Lin et al. |
| 8,396,326 B2 | 3/2013 | Chen et al. |
| 8,487,964 B2 | 7/2013 | Reid et al. |
| 8,503,857 B2 | 8/2013 | Sikorski |
| 8,504,932 B2 | 8/2013 | Quek et al. |
| 8,510,669 B2 * | 8/2013 | Schiller ............... G06F 3/0486 715/769 |
| 8,520,979 B2 | 8/2013 | Conwell |
| 8,554,020 B2 | 10/2013 | Berger et al. |
| 8,555,154 B2 | 10/2013 | Chen et al. |
| 8,571,331 B2 | 10/2013 | Cifarelli |
| 8,611,677 B2 | 12/2013 | Das et al. |
| 8,655,105 B2 | 2/2014 | Chen et al. |
| 8,660,366 B2 | 2/2014 | Chen et al. |
| 9,219,830 B1 * | 12/2015 | Ciorba ............... H04N 1/00177 |
| 2005/0055635 A1 | 3/2005 | Bargeron et al. |
| 2005/0105116 A1 | 5/2005 | Kobashi |
| 2005/0129334 A1 | 6/2005 | Wilder et al. |
| 2006/0048069 A1 * | 3/2006 | Igeta ..................... G06F 3/0486 715/769 |
| 2008/0155422 A1 | 6/2008 | Manico et al. |
| 2008/0180457 A1 * | 7/2008 | Yamazaki ............ G06F 3/0482 345/619 |
| 2009/0031235 A1 | 1/2009 | Martin et al. |
| 2009/0235563 A1 | 9/2009 | Lehrman |
| 2009/0249239 A1 | 10/2009 | Eilers |
| 2010/0199227 A1 * | 8/2010 | Xiao ..................... G06F 3/0481 715/863 |
| 2010/0229085 A1 | 9/2010 | Nelson et al. |
| 2010/0241939 A1 | 9/2010 | Rozen-Atzmon |
| 2010/0241945 A1 | 9/2010 | Chen et al. |
| 2011/0012929 A1 | 1/2011 | Grosz et al. |
| 2011/0029601 A1 | 2/2011 | Grosz et al. |
| 2011/0035759 A1 | 2/2011 | Williams et al. |
| 2011/0167353 A1 | 7/2011 | Grosz et al. |
| 2011/0283173 A1 | 11/2011 | Babcock et al. |
| 2012/0050788 A1 * | 3/2012 | Bachman ................. G06T 1/00 358/1.15 |
| 2012/0066573 A1 | 3/2012 | Berger et al. |
| 2012/0110439 A1 * | 5/2012 | Rosner ................... G06F 17/21 715/246 |
| 2012/0151332 A1 * | 6/2012 | Kaneko ................ G06F 3/1208 715/253 |
| 2012/0294514 A1 | 11/2012 | Saunders |
| 2013/0004073 A1 | 1/2013 | Yamaji et al. |
| 2013/0139055 A1 | 5/2013 | Chen et al. |
| 2013/0177243 A1 | 7/2013 | Grosz et al. |
| 2013/0301934 A1 | 11/2013 | Cok |
| 2013/0322707 A1 | 12/2013 | Phillips et al. |
| 2014/0096015 A1 | 4/2014 | Grosz et al. |
| 2014/0205397 A1 | 7/2014 | Giamela |

OTHER PUBLICATIONS

Shutterfly, "Shutterfly photo uploading," Shutterfly website, available at http://www.shutterfly.com/ Accessed on Mar. 4, 2014.
Snapfish, "Snapfish photo uploading," Snapfish website, available at http://www.snapfish.com/ Accessed on Mar. 4, 2014.
Cluster, "Cluster photo album," Cluster website, available at https://cluster.co/ Accessed on Feb. 3, 2014.
Lulu, "Lulu photo books," Lulu website, available at http://www.lulu.com/ Accessed on Feb. 3, 2014.
Artscow, "Artscow photo album," Artscow website, available at http://www.artscow.com/ Accessed on Feb. 3, 2014.
CVS Photocenter, "CVS Photocenter photobook," CVS Photocenter website, available at http://www.cvsphoto.com/ Accessed on Feb. 3, 2014.
Digilabs, "Digilabs photo album," Digilabs website, available at http://www.digilabspro.com/ Accessed on Feb. 3, 2014.
Blurb, "Blurb photo album," Blurb website, available at http://www.blurb.com/ Accessed on Feb. 3, 2014.
Mycanvas, "MyCanvas photo album," MyCanvas website, available at http://www.mycanvas.com/ Accessed on Feb. 3, 2014.
MyPublisher, "MyPublisher photo album," MyPublisher website, available at http://www.mypublisher.com/ Accessed on Feb. 3, 2014.
Keepsy, "Keepsy photo album," Keepsy website, available at http://www.keepsy.com/ Accessed on Feb. 3, 2014.
Winkflash, "Winkflash photo album," Winkflash website, available at http://www.winkflash.com/ Accessed on Feb. 3, 2014.
Yogile, "Yogile photo album," Yogile website, available at http://www.yogile.com/ Accessed on Feb. 3, 2014.
Facebook's Shared Photo Album, "Facebook's shared photo album," Facebook's shared photo album website, available at https://www.facebook.com/help/151724461692727 Accessed on Feb. 3, 2014.
Jacobs, et al., "Multiresolution Image Querying," Proceedings of the 22nd Annual Conference on Computer Graphics and Interactive Techniques, SIGGRAPH 1995, pp. 277-286, U.S.
Athentec Imaging Inc., "Perfectly Clear by Athentech Imaging," available at http://www.athentech.com/ Accessed on Mar. 10, 2014.
Cheng, et al. "Salient Object Detection and Segmentation," IEEE Transactions on Pattern, 2011, U.S.
Forthis Production. "Update: Creating Photo Books in iOS," Review of Mosaic Photo Books, p. 8, retrieved from [http://forthisproductions.com]. Jun. 3, 2013.
Wright, Natalie. "Mixbook Photo Book," available at [www.organizedmom.net]. Jan. 2012.
Parez, Sarah. "Mixbook Reveals Mosaic: An Easy-To-Use App for Making Photo Books From Your iPhone," available at [www.techcrunch.com]. Oct. 22, 2012.
Parez, Sarah. "Now At Mixbook, Former Yobongo Team Reveals Mosaic, A Fast Way to Build Photobooks From Your iPhone," available at [www.techcrunch.com]. Sep. 7, 2012.
Parker, Jason. "Mosaic Makes Photo Books Easy," available at [http://cnet.com]. Oct. 22, 2012.
Laffoon, Andrew. "Tutorial: Moving pages together as spreads", blog entry posted Nov. 16, 2008, retrieved from [http://blog.mixbook.com].
Winter, Johnny. "How to Create a Custom Photo Book Using iPhone", blog entry posted Dec. 24, 2013 retrieved from [http://computers.tutsplus.com/tutorials].
Dove, Jackie. "Got 15 Minutes? Create a printed photo book with new Montage Web app", blog entry posted Jul. 16, 2014 retrieved from [http://thenextweb.com].

* cited by examiner

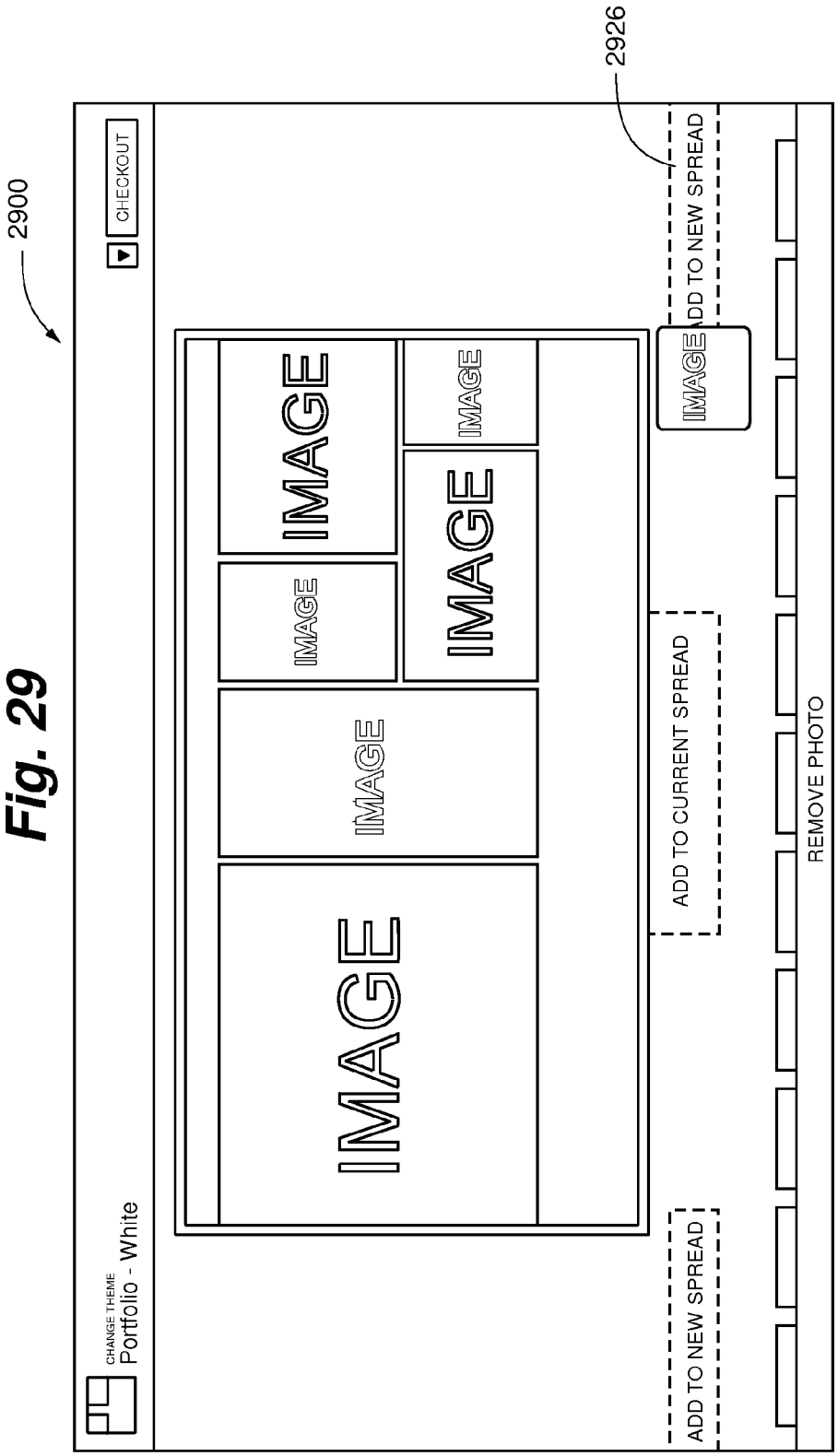

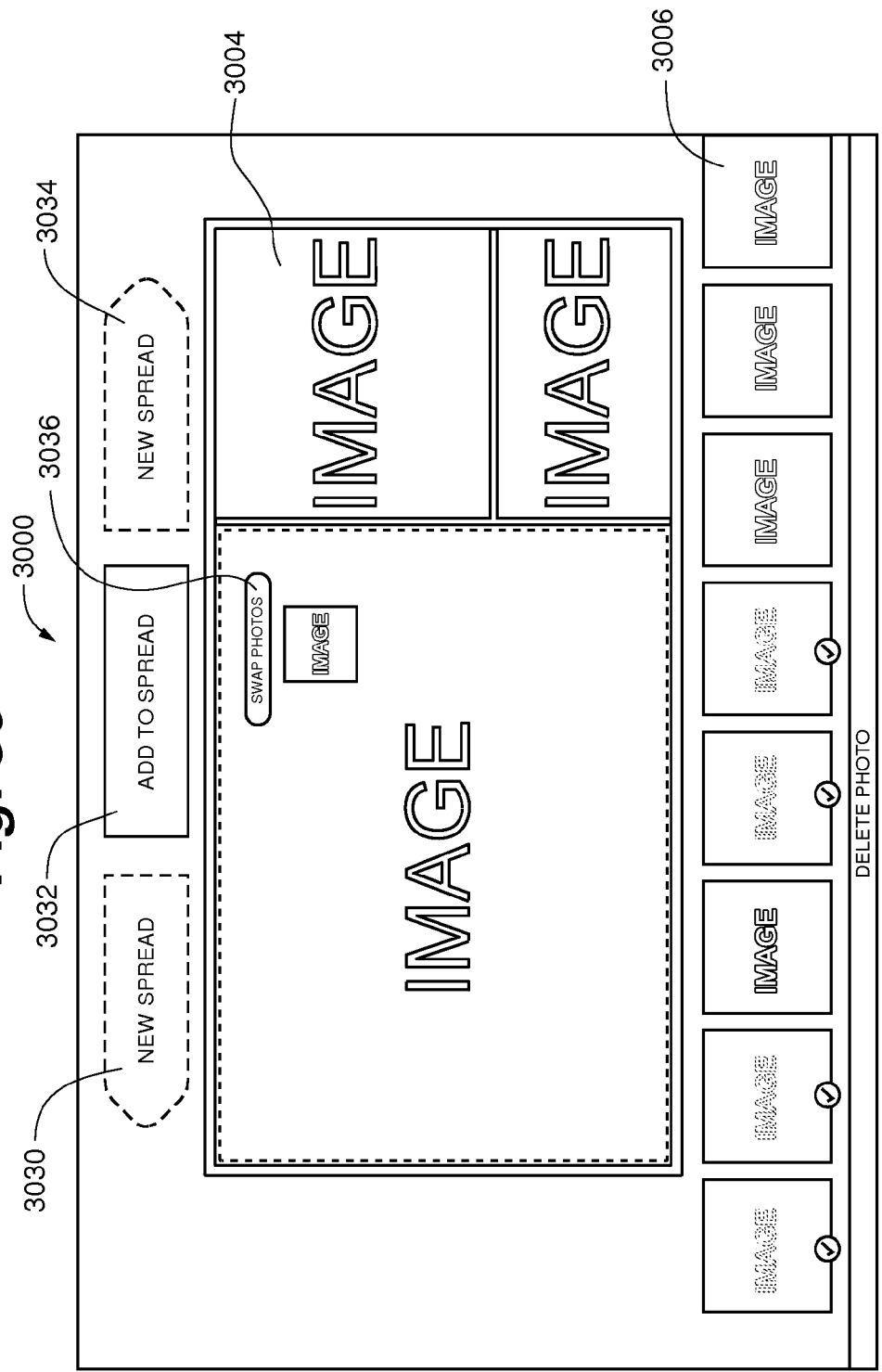

AUTOMATIC TARGET BOX IN METHODS AND SYSTEMS FOR EDITING CONTENT-RICH LAYOUTS IN MEDIA-BASED PROJECTS

CROSS-REFERENCE TO RELATED APPLICATIONS

The present application is a non-provisional of, and claims priority to, provisional application U.S. Ser. No. 62/079,424 filed on Nov. 13, 2014, entitled "MIXBOOK PATENTS 3.1." The present application is also a Continuation-In-Part (CIP) of, and claims the benefit of, co-pending non-provisional application U.S. Ser. No. 14/678,817, filed on Apr. 3, 2015, entitled "METHODS AND SYSTEMS FOR PAGE AND SPREAD ARRANGEMENT IN PHOTO-BASED PROJECTS." The entireties of both applications cited herein are hereby incorporated by reference herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention broadly relate to systems and methods for editing media-based projects. More particularly, embodiments of the present invention relate to editing of content (multimedia files, photos, text, stylistic parameters, and so on) in creating a media-based project via an electronic application of a user device.

BACKGROUND OF THE INVENTION

The statements in this section may serve as a background to help understand the invention, but may not constitute prior art.

In the field of media-based project creation, there are many applications that assist users in creating media-based projects. Examples include applications to make photobooks, applications to design manufacturing parts, three-dimensional computer aided design software (such as AutoCAD), and a whole variety of other software applications and packages that have multiple pages, views, or complex navigation and editing patterns during project editing.

A common drawback with conventional media-based project creation software is the difficulty in finding a best fitting photo slot for a target photo when there are many photos of different sizes on a spread. Conventionally, a user needs to manipulate multiple views and navigate in multiple locations in the software, in finding a best fitting photo slot. Users must often repetitively perform trial and error actions in finding a best fitting photo slot, wasting time and deteriorating user experience in the process. Furthermore, if a layout of a media-based project is full of photos, it is often hard or confusing for users to add another photo to an existing spread, or to create a new spread.

It would be an advancement in the art in such media-based project creation applications to be able to easily, quickly, and intuitively operate on a spread comprising a plurality of photos.

Therefore, there is a long-felt and unsolved need to make it easy and efficient for a user to easily and conveniently find a best fitting location of a target photo on a spread.

It is against this background that various embodiments of the present invention were developed.

BRIEF SUMMARY OF THE INVENTION

In one aspect, the present invention is a method of creating and editing a media-rich project on a user device having a graphical user interface (GUI) allowing a user to add photos to a spread of the media-rich project. The method comprises firstly displaying to the user on an editor of the user device a photo arrangement of at least one first photo on the spread of the media-rich project, where the photo arrangement embodies a first layout of the spread, and where the photo arrangement comprises a photo count of one or more existing photos. Secondly, responsive to the user dragging a second photo from a photo tray towards the spread, causing the editor to graphically display a first drop area that stands out from a rest of the GUI where the second photo can be dropped and that indicates a location where the second photo can be dropped to be added to the spread, the location being distinct from locations of any existing photos in the GUI; and when the second photo is hovered over the first drop area, the first drop area stands out from the rest of the GUI and is graphically emphasized. And lastly, responsive to the user dropping the second photo on the first drop area, causing the spread to receive the second photo on the editor and automatically adding the second photo to the spread to increase the photo count on the spread by one; and automatically re-arranging the second photo on the spread to produce a second layout of the spread based on one or more pre-set rules.

In one aspect, the present invention is a method of creating a printable media-rich photo product using a photo upload on a user-device via a telecommunications network, the method comprising, displaying to a user on an editor of said user device a use case specific photo arrangement of at least one photo on a spread, wherein said use case specific photo arrangement embodies a first layout and a first design on said spread, wherein said use case specific photo arrangement comprises photo count of at least one; dragging a second photo from a photo tray, wherein the step of dragging causes said editor to graphically display a first drop area where said second photo can be dropped, wherein when said second photo is hovered over said first drop area, said first drop area graphically expands; dropping said second photo on to said first drop area, wherein the step of dropping said second photo causes said spread to receive said second photo, thereby increasing a photo count on said spread; and re-arranging automatically said second photo on said spread to produce a second layout and a second design of said spread, wherein said step of re-arranging is based on pre-set rules. In one embodiment, printing said photo product at a print-order of said user is later performed, wherein said photo product is deliverable to said user.

In some embodiments, the method further comprises, dragging a third photo from said photo tray and dropping said third photo onto said second photo, causing a replacement of said second photo by said third photo.

Furthermore in yet other embodiments, the method comprises, configuring a drop target of a fourth photo on said spread, wherein said fourth photo is dragged, wherein said drop target is configured with respect to the location of said fourth photo from which said fourth photo is dropped, wherein said drop target is a pre-designated photo slot on said spread or undesignated photo slot on said spread, wherein said location of said fourth photo before dropping is anywhere on the spread; and dragging said fourth photo and dropping said fourth photo onto said spread, wherein said drop target is determined by (a) an animated highlight of said drop target, (b) a time delay allowing said user to wait until said drop target is auto-selected by said pre-set rules of said editor, and/or (c) pre-set rules of drop target as determined by the location of a drop.

In another aspect, the present invention is a non-transitory, computer-readable, physical storage medium storing executable instructions, which when executed by a hardware processor, causes the processor to perform a process of creating a media rich product by using drop areas and drop targets for photos, the instructions causing the processor to perform the steps of creating a photo product as taught in the preceding paragraphs.

In another aspect, the present invention is a system for creating a media rich project by using drop areas and drop targets for photos, the system comprising a user device having a processor, a display, and a first memory; a server comprising a second memory and a data repository; a communications link between said user device and said server; and a plurality of computer codes embodied on said memory of said server and said user-device, said plurality of computer codes which when executed causes said system to execute a process comprising the aforementioned steps.

Other aspects and embodiments of the present invention will become apparent from the detailed description and the views of the several drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 1R-1 is a diagram showing a splash-screen of uploading photos for a photobook creation in a mobile device, according to one embodiment of the invention.

FIG. 1R-2 is a flow diagram showing a process of photobook creation in a mobile device, according to one embodiment of the invention.

FIG. 1R-3 is a diagram showing pages and spreads of a photobook in a mobile device, according to one embodiment of the invention.

FIG. 1R-4 is a diagram showing dragging of a photo in a mobile device, according to one embodiment of the invention.

FIG. 1R-5 is a diagram showing a photo before dragging in a mobile device, according to one embodiment of the invention.

FIG. 1R-6 is a diagram showing a photo after dragging but before dropping, according to one embodiment of the invention.

FIG. 1R-7 is a diagram showing a photo after being dropped in a mobile device with pages re-shuffled, according to one embodiment of the invention.

FIG. 1R-8 is a diagram showing a virtual photobook in a mobile device, according to one embodiment of the invention.

FIG. 1R-9 is a diagram showing an opened cover of a photobook in a mobile device, according to one embodiment of the invention.

FIG. 1R-10 is a diagram showing a virtual photobook with flappable pages and spreads in a mobile device, according to one embodiment of the invention.

FIG. 3 is a flowchart showing an automatic insertion of content into a design, according to an embodiment of the present invention.

FIG. 4 is a flowchart showing a first automatic and then a second manual insertion of content into a design, according to an embodiment of the present invention.

FIG. 5 is a flowchart showing a simultaneous automatic and manual insertion of contents into a design, according to an embodiment of the present invention.

FIG. 7 is an exemplary screenshot of an editing interface displaying a photo spread across multiple pages (front cover, back cover, and spine), according to an embodiment of the present invention.

FIG. 8 is a block diagram illustrating an asset recommendation system, according to an embodiment of the present invention.

FIG. 9 is an architectural diagram illustrating a printing network, according to an embodiment of the present invention.

FIG. 10 is a diagram showing a printable photobook with a cover in a virtually finished form, according to one embodiment of the invention.

FIG. 29 is a diagram showing a user dragging of a photo to a drop zone to create a new spread, according to one embodiment of the invention.

FIG. 30 is a diagram showing multiple drop areas, according to yet another embodiment of the invention.

DETAILED DESCRIPTION OF THE INVENTION

Definitions

Figure 1A:
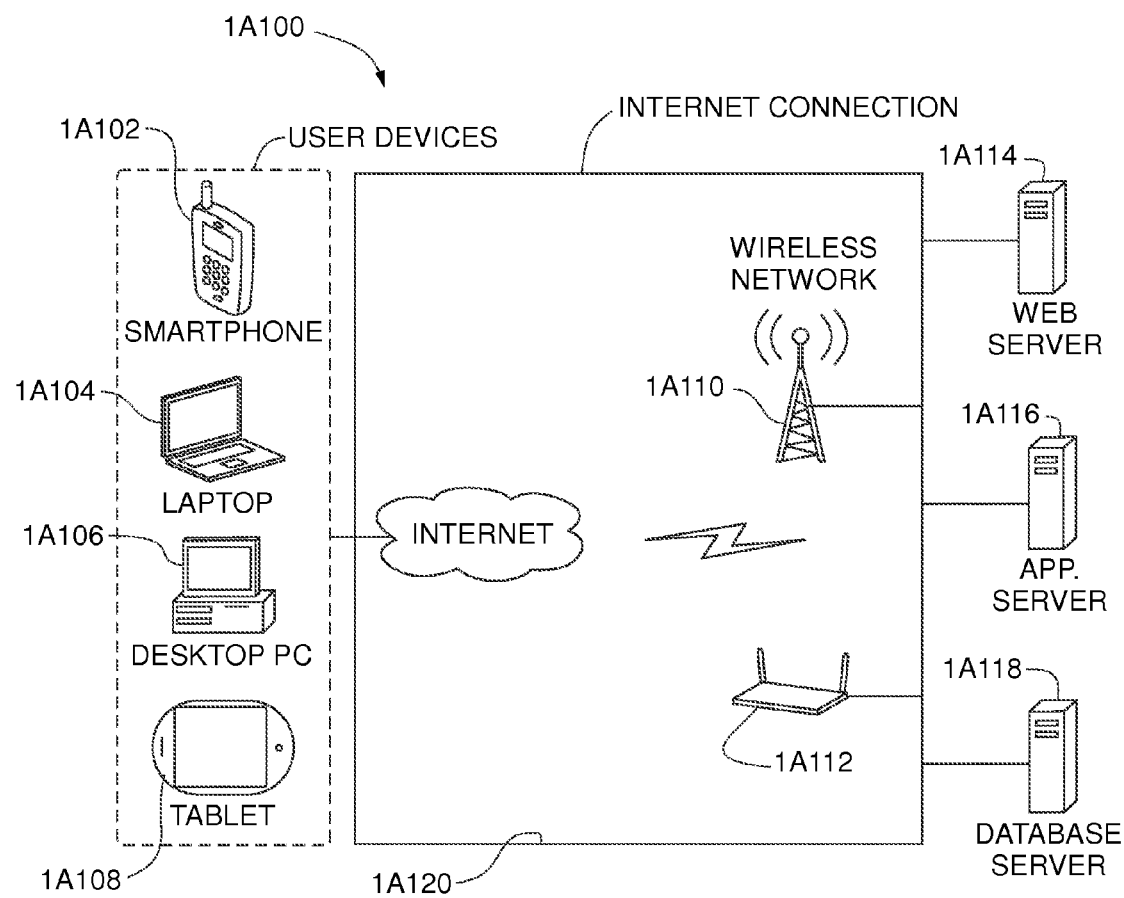
FIG. 1A is a network configuration diagram in which the present invention may be practiced.

The following terms used throughout this specification, having the below illustrative definitions, are provided for illustrative purposes only, and are not intended to be limiting. The terms may be used in the form of nouns, verbs or adjectives, within the scope of the definitions.

"Project", "photo-project", "photo-based project", "media-rich project," "media-based project," or "media-project" is a computer-representation of a multimedia based project or product that is worked on either collaboratively or singularly by one or more users, that is either printed and shipped physically, or delivered electronically to the one or more users. Examples include applications to make photobooks, applications to design manufacturing parts, three-dimensional computer aided design software (such as AutoCAD), and a whole variety of other software applications and packages that have multiple pages, views, or complex navigation patterns during editing, and that include complex media-rich data.

"View" is a current display or location of a user in a complex media-based project, in which the user might navigate through multiple views of the project. Examples of views include pages, spreads, and so on, in a photobook editing application; different angles being viewed of a manufacturing part in 3D computer-aided design software; or any other application or software package in which multiple displays of a project might be navigated by a user during editing.

"Reverse" or "undo" is an operation performed on a media-based project to revert to a previous state of an edited project, after it has been edited by the user. The reverse or undo operation typically reverses the last operation performed by the user, but in some embodiment, operations may also be grouped intelligently and undone as a group.

"Grid preview" is a framework of virtual spaced bars (rectangular or square) that are parallel or across each other. In a grid preview of a photo-project, all pages or spreads of the photo-project are displayed along a virtual grid on a display screen, wherein all pages or spreads are in miniature forms in a single display, and such miniature forms are individually editable via input devices.

"Space constrained device" is a device that has limited space or limited means to offer user inputs into such devices. Limited space or limited means include, such as, a miniature soft on-screen keyboard, a touch screen of a smart phone, a stylus of a touch screen device, and the like.

"Virtual manifestation" refers to a virtually displayed but appearing on screen like a real photobook that will eventually be produced by printing and binding, after an order to print is received.

"Communications network" is a collection of terminal nodes, links and any intermediate nodes that are connected so as to enable telecommunication between the terminals. The Internet is a widely used communications network.

"Physical medium" and "storage medium" refer to an article of manufacture in which computer program code may be stored, said program code later to be executed by a computer having at least one processor, such as a server.

"Data repository" refers to a central place, such as a database, where data is stored and maintained. It is also a logical (and sometimes physical) partitioning of data where multiple databases which apply to specific applications or sets of applications reside.

"Interface", "user interface", or "graphical user interface (GUI)" is a user interface (UI) in a display of a computer screen, where a user of a computer system can provide input. A touch interface is an interface where a user can provide an input by using a finger or stylus.

"Server" is a computer comprising a processor and a memory that is used by the system to provide the software program code implementing the invention to multiple client devices over a communications network.

"User-device", "client device", "mobile device," "computing device", or "user-operated computer" is a computer with a display, input options, a processor and a memory, often in the form of a laptop, desktop, tablet, smartphone, or the like, that is used by users of the system to access the services of the present invention.

"Client-server connection", "telecommunications link", or "client-server environment" is a connection between a sever and a user-device via a communications network.

"Image", "photo," and "photograph" shall be used interchangeably to refer to a digital image stored in memory.

"Multimedia content" and "content" refers to images and/or text, as well as other content in a project.

"Visual content", "visual information", and "image information" is 2-D information presented in images after it has been processed and analyzed through computer algorithms.

"Automatic image information" is visual information in the images extracted by the system using automated photo analysis carried out by a processor.

"Observed image information" is visual information in the images extracted by the system through observing user interactions at the GUI.

"Media analysis," "photo analysis," and "image analysis" are all computer-based methods of extracting visual information from media files. These terms are used interchangeably to refer to an automated software and/or hardware process by which important features or salient features of the media files are identified, separated from background, extracted, and analyzed. Photo analysis in particular extracts useful information from digital images by means of digital image processing. In some embodiments, photo analysis comprises "feature extraction," in which specific features are extracted. Examples of features include, but are not limited to, scenery, faces, wedding cakes, people present, etc.

"Computer vision" is a field that includes methods for acquiring, processing, analyzing, and understanding images and high-dimensional data in order to produce numerical or symbolic visual information.

"Metadata" or "meta-data" is a set of data that describes and gives information about images. Meta-data also comprises data embedded in a digital image, which is known as EXIF (Exchangeable Image File Format) data.

"Automatic customization actions" refer to any automatic editorial work performed automatically by the system to customize a design of a photo project. Examples of customization actions include, but is not limited to, matching images automatically to a use case specific theme, grouping similar images, grouping images having identical faces, grouping images having identical objects, removing undesirable images, cropping images to highlight relevant portions of said images, applying correction function on the plurality of images, and so on.

"Printed project" and "printed product" refer to a project that is physically printed on a paper by a printing machine. Examples of printed products include, but not limited to, a photobook, a photocalendar, a photocard, and the like.

"Use case" refers to a use, context, or events related to a use of the printed project. Use cases may comprise a wedding, a night out, an event with friends, a baby, a year in review, a trip, a water-related event, a beach trip, a lake trip, a pool trip, a snow-related event, a ski trip, a road trip, and the like. A use case is any scenario in which the user will be ultimately providing images from.

"User analysis" comprises behavioral observation of the user's inputs, interests, and choices, and any data relevant to the interest of the user. Such data can be obtained by the user's own inputs or by third party applications comprising social networking sites. User analysis is performed on the expected user of the printed product. User analysis can be manual inputs as well as automatic extractions.

"User data" refers to data obtained through user analysis. The user's interactions with the system and/or behavioral observations of the user by the system via user inputs create such user data.

"Social media platform" refers to social or professional networking sites. Such sites include, but are not limited to, FACEBOOK, TWITTER, LINKEDIN, and the like.

"Canvas" is a virtual page of a project as displayed on a GUI, before being printed into a printed product. A canvas has a particular design for a page or pages of a project, which is selected by selecting a design from a designset (and automatically inheriting a layout from a layoutset, since every designset is tied to a layoutset). The canvas includes the design along with the content inserted by the user into the design.

"Layout" specifies a number of photo and/or text slots and their positions on a canvas. No style is applied on a layout.

"Layoutset" is a collection or set of layouts. Layouts are distinguished by their types. The types comprise magazine layouts, signature layouts, and the like.

"Style", "styling", or "style and formatting information" adds design customizations over a layout, in which the customizations comprise frames, stickers, backgrounds, borders, and their appearances and positions, including fonts, colors, etc.

"Design" is a particular style on top of a layout.

"Designset" is a collection or set of designs. Designs are grouped by the layoutsets being used. One layoutset can spur off many designsets. A design from a given designset can choose its layout from the associated layoutset that is also related to that designset. That is known as a "design-layout relationship."

"Theme" is a collection or set of designsets.

"Spread" is a canvas that extends to two opposite pages of an album or book. Two opposing pages can have one photo stretching to two pages, or a plurality of photos arranged across the two pages, based on a design choice made by a user. The outer cover of a book may have an additional part, called spine, which bridges a front cover and a back cover. Therefore, a spread on the outer cover of the book may stretch to three elements, including the front cover, the spine, and the back cover. In some other parts of the specification, the word "spread" may also be used to mean simply "extend to" or "distribute across." The usage of the word "spread" that is intended will be clearly evident from the context of the use of the word "spread" within the context of the paragraph or sentence in which it is being used.

"Page" in the context of a photobook refers to a page on which a user designs a photo page for a photobook creation. In a book, when two opposing pages flip open, in the same manner of a butterfly opening up wings, the two opposing pages may be called a "spread", as defined above. In a two page design, in the form of a butterfly-like inside-wings, one photo can stretch to two opposing pages. Alternatively, in one spread, each page may comprise a plurality of photos. An inside page of a book may be different from an outside page, or cover, of the same book. An outside page, or cover, may often be harder, being a hard cover. An outside page may include (1) a front cover, (2) a back cover, and (3) a spine, between the front cover and the back cover. Hence, a full outside cover or outside spread of a photobook may have these three elements, which contrasts with an inside spread that consists of just two opposing pages.

"Photo slot" is a slot or location on a page of a canvas in which a target image or photo can be placed.

"Text slot" or "caption slot" is a slot or location on a page of a virtual canvas in which text or a caption can be inserted.

"Aesthetics" is a visual appearance of a design, designating the look and feel of the design.

"Saliency" refers to a most relevant and/or most important part of an image as determined by image analysis or user action analysis (user inputs).

"Face detection" is a specific type of image analysis that determines locations and sizes of human faces in images. The algorithms used detect faces from background (buildings, trees, bodies, and the like).

"Object detection" is a specific type of image analysis that detects instances of semantic objects of a certain class in digital images and videos.

"Timestamp" is a sequence of characters or encoded information identifying when a certain event occurred, usually providing date and time of day, sometimes accurate to a small fraction of a second.

"Image heuristics" refers to specific types of image analysis that are based on experience-based techniques for image analysis that give a solution that is not guaranteed to be optimal. Certain image issues for creating an optimal design are resolved in certain ways as defined in the specification. Such issues primarily are relevant in image processing and image editing, to finally produce a design. Since such solutions are not guaranteed to be optimal global solutions, they may be referred to as image heuristics in some embodiments.

"Image sequence" is a sequence of images in which the sequence is determined by timestamp, geo-location, landscape, or by some other ordering.

"Image score" is a relative importance of an image calculated mathematically to determine a best fitting image for an intended use.

"Rule" refers to any instruction provided by the methods and the systems of the present invention in the process of creating a project. A rule comprises image heuristics, computer programs or codes, and/or algorithms.

"Algorithm" is a set of instructions to be followed in calculations or image processing, especially by a computer. In a computer implemented method or system, the term algorithm may be used interchangeably with the terms "rules" or "instructions," to refer to a sequence of steps to be carried out by a computer processor following instructions encoded in memory.

"Buffer area" is an area around an object of interest in the photo. For example, if one takes a photo of an apple on a table, one wouldn't want the photo window to crop the apple exactly at the edge of the apple. One would want there to be "buffer area" around the apple so that it doesn't look crowded on the page. The size of the buffer area is an aesthetic choice of the user or designer.

"Focal box", "focal area," or "focal subsection" is defined on a layout or a design, and defines an area within a photo slot that is "visible" or "unobstructed." In other words, this is the area on the design where the photo can clearly be seen. If a photo slot were completely uncovered, then this focal box would simply be the dimension of the photo slot itself. The focal box can be represented with any shape, not just a rectangle, as long as it's a continuous shape. That is, a focal box is a box of any shape that is contained within the bounds of a photo slot, which a photo is fitted to. Most of the time, the focal box and the bounds of the photo slot are the same. However, when there is something covering parts of the photo slot (for example, a caption covering up a portion of a photo slot, a border, or any other obstruction to the photo slot), then the focal box is adjusted to be less than the actual photo slot, so that any inserted photo is automatically shifted away from the area that is covered.

"One embodiment" or "an embodiment" means that a particular feature, structure, or characteristic described in connection with the embodiment is included in at least one embodiment of the invention. The appearance of the phrases "in one embodiment" in various places in the specification is not necessarily all referring to the same embodiment, nor is a separate or alternative embodiment mutually exclusive of other embodiments. Various features are described which may be exhibited by some embodiments and not others.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematic, use case, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

In one aspect, the present invention is a method of creating a printable media-rich photo product using a photo upload on a user-device via a communications network, the method comprising, displaying to a user on an editor of said user device a use case specific photo arrangement of at least one photo on a spread, wherein said use case specific photo arrangement embodies a first layout and a first design on said spread, wherein said use case specific photo arrangement comprises a photo count of at least one; dragging a second photo from a photo tray, wherein the step of dragging causes said editor to graphically display a first drop area where said second photo can be dropped, wherein when said second photo is hovered over said first drop area, said first drop area graphically expands; dropping said second photo on to said first drop area, wherein the step of dropping said second photo causes said spread to receive said second photo, thereby increasing a photo count on said spread; and re-arranging automatically said second photo on said spread to produce a second layout and a second design of said spread, wherein said step of re-arranging is based on pre-set rules. In one embodiment, printing said photo product at a print-order of said user is later performed, wherein said photo product is deliverable to said user.

In one embodiment, the method further comprises, dragging a third photo from said photo tray and dropping said third photo onto said second photo, causing a replacement of said second photo by said third photo. Furthermore, the method comprises, configuring a drop target of a fourth photo on said spread, wherein said fourth photo is dragged, wherein said drop target is configured with respect to a location of said fourth photo from which said fourth photo is dropped, wherein said drop target is a pre-designated photo slot on said spread or undesignated photo slot on said spread, wherein said location of said fourth photo before dropping is anywhere on the spread; and dragging said fourth photo and dropping said fourth photo onto said spread, wherein said drop target is determined by (a) an animated highlight of said drop target, (b) a time delay allowing said user to wait until said drop target is auto-selected by said pre-set rules of said editor, and/or (c) pre-set rules of drop target as determined by the location of a drop.

In another aspect, the present invention is a non-transitory, computer-readable, physical storage medium storing executable instructions, which when executed by a hardware processor, causes the processor to perform a process of creating a media rich product by using drop areas and drop targets for photos, the instructions causing the processor to perform the steps of creating a photo product as taught in the preceding paragraphs.

In another aspect, the present invention is a system for creating a media rich project by using drop areas and drop targets for photos, the system comprising a user device having a processor, a display, and a first memory; a server comprising a second memory and a data repository; a communications link between said user device and said server; and a plurality of computer codes embodied on said memory of said user-device and said server, said plurality of computer codes which when executed causes said system to execute a process comprising the aforementioned steps.

Generally, to create a photobook online, a user needs to select photos from a user-device, such as a laptop or mobile device. Once the photos are selected, the photos are uploaded to a server. Upon image analysis of the uploaded photos by the server, the server provides essential tools to the user-device to build a photobook. A server operates within a client-server architecture of a computer system. A server comprises computer hardware and software to serve computational requests of other programs or clients. A client comprises a user-device, such as, a laptop, a smartphone, or a desktop PC. A server performs tasks on behalf of clients. A server often provides services via the Internet or other network.

In some embodiments, the media-based project comprises a physical manifestation of the project, resulting in a printed photobook, photo album, or other physical manifestation of the project. A photobook may be printed on a canvas or photo quality paper and bound together as a book. The media-based project also includes an online product comprising: audio, video, image and text—all packaged together as a single cohesive item or product for display or sharing through online means or electronic means, or for ordering a physical version of said online product.

A media-based project is not limited to a photobook. A photobook is a physical manifestation of the project in the form of a printed product. A physical manifestation may not be necessary in other embodiments, such as, an online video album, an online photo album, a virtual manufacturing product, a 3D visual product, and/or combinations thereof. In the description that follows, a photobook may be used as a representative of any type of media-based project.

MONTAGE, MOSAIC, and MIXBOOK are trademark names carrying embodiments of the present invention, and hence, the aforementioned trademark names may be collectively or interchangeably used in the specification and drawings to refer to the products/services offered by embodiments of the present invention. Because all of the products are created from media-files using a graphical manipulation system provided by the inventors as a network-based software application, the relative terms descriptive of the overall process and for the providing company are MONTAGE, MOSAIC, and/or MIXBOOK. The terms MONTAGE, MOSAIC, and/or MIXBOOK may be used in this specification to describe the overall media-based product creation and editing process of the invention, the website, mobile app, or web-app through which the process is made accessible to authorized users, and/or the service-providing company. With reference to the figures, embodiments of the present invention are now described in detail.

System Architecture

FIG. 1A shows a schematic diagram of a network configuration 1A100 for practicing embodiments of the present invention (this embodiment is sometimes known as "MONTAGE"). A user-device or devices may be connected to the Internet using a wireless network or wired network. A user-device may be a smartphone 1A102, laptop 1A104, desktop PC 1A106, or tablet 1A108. The wireless network comprises a cellular tower 1A110, or a wireless router 1A112. User-devices are connected to servers comprising a web server 1A114, an application server 1A116, and a database server 1A118. The servers are connected to a user-device through the wireless network, or the wired network 1A120. The wired network 1A120 or the wireless network may employ technologies and protocols comprising Ethernet technology, Local Area Network (LAN), Wide Area Network (WAN), and optical network, and the like.

Figures 1, 1B:
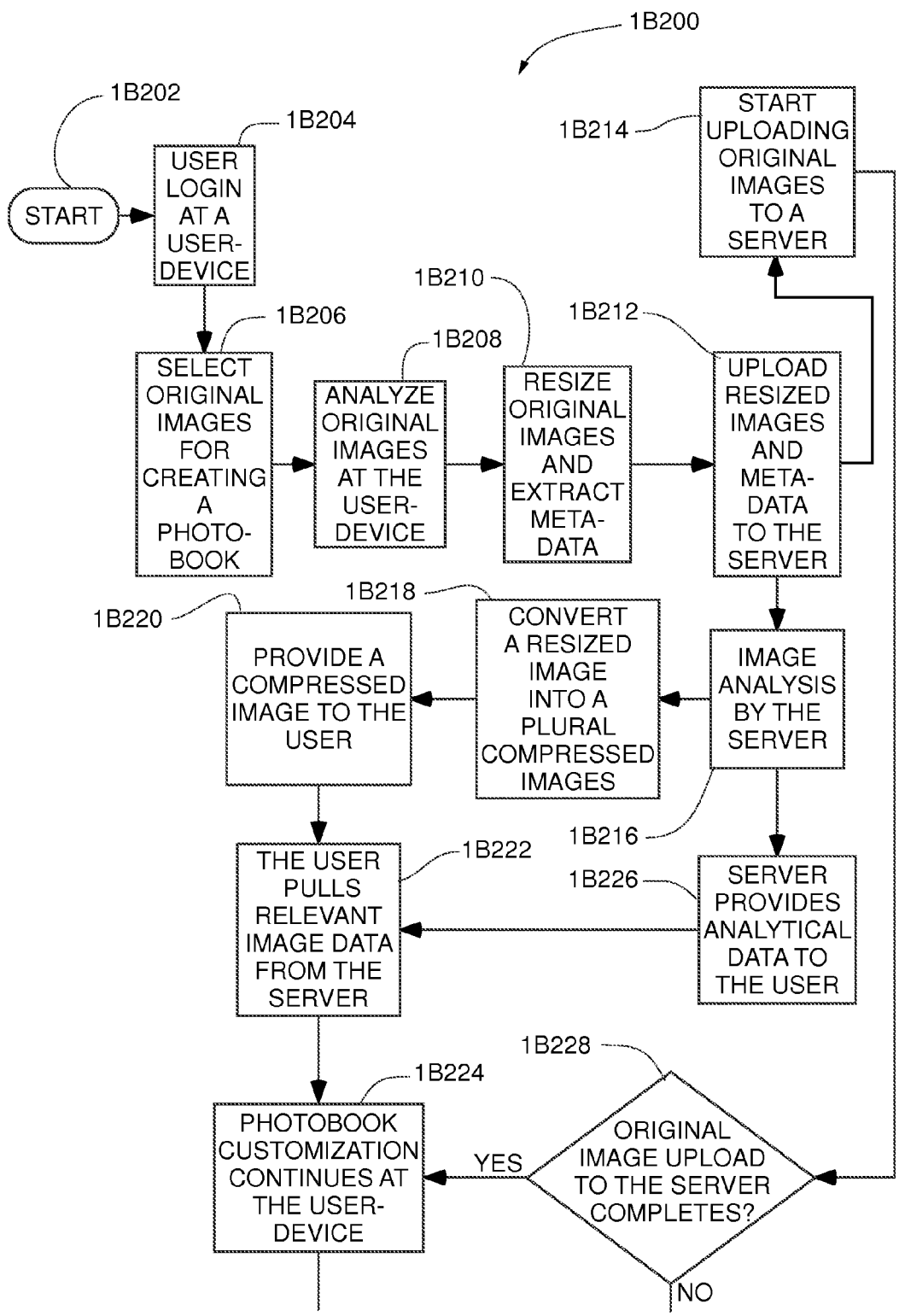
FIGS. 1B-1 and 1B-2 comprise a flow diagram showing a method of background uploading of media files, according to one embodiment of the invention.
Figures 1, 1B, 2:
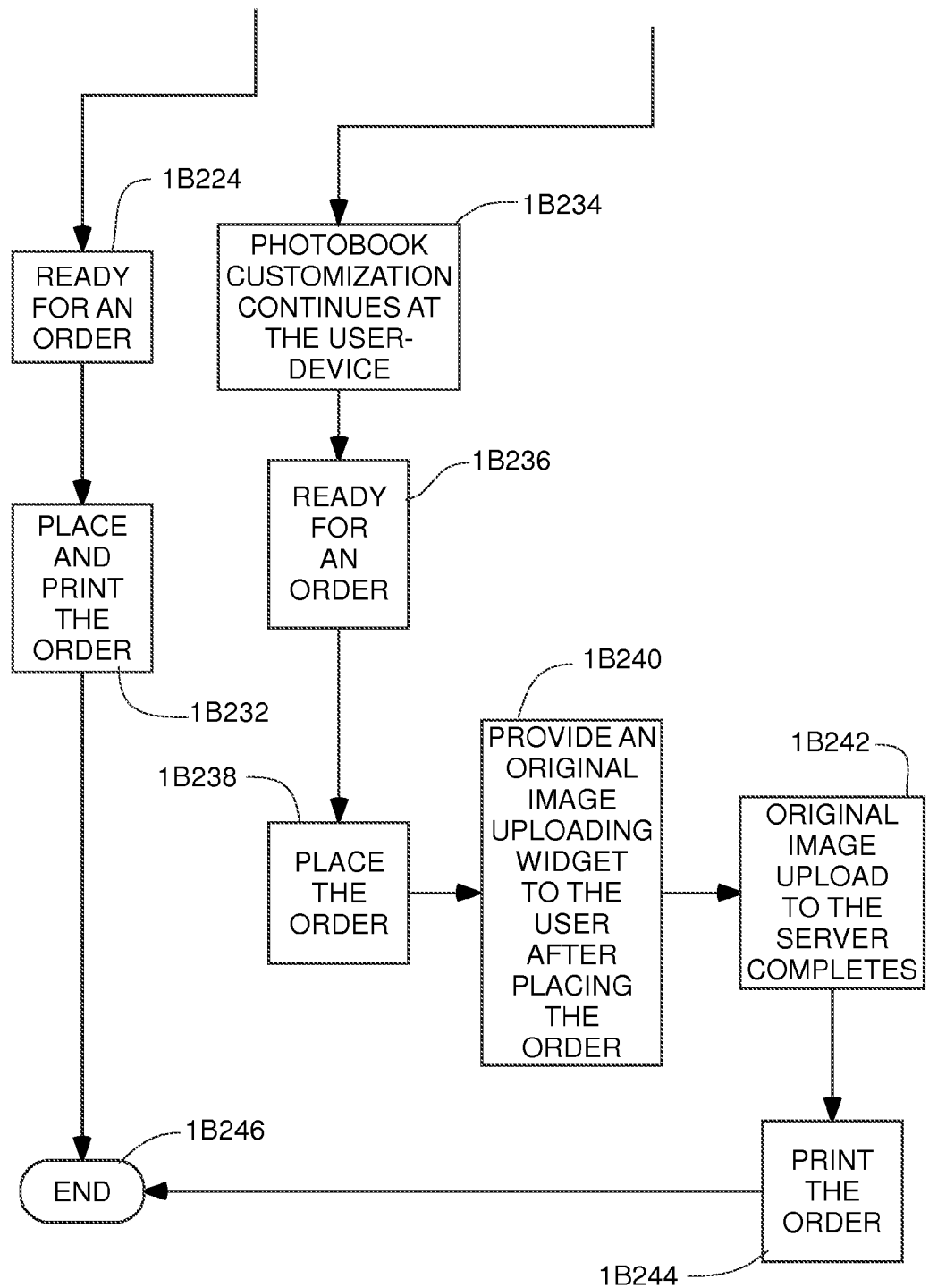

FIGS. 1B-1 and 1B-2 show a flow diagram of an exemplary embodiment 1B200 showing a method of background uploading of media-files while an Internet user is customizing a media-based project, which in this embodiment is a photobook. An Internet user (hereinafter "user") starts the process of creating a media-based project (hereinafter "project") using a user-device at step 1B202. The term photobook or project may be used interchangeably. The user logs in at step 1B204 using the user-device. After the user logs in at the user-device, at step 1B206 the user selects original media files or images for creating a photobook. At step 1B206, following the log-in process at the user-device, the user is provided a workspace (also called "editor") where the user can practice or utilize various embodiments of the present invention to customize, edit or create the photobook. After the selection of images is made, then at step 1B208, optionally and in some embodiments, the client-device analyses the images. Once the optional image analysis is completed at the client-device, at step 1B210 the original images are resized to smaller sized image files and a meta-data is extracted from each original image. Meta-data is a type of data that is relevant to or embedded in an image. Meta-data comprises digital data about a media file. In one embodiment, meta-data is an Exchangeable Image File format data, or "EXIF" data (also in some cases known as "Exif" data). EXIF is a standard that specifies a format for images, sound, geolocation data (provided by a Global Positioning Receiver or GPS receiver attached to a camera), and ancillary tags used by digital cameras, smartphone cameras, scanners, and other systems that handle image and/or sound files recorded by digital cameras. EXIF data comprises a broad spectrum of data, including, but not limiting to, date and time information of images taken, GPS location of images, camera settings (camera make and model, image orientation or rotation, aperture, shutter speed, focal length, metering mode, and ISO information), a thumbnail of the image, a description of the images, and/or copyright information thereof.

At step 1B212, the resized image files and the meta-data are uploaded to the server. The resized image files are smaller in size as compared to the larger sized original images, but not so small as to be un-useable by the server for image analysis. The resized images are immediately provided to the user-device for building the project. After the resized images and the extracted meta-data of the original images are uploaded to the server, step 1B214 will follow to begin uploading the original images to the server in a background computer process at the user-device. Using the uploaded resized images and the meta-data, at step 1B216, the server performs a server-side image analysis. An image analysis comprises image optimization algorithms, image ranking algorithms, feature or object detection algorithms, use case formation techniques, layout, and/or photobook design formation techniques, as described in greater detail below. Once the server-side image analysis is completed, at step 1B218, the server converts the resized uploaded media files into multiple sizes or multiple (plural) compression levels (the term "compressed media file" or "compressed image" is used herein to refer to a media file that has been in some way modified by the server and of a different size from the resized file uploaded from the client to the server). At step 1B220, the server provides to the user-device a compressed image, or an image of a size relevant to the scope of the project (photobook). The server converts a resized image into many different sizes (called "compressed files" herein) so that each size may be called by the user-device depending on the scope of the project. The scope of the project may comprise different sizes and different resolutions of image files, wherein the server performs the server-side image reduction to prepare images of different sizes as needed by the project. While the server performs the server-side image reduction using the resized image files, the original image files are still uploading in the background computer process. At step 1B226, the server provides analytical data to the user. At step 1B222, the user pulls relevant image data comprising image files and analytical data from the server. At step 1B224, the user continues customizing (building) the photobook or project. At step 1B228, the original image files may or still may not be uploaded [completed upload] to the server. If the original image files are uploaded to the server, the user continues building the photobook as shown by step 1B224. If the original image files are not uploaded, the photobook customization still continues at step 1B234. If the original image files are uploaded and the photobook customization continues (and thus completes), the photobook will be ready to order at step 1B224. At step 1B232, the user can place an order to print the photobook. Once the photobook is ordered and printed at step 1B232, the embodiment 1B200 ends at step 1B246.

In the event that the upload of the original images is not complete, the user still customizes (and thereby completes) the photobook at step 1B234, and is ready to order the photobook at step 1B236. The user places the order at step 1B238. Once the order is placed at step 1B238 and the original images are still not uploaded, the embodiment 1B200 provides the user a widget to upload [begin a new upload or complete the ongoing upload] the original image files that the user selects. Step 1B238 allows the user to order the photobook before the upload of the original image files completes. At step 1B240, the embodiment 1B200 provides the user an optional uploading mechanism of original image files if the user does not have time to wait until the original images are uploaded to the server before placing an order to print the photobook. However, in another embodiment, step 1B240 can happen before step 1B238 and/or before the step 1B236; that is, a widget to upload original images may be provided to the user-device before placing an order, or before the order is ready. In other words, steps discussed herein may be switched, overlapped, or altered as long as the spirit of the present invention is consistent with the plurality of embodiments described herein. An uploading widget may comprise a software application that the user can download from an embodiment of the present invention. Once the widget is downloaded and installed at the user-device, the user can begin uploading or continue uploading the original image files using the installed widget. At step 1B242, the original image files are uploaded to the server with the aid of the widget. After the original image files are uploaded to the server, at step 1B244 the server can send the order to print the finished product. The embodiment thereby ends at step 1B246.

Montage Embodiments

Figure 1C:
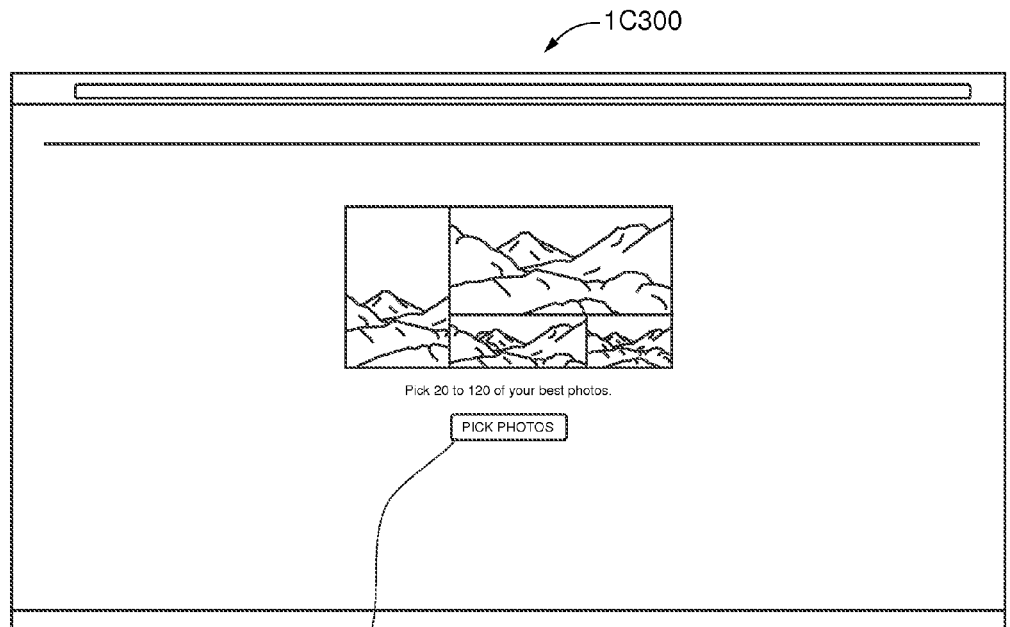
FIG. 1C is a diagram showing a method of selecting media files, according to one embodiment of the present invention (this embodiment sometimes known as "MONTAGE").

FIG. 1C is a screenshot embodiment 1C300 showing a method of selecting original media files or images at a user-device. In the embodiment 1C300, a user-device may select original images by clicking a button 1 C302, labeled as "pick photos." A button is a soft-button in a software embodiment. The words "image(s)" and "photo(s)" are used interchangeably in this specification.

Figure 1D:
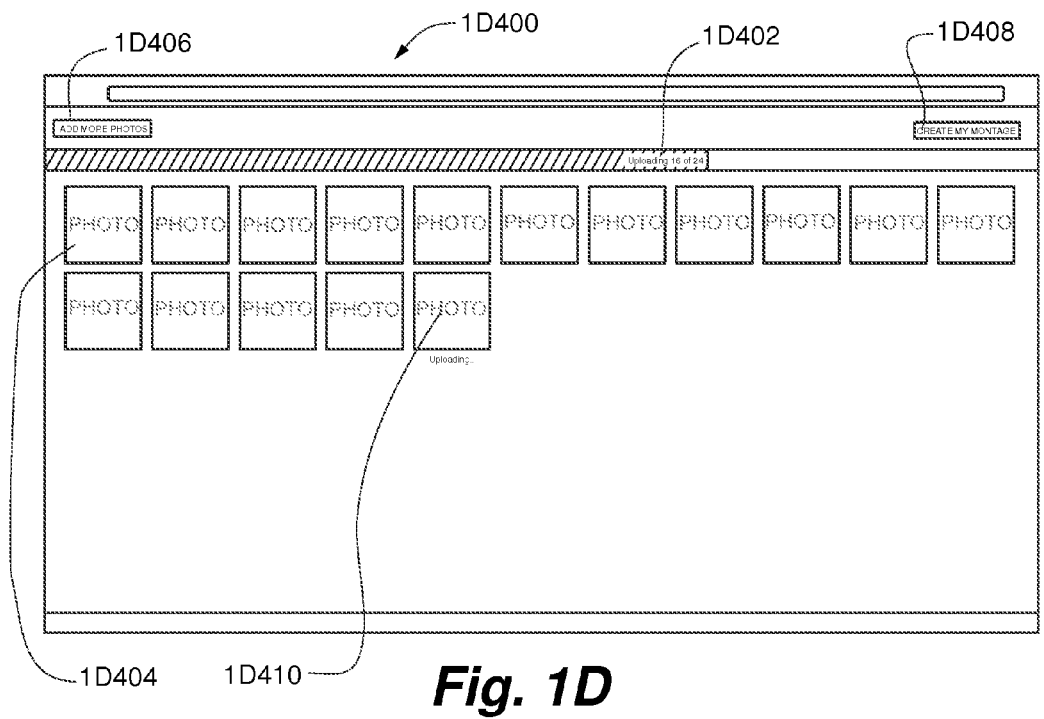
FIG. 1D is a diagram showing a method of uploading media files, according to one embodiment of the invention.

FIG. 1D is a screenshot embodiment 1D400 showing an upload of original images to a workspace of a user-device after the user-device selects or picks images. A workspace at a user-device is also called an editor. A progress bar 1D402 shows the number of images uploaded or uploading to the workspace. An uploaded image 1D404 is displayed in the workspace. The embodiment 1D400 also shows an uploading image 1D410 when the image is being uploaded. The embodiment 1D400 demonstrates client-side resizing of original image files. The image 1D404 is a resized image that is smaller than the original image. A button 1D406 allows the user to add more images. After the selected images are uploaded to the workspace of the client-device, the user can click a button 1D408 to create a design of a photobook using the uploaded photos in the workspace. The button 1D408 reads "create my Montage," where MONTAGE is a trademark name, but not a functional name, of the button 1D408.

Figure 1E:
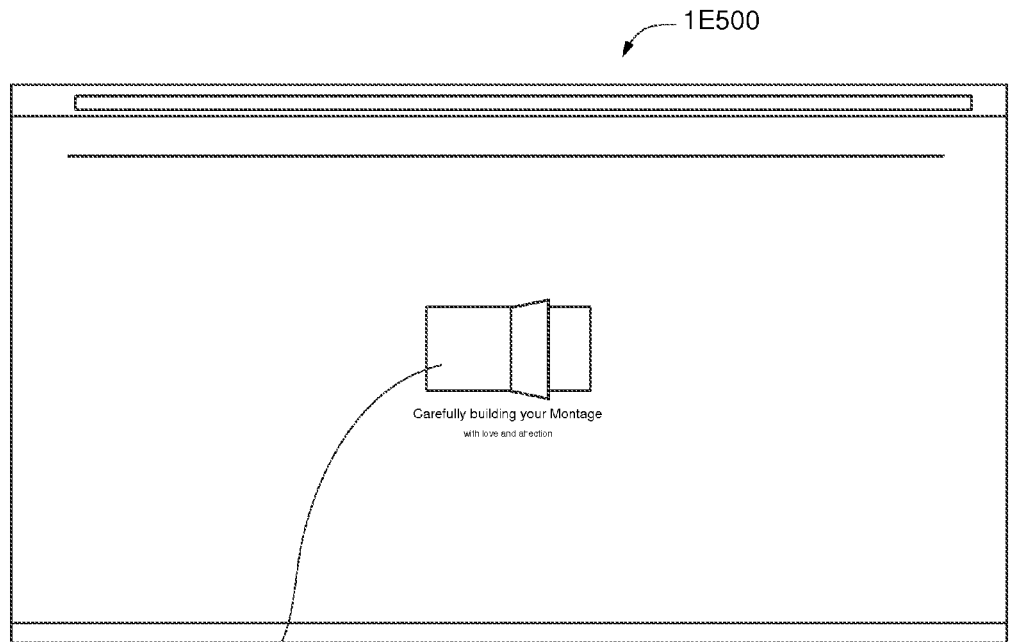
FIG. 1E is a diagram showing a method of building a media-based project, according to one embodiment of the invention.

FIG. 1E is a screenshot embodiment 1E500 in which the present invention does an analytical work or analysis work to build a photobook. An exemplary symbol 1E502 teaches that the present invention is building a photobook by performing the analytical work or analysis work, such as an image or video analysis.

Figure 1F:
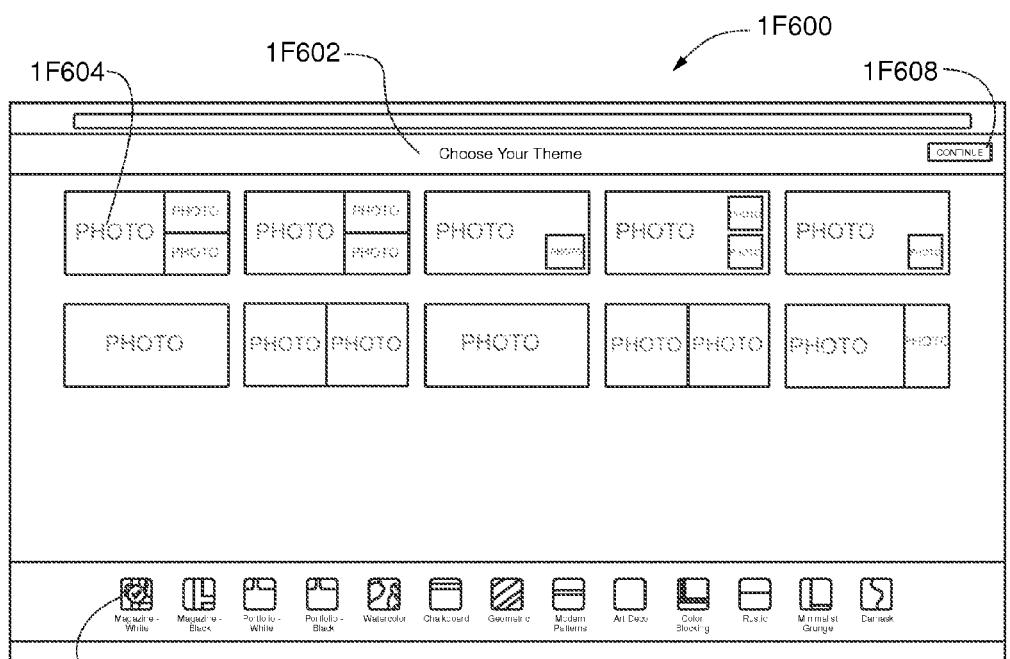
FIG. 1F is a diagram showing a method of selecting a theme, according to one embodiment of the invention.

FIG. 1F is a screenshot embodiment 1F600 that displays a theme selection of a project or photobook after images are uploaded to the workspace (editor) of a user-device. All pages of the photobook are displayed in the workspace. In a page 1F604 of the photobook, an arrangement of the images is shown. This arrangement is auto-populated by the present invention after an image analysis. The server performs the image analysis for auto-populating the arrangement. For auto-populating the design of the book, the server may use features such as, cropping, zooming, relevant images grouping, and other image editing processes. The embodiment 1F600 allows the user to select a theme 1F606. The instruction at 1F602 allows the user to select or choose the theme 1F606. Once the user is satisfied with the theme and arrangement of the images in all pages of the photobook, the user can click the button 1F608 to continue to the next step of the present invention.

Figure 1G:
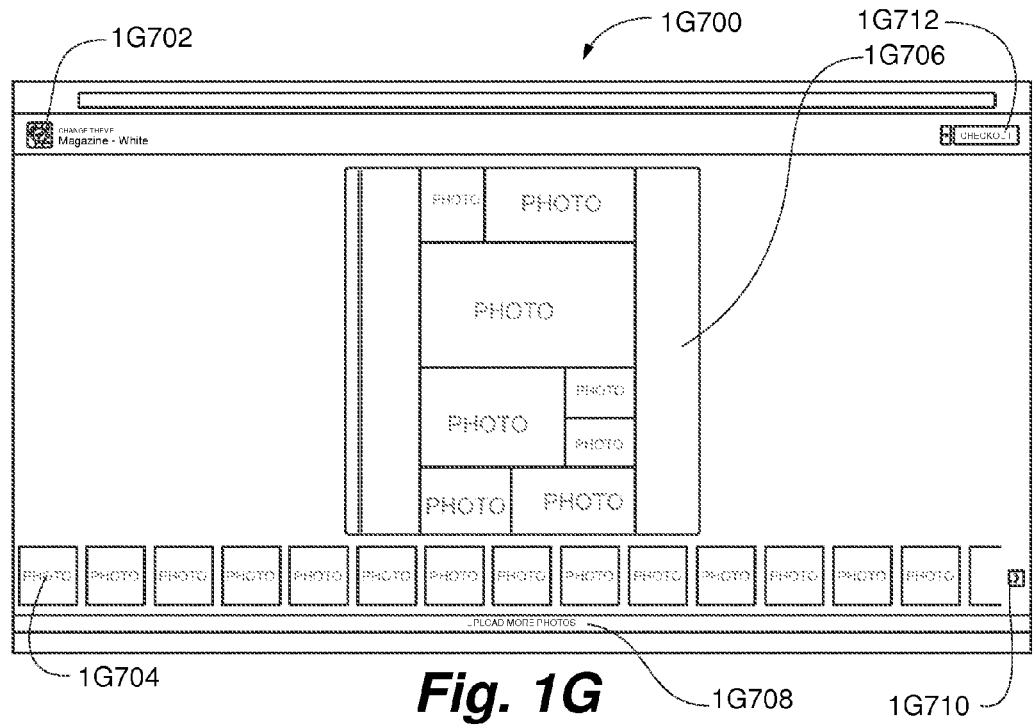
FIG. 1G is a diagram showing a method of designing a cover sheet, according to one embodiment of the invention.

FIG. 1G is a screenshot embodiment 1G700 that shows a cover page of a photobook and an arrangement of images therein. The cover page 1G706 uses at least an image 1G704. A plurality of images can be used in the cover page 1G706. A server auto-populates a first design of the cover page 1G706. The user has an option to further customize the cover page 1G706 by using any of the uploaded images. Standard image editing features may be applied in customizing each image on the cover page 1 G706 of the photobook. The workspace displays the theme of the design at 1G702. The workspace further allows the user to upload more photos at 1G708. The button 1G710 allows the user to scroll the uploaded images. A checkout button 1G712 allows the user to order and print the photobook.

Figure 1H:
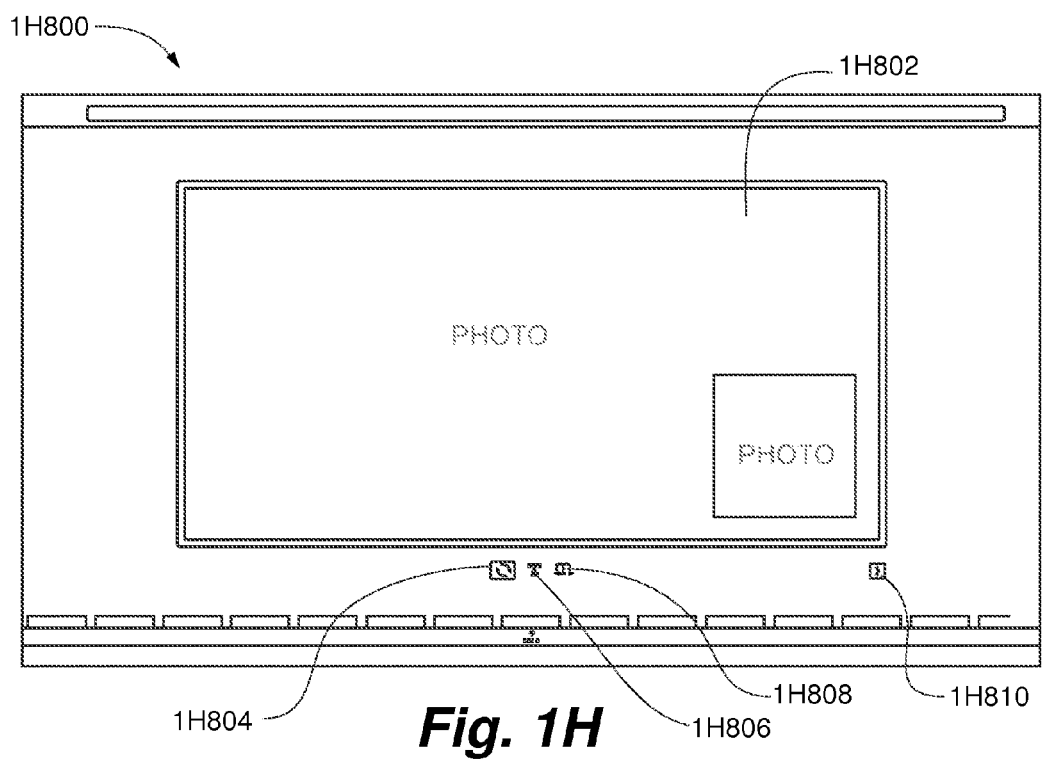
FIG. 1H is a diagram showing a method of arranging text and images, according to one embodiment of the invention.

FIG. 1H is a screenshot embodiment 1H800 that shows a page of a photobook for rearranging text and images therein. The page 1H802 shows an arrangement of the uploaded images on the page. The user can shuffle images on the page 1H802 by using a shuffle button 1H804, insert text on the page 1H802 by using a insert-text button 1H806, and rearrange pages of the book by using a rearrange button 1H808. The user can additionally use one or more of the uploaded images to customize the design of the page 1H802. The user can flip to a next page of the book by clicking or pressing an arrow button 1H810.

Figure 1J:
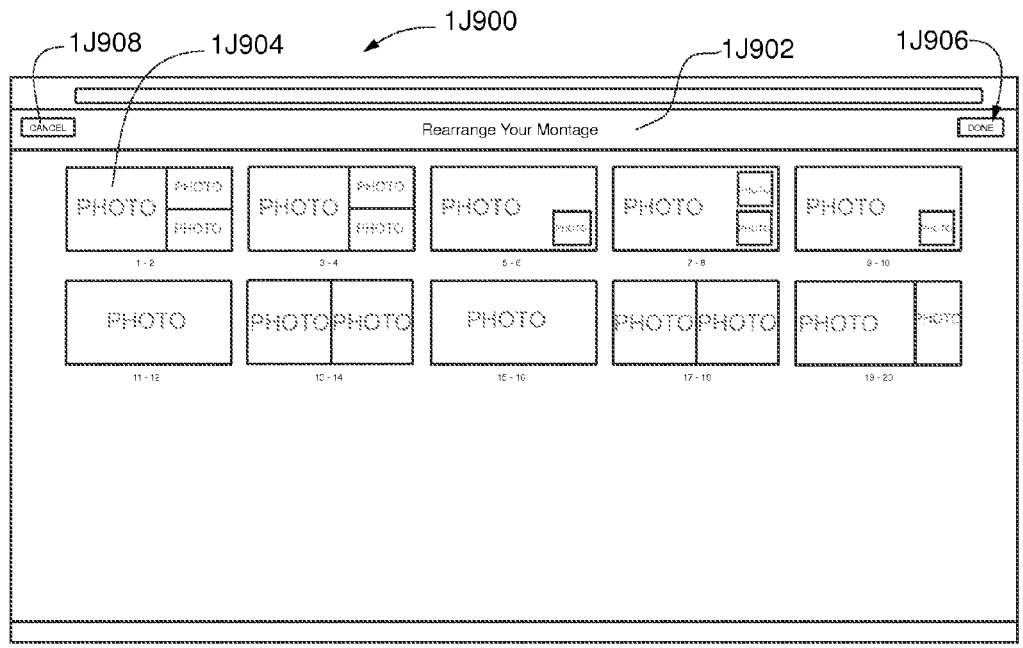
FIG. 1J is a diagram showing a method of previewing a design, according to one embodiment of the invention.

FIG. 1J is a screenshot embodiment 1J900 showing a method of previewing and rearranging design pages of a photobook. A design page 1J904 has a theme and at least an image. A plurality of images can be used in the design page 1J904 and the theme is selected by the user. In the embodiment 1J900, the design page 1J904 comprises page 1 and page 2 of the photobook. The message at 1J902 explains that the workspace provides a method to rearrange the pages of the photobook. There is a cancel button 1J908 to cancel a rearrangement if desired. Once a rearrangement of pages is completed, the user can click a done button 1J906 to save the rearrangement.

Figure 1K:
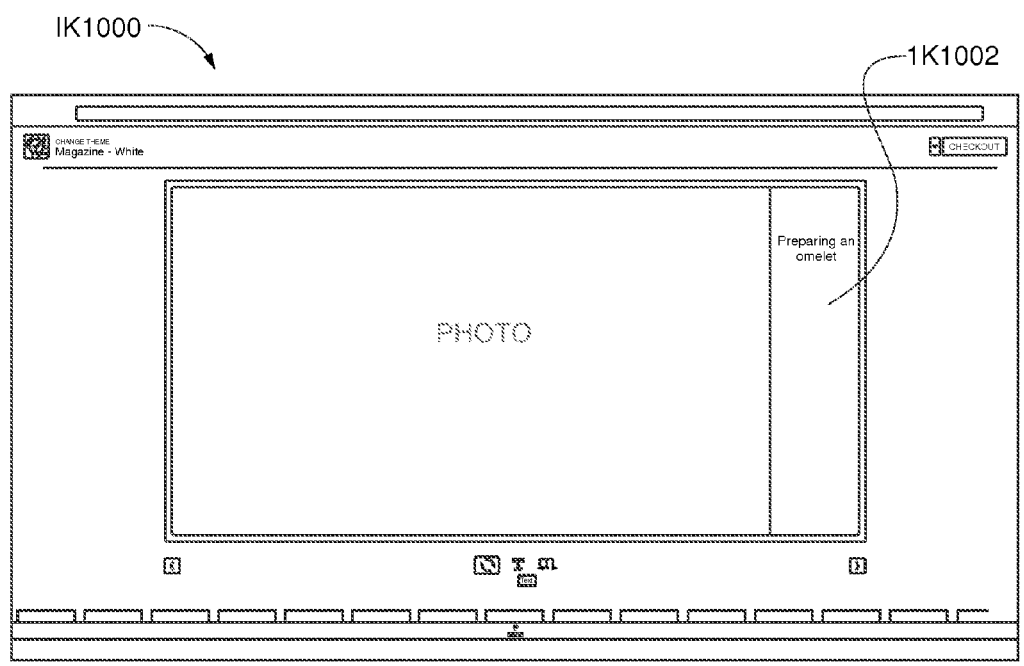
FIG. 1K is a diagram showing a method of inserting text, according to one embodiment of the invention.

FIG. 1K is a screenshot embodiment 1K1000 showing an insertion of text to describe an image. Text can be inserted into a page of the photobook to describe an image or a group of images. A storyline or narrative of work may be added with images using text. A narrative can be added as shown in the region 1K1002.

Figure 1L:
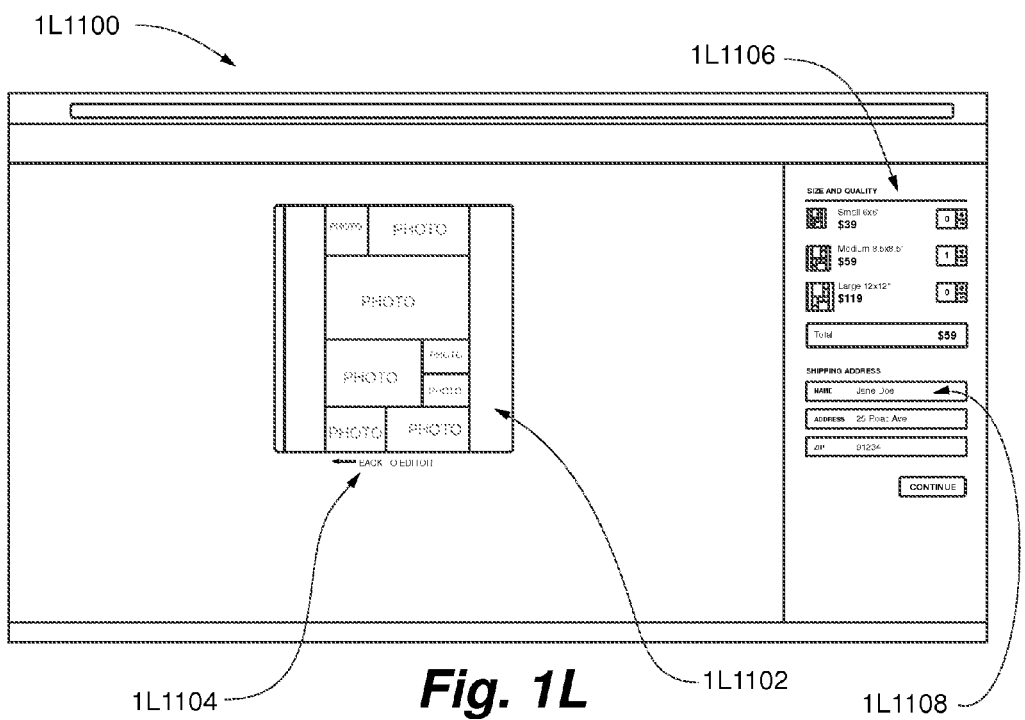
FIG. 1L is a diagram showing a method of ordering a photobook, according to one embodiment of the invention.

FIG. 1L is a screenshot embodiment 1L1100 showing a method of ordering a project or photobook. Once a photobook 1L1102 is customized and ready to order, a user can select a specification of the project to order. If the user is not happy with the customization of the photobook 1L1102, the user can go back to the editor or workspace by clicking 1L1104 to further edit/customize the pages of the photobook. A specification may be a size or dimension of the photobook. A sample specification of the project by size or dimension is shown at 1L1106. Each specification may have a different price for order. When the user agrees to a price, the user can enter a shipping address as shown at 1L1108. The user can further continue with payment options and order a printed photobook. A standard payment-processing gateway may be implemented in the present invention to order a printed copy of the photobook.

Mosaic Embodiments

Figure 1M:
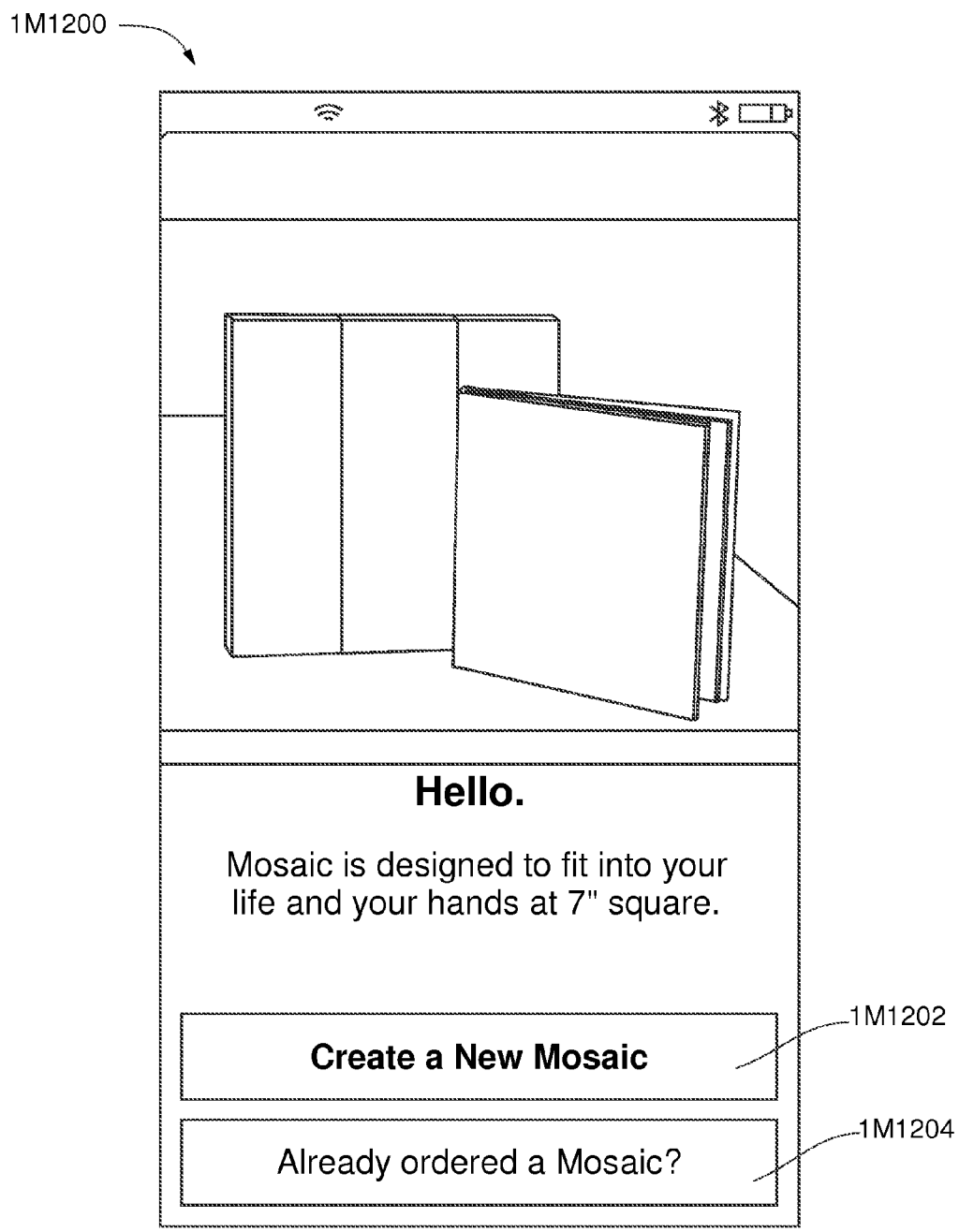
FIG. 1M is a diagram showing a mobile embodiment of a login screen of the present invention, according to another embodiment of the present invention (this embodiment sometimes known as "MOSAIC").

FIG. 1M is a screenshot embodiment 1M1200 showing a login screen at a handheld device or mobile device, such as, a smartphone (this embodiment is sometimes known as "MOSAIC"). A user can create a new user account by clicking a button 1M1202. Existing users can login to create a new project by clicking a button 1M1204. In the embodiment 1M1200, the word MOSAIC is a trademark name of an embodiment of the present invention, but not a functional name to describe a method or process.

Figure 1N:
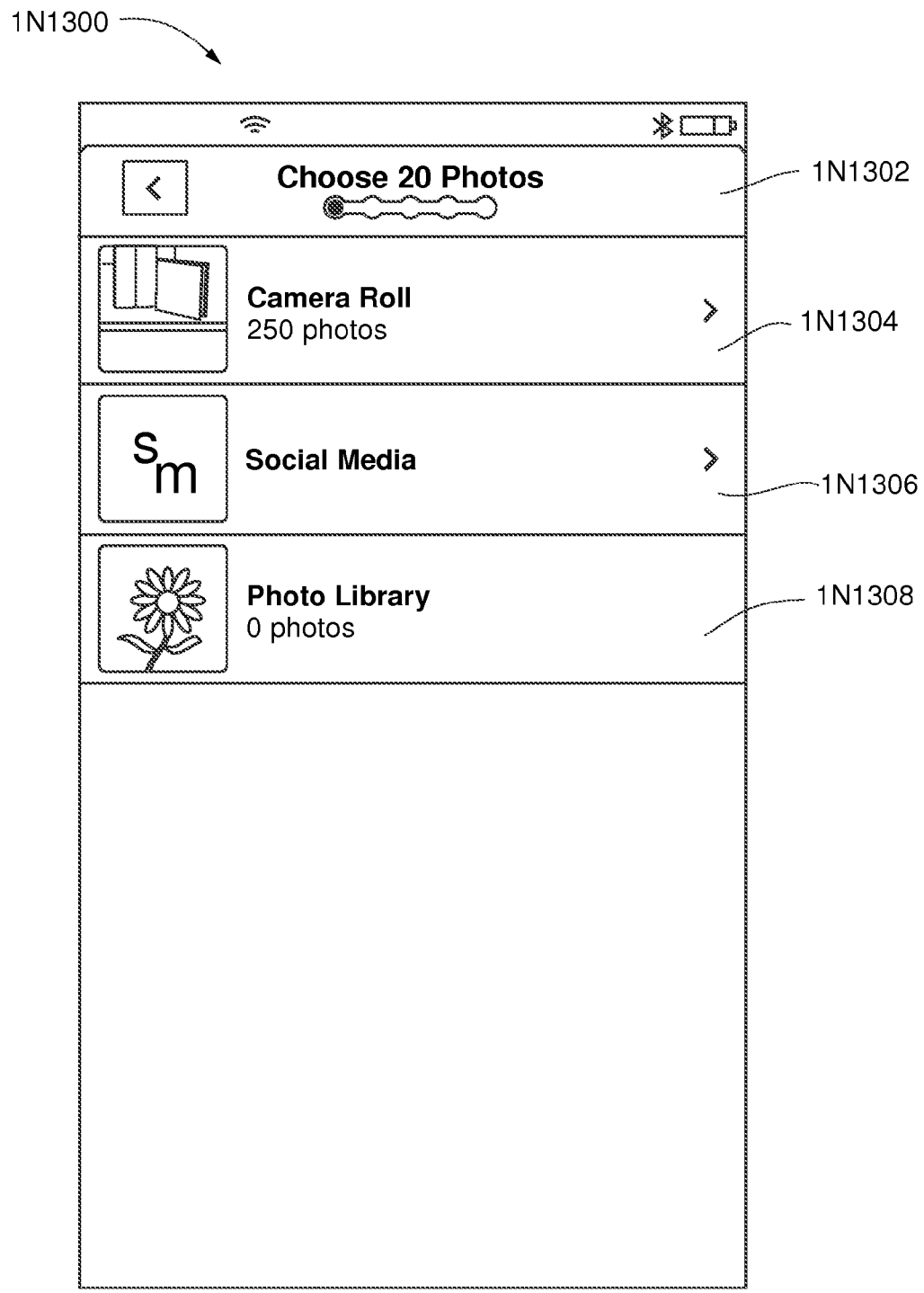
FIG. 1N is a diagram showing a method of media file selection at a mobile device, according to one embodiment of the invention.

FIG. 1N is a screenshot embodiment 1N1300 showing a method of selecting image files from multiple sources at a handheld or mobile device for creating a project. A method of selection 1N1302 shows a listing of sources where media files may be located. Image files or media files may be selected from a folder camera roll 1N1304, from a social media 1N1306, or from a photo library 1N1308. Camera roll 1N1304 is a file folder where images taken by a camera of the mobile device are stored. Social media 1N1306 comprises outside websites where image or media files are stored, such as, but not limited to, FACEBOOK, TWITTER, and LINKEDIN. Photo library 1N1308 is a file folder where the user can store image files at the mobile device.

Figure 1P:
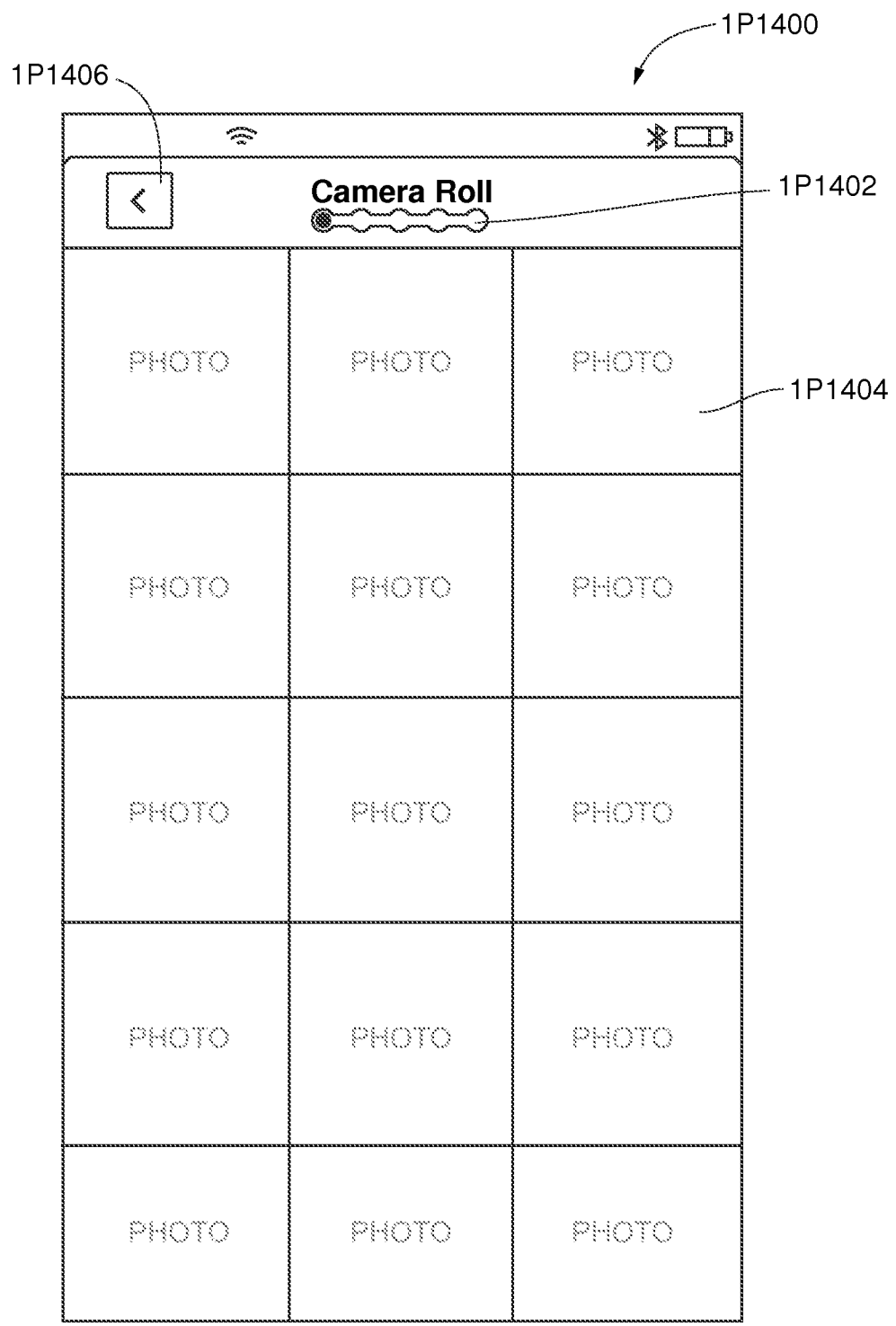
FIG. 1P is a diagram showing a preview of images at a mobile device, according to one embodiment of the invention.

FIG. 1P is a screenshot embodiment 1P1400 showing a preview of an image file folder at a mobile device. The folder 1P1402 with an exemplary name of camera roll, when selected by a user, the mobile device will show a preview of all images stored in the folder. An image 1P1404 is a preview of an original image. The user can go back to a different file folder at the mobile device by clicking or pressing a back button 1P1406.

Figure 1Q:
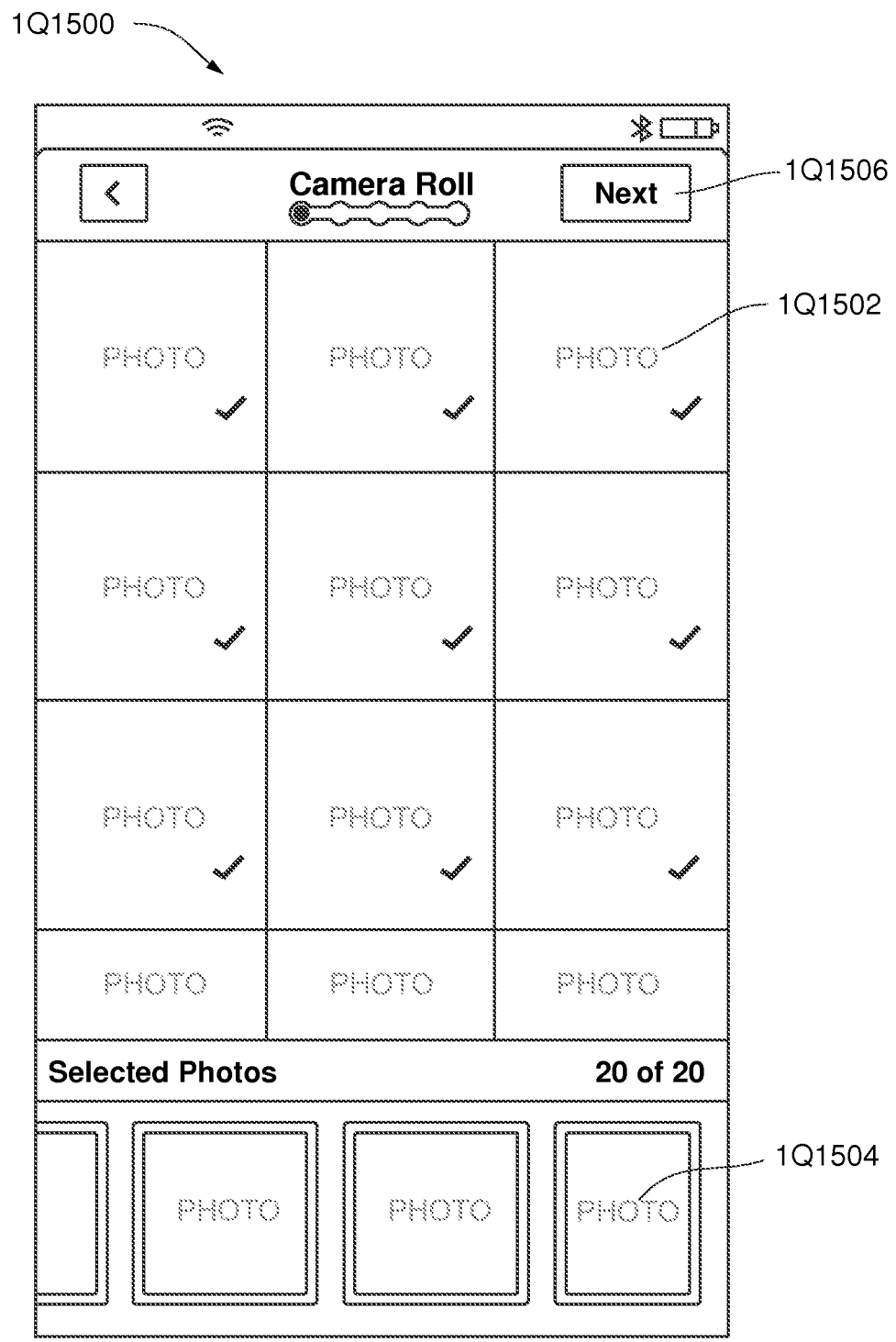
FIG. 1Q is a diagram showing image selection at a mobile device, according to one embodiment of the invention.

FIG. 1Q is a screenshot embodiment 1Q1500 showing images selected by a user at a mobile device. The user may select an image 1Q1502 by touching, pressing, or clicking the image 1Q1502. Once the image 1Q1502 is selected, the selection is confirmed by a check mark as shown within the image 1Q1502. A preview 1Q1504 of the selected image is generated once the image is selected. Once images are selected for building a project, the user can press a next button 1Q1506 to build the project.

Figures 1, 1R:
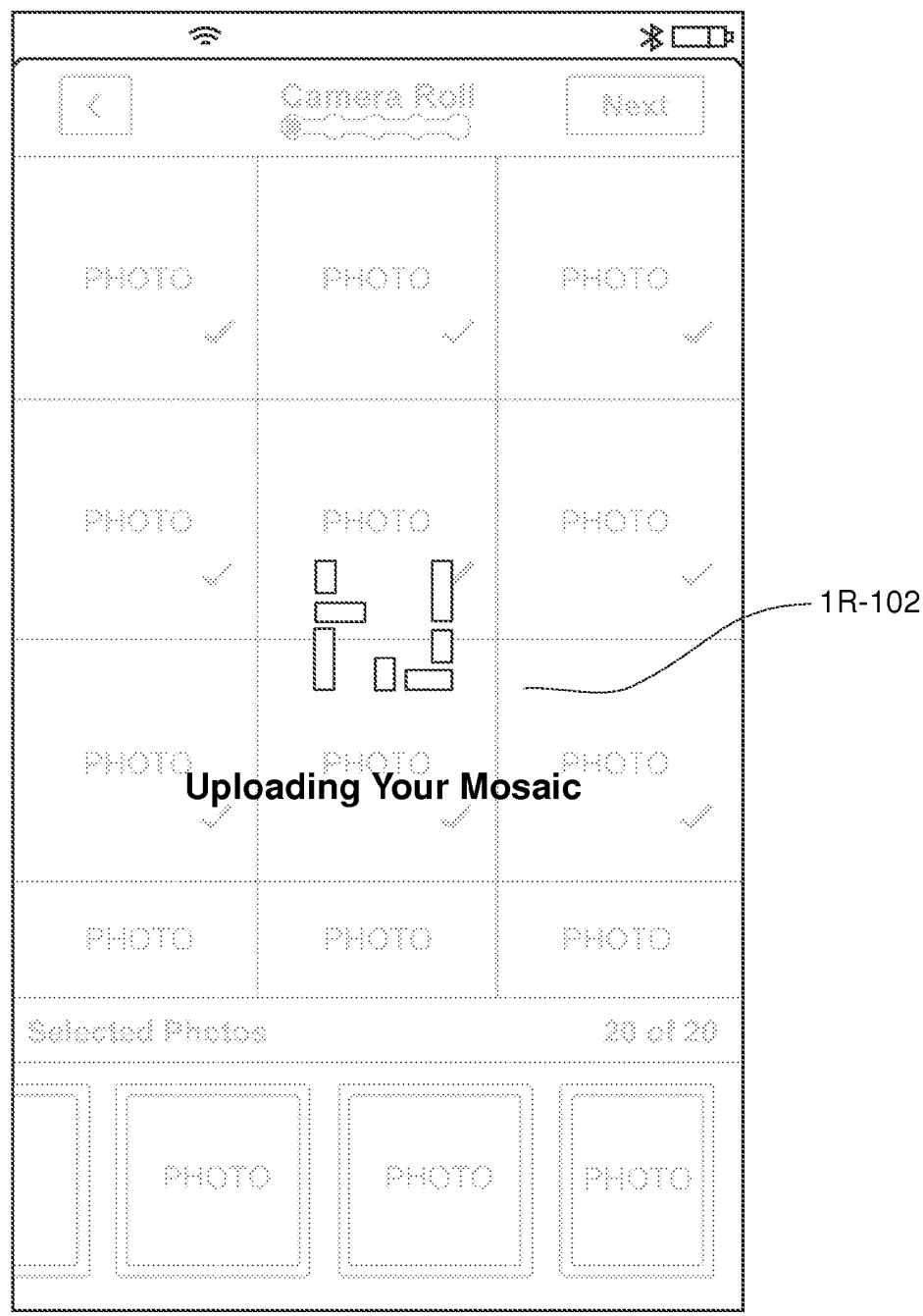
Figures 1, 1R, 2:
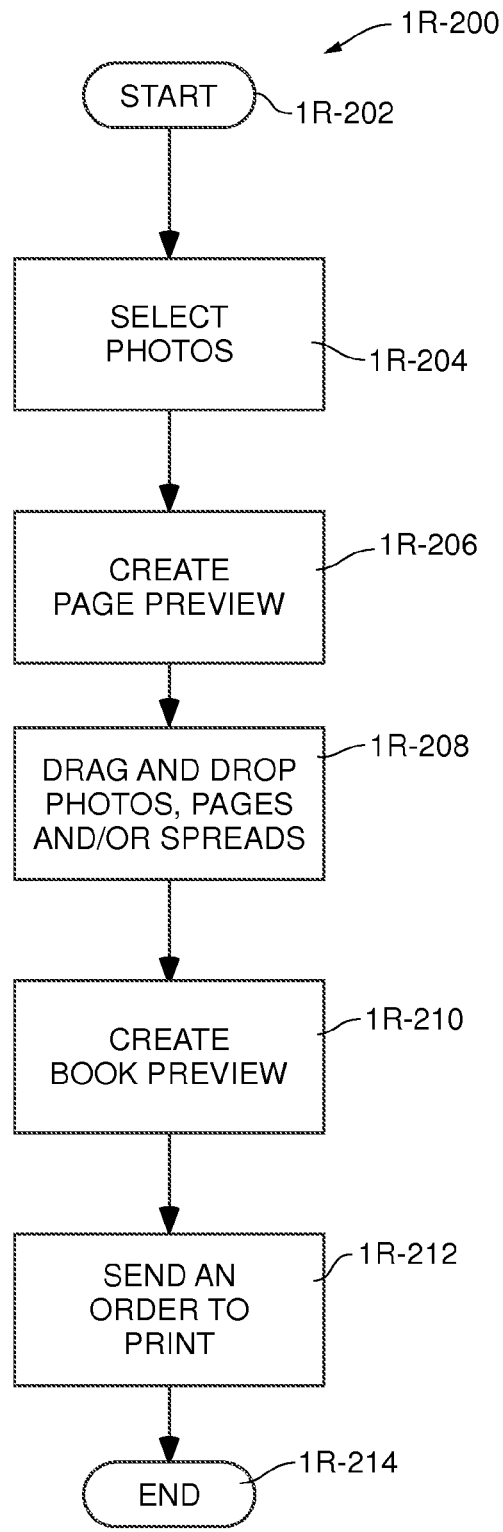

FIG. 1R-1 is a screenshot embodiment 1R-100 showing an uploading process of photos in a mobile device. Once photos are selected for an upload, the mobile device uploads the images to a server. While the images are uploading to the server, the mobile device displays a message 1R-102 in a form of graph or text showing that image or photo uploading is in progress.

FIG. 1R-2 is a flow diagram showing an embodiment 1R-200 of a process to create a photobook using a mobile device (or a space-constrained device). The process starts at step 1R-202. At step 1R-204, a user of the mobile device selects photos at a display or screen of the mobile device. Once the photos are selected, the present invention at step 1R-206 creates a page preview of the selected photos. The page preview displays all pages and spreads of the photobook, in which the pages or spreads comprise selected photos, along with a theme and a design. The theme and the design may be automatically populated. A use case for the photos may be automatically selected. While on the page preview, the user is provided at step 1R-208 book customization options. The book customization options comprise dragging and dropping of photos, pages, and spreads. When a photo, a page, or a spread is dragged from one location and dropped to a next location, the user can create a desired pairing arrangement of photos, pages, and spreads. Once the desired pairing arrangement is achieved or the book customization options are completed, a book preview is created at step 1R-210. In the book preview, the user can see a virtual manifestation of a photobook that is printable and shippable. The book preview is also a bird's eye view of a deliverable photobook that the user is expected to receive in the mail after an order to print the photobook is received. In the book preview, the user can view the design of a front cover of the book or even customize the cover. The user can further virtually flip the pages of the book, and view the design of each page or spread in the book. When the user is satisfied with the book preview, an order to print the book is placed at step 1R-212. The process ends at step 1R-214.

FIG. 1R-3 is a screenshot embodiment 1R-300 showing a page preview of a photobook at a display of a mobile device. After a user selects photos in a display 1R-308 of a mobile device, a page preview is shown to the user in the same display. The page preview comprises pages and spreads. A spread consists of two opposite, or opposing, pages. For example, a page 1R-302 and a page 1R-304 together make a spread. A placeholder gap of a page or spread behaves in the same manner like a placeholder gap of a photo. A long tap by a finger or stylus at a page or spread will cause the page or spread to pop out. Once the page or spread pops out, the page or the spread can be dragged along the direction of the finger or stylus that is being used on the touch screen display (touch interface) of the user device. Once the user is happy with the page preview, the user can click the soft "done" button 1R-306 to end the page preview.

When tapping the soft "Rearrange Photos" button, the user is presented a spread-based grid of prior-selected pictures. In one embodiment, horizontal spacing between spreads is smaller than the vertical one. This is to communicate a correct order in which photos are arranged, which is from left to right, and not from top to bottom. This way, for example, a top-left spread contains a first and a second photo, and a next spread to its right contains a third and a fourth photo, and so on.

A long tap will cause a tapped photo to pop-out (move up, so that the user can see the photo s/he selected under his/her finger) and leave a square shadow placeholder gap at its initial position. A shadow placeholder gap is a non-interactive element that shows the position where a selected photo is going to land if dropped or released by the finger. After being selected, a photo can be moved around the display screen or touch screen to a different position. When brought close to the edge of another photo in the grid, that another photo will slide to a side (left or right depending on its index) revealing a new shadow-placeholder gap (while the initial placeholder gap fades away) where it is going to land if dropped.

In one embodiment, when a selected photo is hovering over the center of a spread, only one photo in that spread will slide and reveal a placeholder gap, and when the selected photo is moved to a side of a spread, both photos in that spread will slide to a side and reveal a placeholder gap.

Releasing a photo will result in it "landing" on the placeholder gap. The placeholder gap will fade out in the process, the photo taking the position in the gap, and triggering an animation of all photos between the placeholder and the initial position of the selected photo to move (rearrange).

In one embodiment, a user can drag and drop a page. In another embodiment, the user can drag and drop two opposing pages or a spread. A page may be configured to comprise more than one photo. A spread may be configured to comprise more than two photos. A spread (two opposing pages) may just comprise one photo.

FIG. 1R-4 is a screenshot embodiment 1R-400 showing dragging of a photo in a mobile device. A mobile device 1R-402 shows a page preview of a photobook, in which the page preview displays all photos in the photobook. Using a touch interface in the display of the mobile device, a finger 1R-404 can drag a photo 1R-408. Before dragging, the photo 1R-408 was initially located at the placeholder gap 1R-406.

FIG. 1R-5 is a screenshot embodiment 1R-500 showing a photo before being dragged in a mobile device. In a mobile device 1R-502, a photo 1R-506 is dragged by a finger 1R-504. Dragging is initiated by a long tap on the photo 1R-506 using the finger 1R-504 at the display of the mobile device. A long tap causes the photo 1R-506 to pop out. Once the photo 1R-506 pops out, the photo moves along the direction of the finger 1R-504 as the finger 1R-504 moves around the display. Once a rearrangement of photos is completed, a user can press a soft "Done" button 1R-508.

FIG. 1R-6 is a screenshot embodiment 1R-600 showing a photo before being dropped in the display of a mobile device. A photo 1R-606 is dragged from the placeholder gap 1R-604 by using a finger 1R-602. Dragging is initiated by a long tap on the photo. A long tap causes the photo 1R-606 to pop out. The finger when released from the touch display causes the photo 1R-606 to drop.

FIG. 1R-7 is a screenshot embodiment 1R-700 showing a photo after being dropped in a display screen of a mobile device. After a photo 1R-702 is dropped, a vacant placeholder gap of the photo is closed by sliding left or right of adjacent photos. Photos 1R-704 and 1R-706 slide along with other photos, to close the placeholder gap of the photo that was dragged and dropped.

FIG. 1R-8 is a screenshot embodiment 1R-800 showing a completed project (virtually manifested photobook) in a mobile device. A virtual photobook is flappable. A virtual photobook 1R-802 is created after a user finishes book customization options including dragging and dropping of photos, pages, and spreads. The user can shuffle photos in the cover page of the photobook by using a soft "Shuffle Cover" button 1R-804. After the user is satisfied with the design of the virtual photobook 1R-802, the user can proceed to order the photobook by pressing a soft button "Place Order" 1R-806. If the user is not satisfied with the design of the photobook, the user can go back to drag and drop photos, pages, and spreads by using the soft arrow button 1R-808.

FIG. 1R-9 is a screenshot embodiment 1R-900 showing an opened cover page of a photobook in a mobile device. In a mobile device 1R-902, a virtual photobook is produced. The virtual photobook resembles a photobook that will eventually be produced by printing and binding after an order is received. A finger 1R-908 can flip a cover page 1R-904. The cover page 1R-904 may be designed in a way that shows a glimpse of what photos are inside the book. Miniature photos can be shown through the openings in the cover page, in a manner that the next page 1R-906 shows all miniature photos. A cover page is a matter of design choice. The photos can be re-arranged by using the soft "Rearrange Photos" button 1R-910, returning the user to FIG. 1R-4. Once the user is satisfied with the design of the book, the user can press the soft "Next" button 1R-912 to place an order to print the book.

FIG. 1R-10 is a screenshot embodiment 1R-1000 showing a manifested virtual photobook with flappable pages and spreads. The manifested virtual photobook resembles a photobook that will eventually be produced by printing and binding after an order is received. The actual photobook may be received via the mail after an order is placed to print the book. The virtual photobook as shown in a display of a mobile device is flappable to see all pages and spreads in the book, and the associated photos and design. A user can use a finger to flip pages. The user can view, such as, a page 1R-1004 that comprises a photo, turn another page 1R-1006 using the finger, and view a next page 1R-1002. After the user is satisfied with the contents and design of the book, the user can place an order to print the book by pressing the soft "Place Order" button 1R-1008.

Figures 1, 1R, 2, 3:
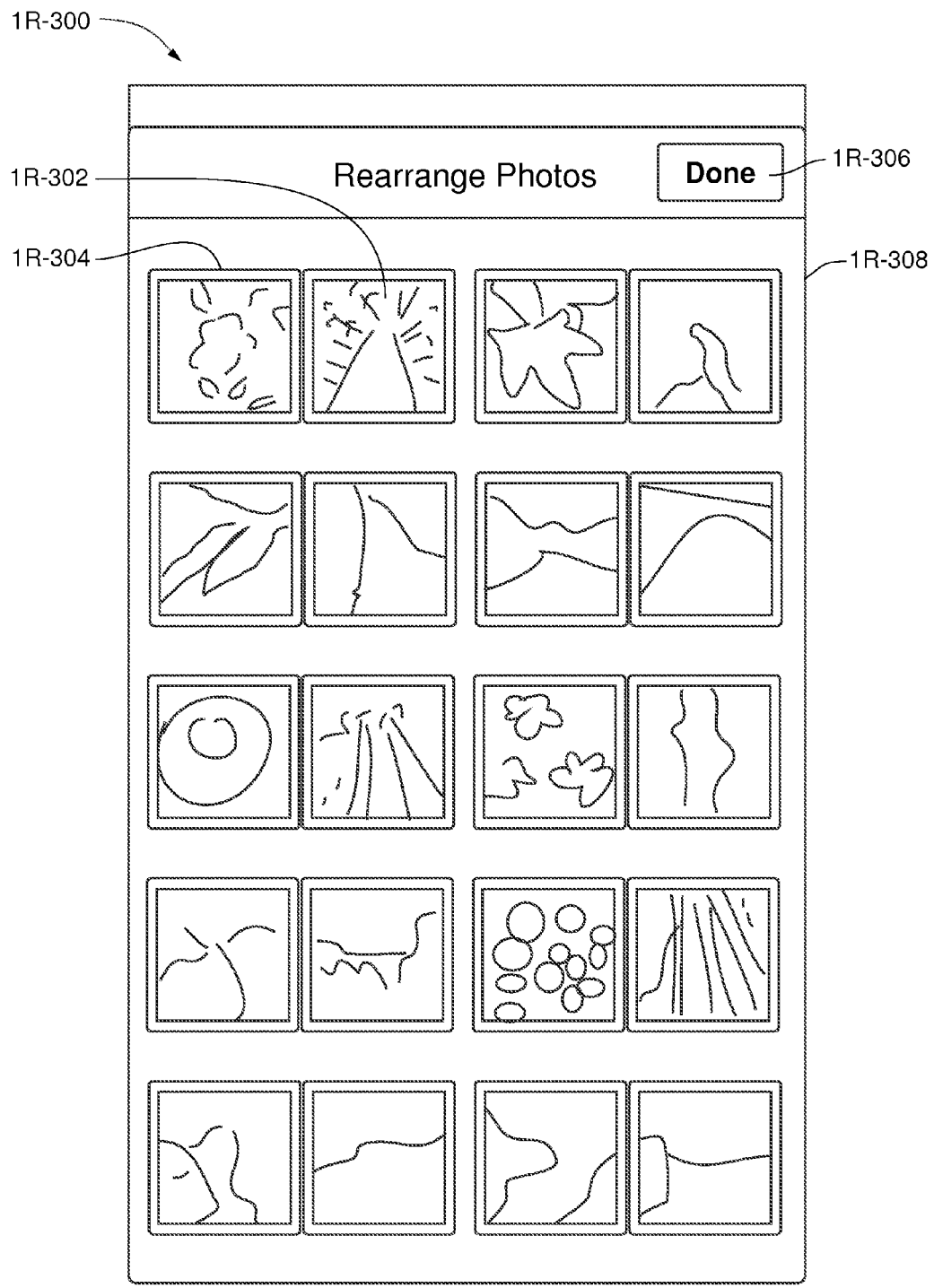
Figures 1, 1R, 2, 3, 4:
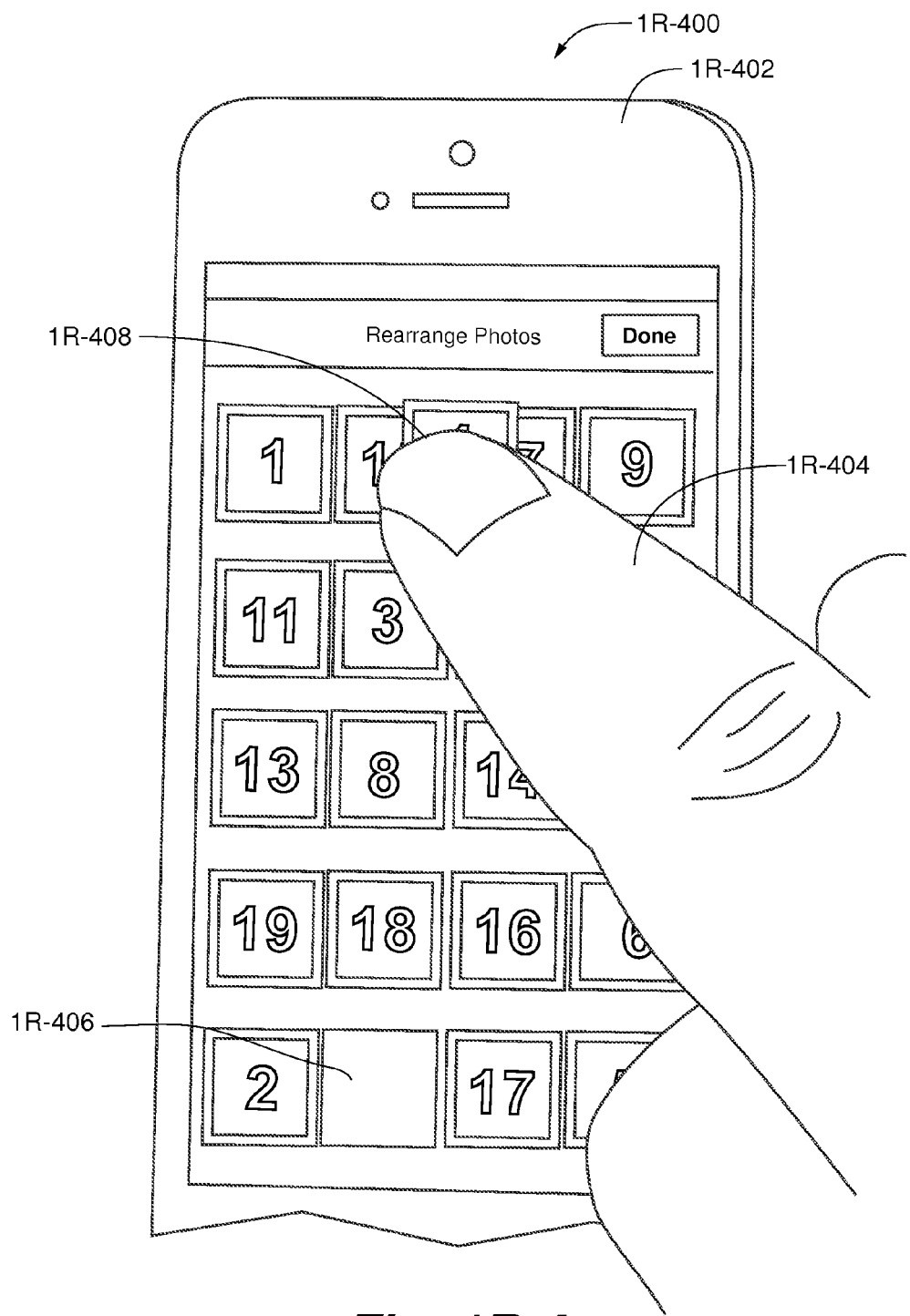
Figures 1, 1R, 2, 3, 4, 5:
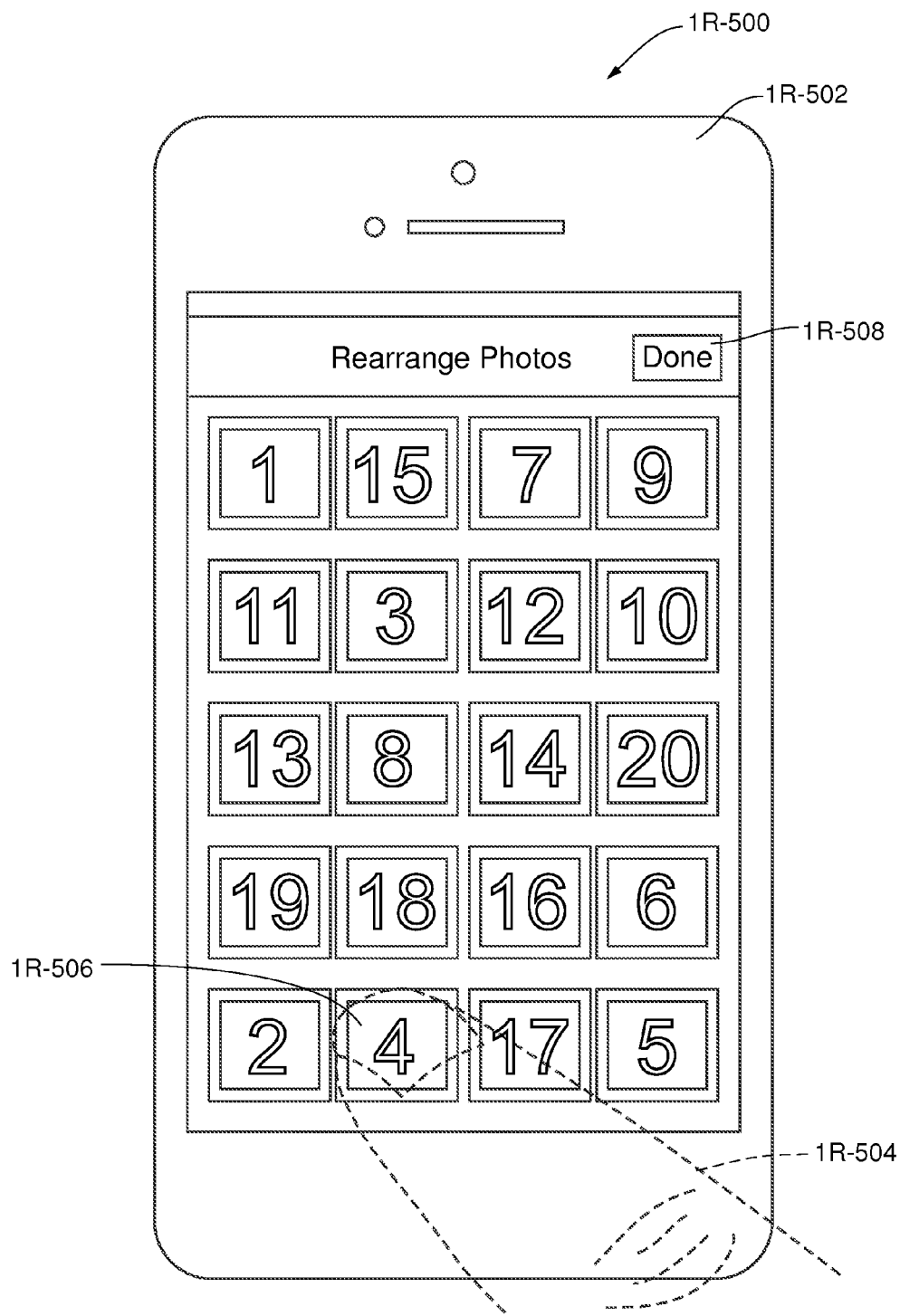
Figures 1, 1R, 2, 3, 4, 5, 6:
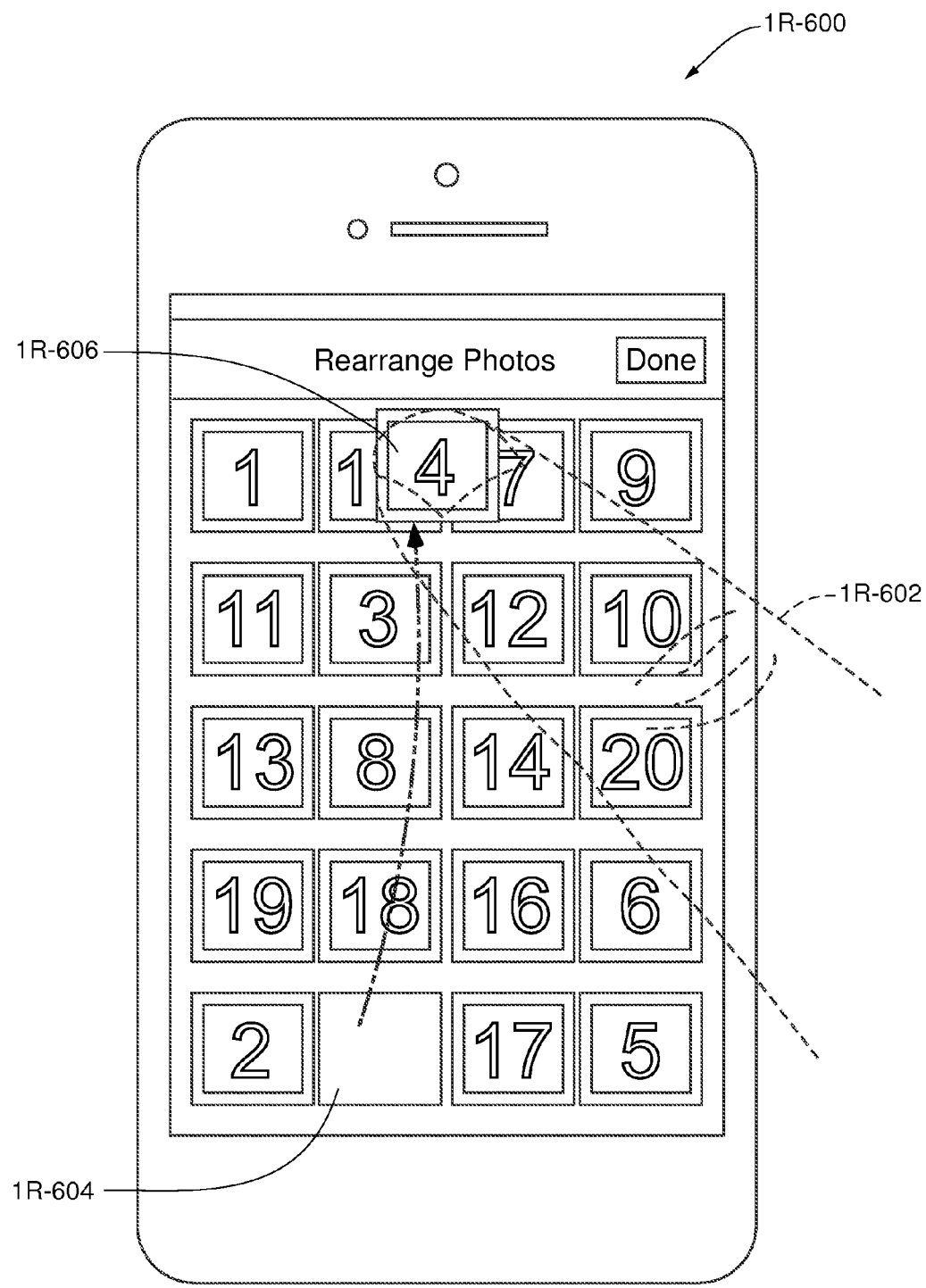
Figures 1, 1R, 2, 3, 4, 5, 6, 7:
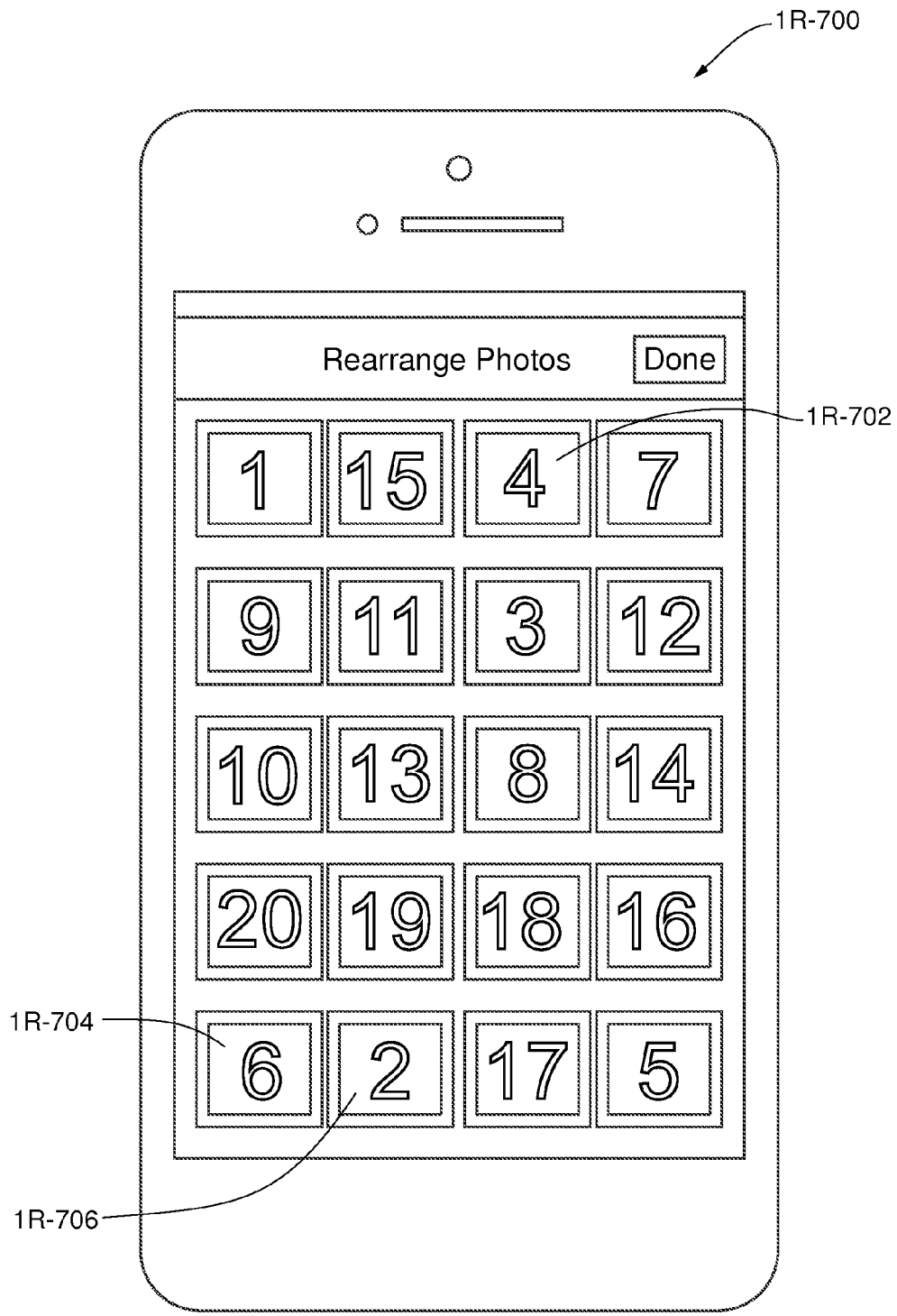
Figures 1, 1R, 2, 3, 4, 5, 6, 7, 8:
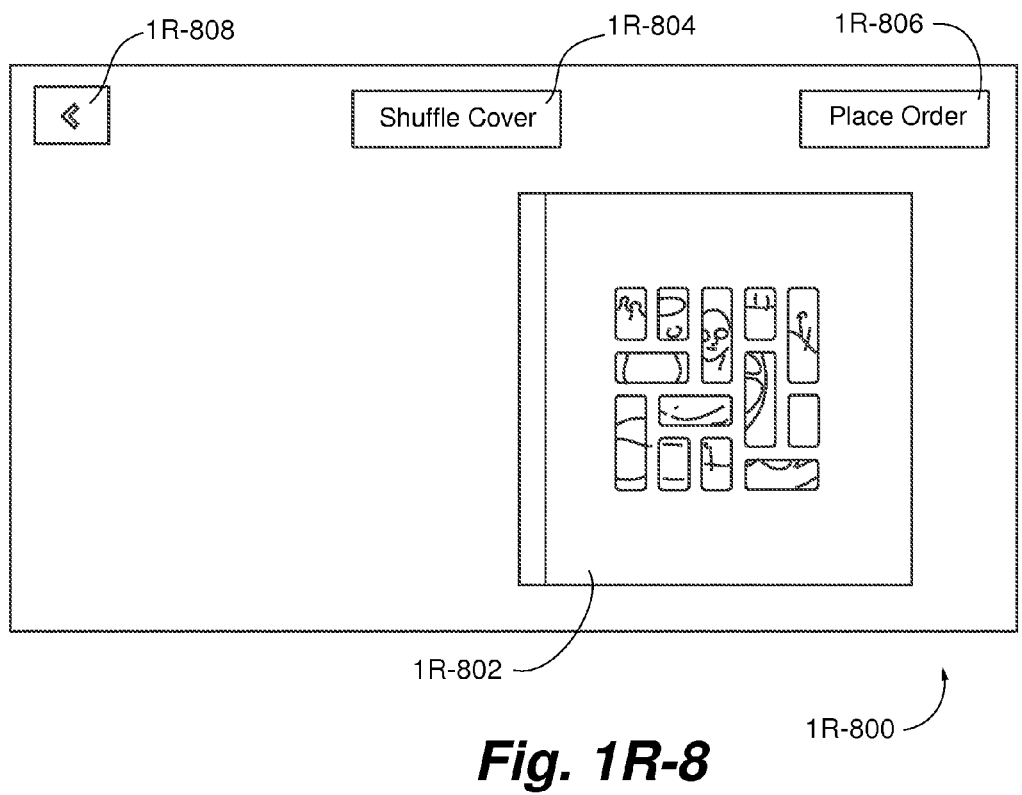
Figures 1, 1R, 2, 3, 4, 5, 6, 7, 8, 9:
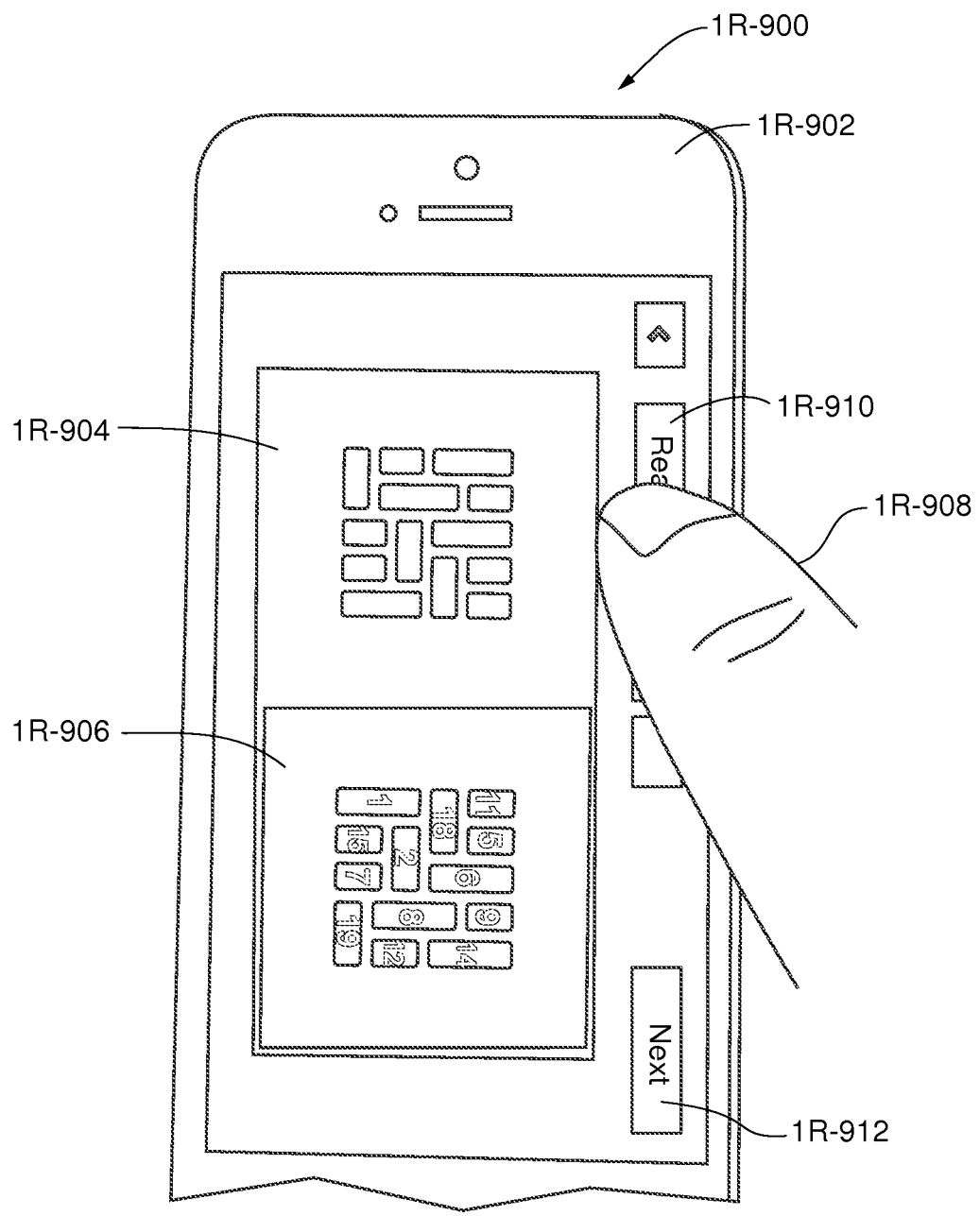
Figures 1, 1R, 2, 3, 4, 5, 6, 7, 8, 9, 10:
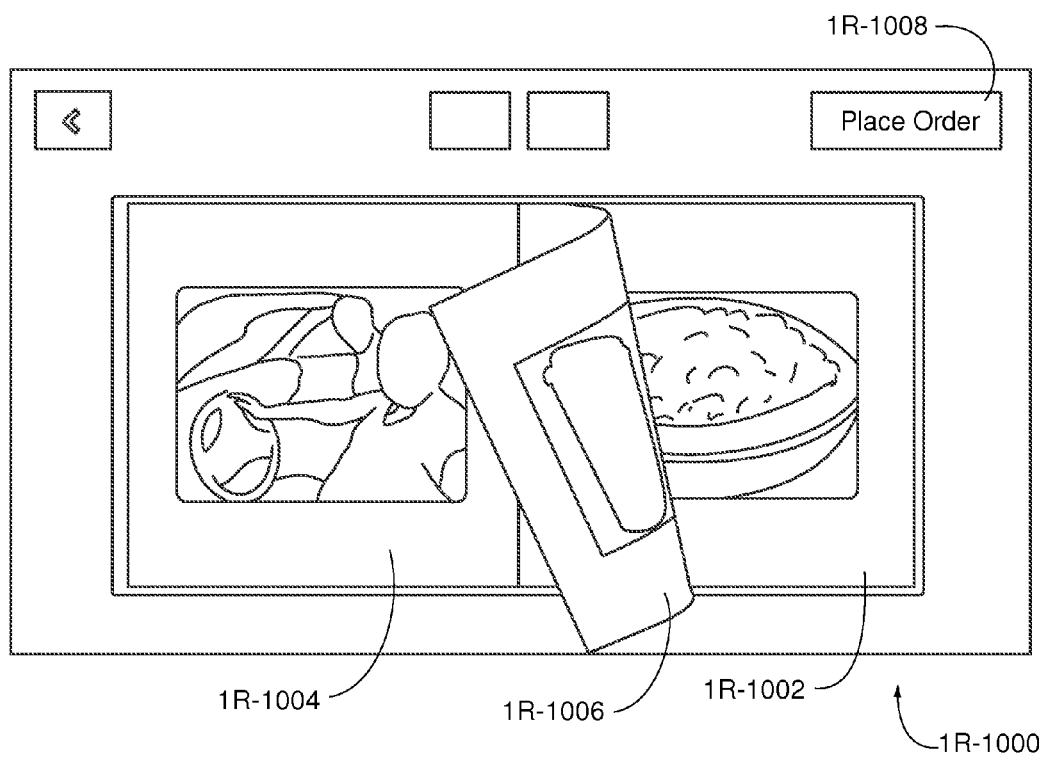
Figure 1S:
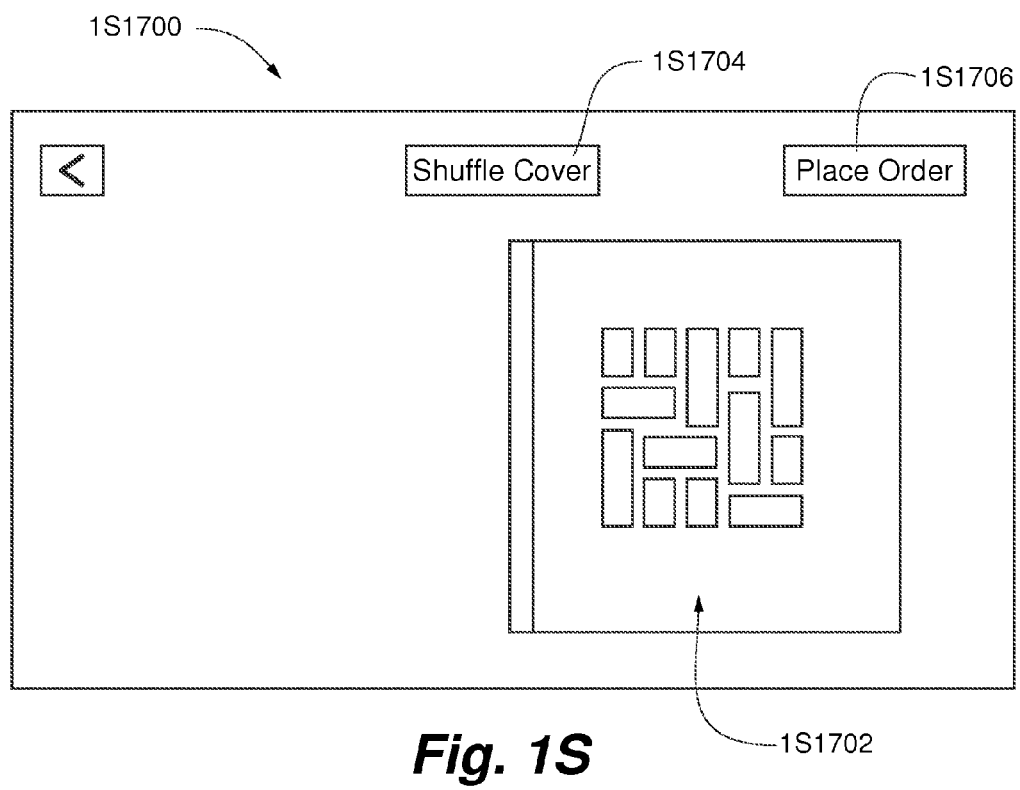
FIG. 1S is a diagram showing a completed project (photobook) in a mobile device, according to one embodiment of the invention.

FIG. 1S is a screenshot embodiment 1S1700 showing a completed photobook (project) at a mobile device, identical to that shown in FIG. 1R-8. A design of a photobook 1S1702 is virtually manifested on the display of a mobile device. A user can shuffle images on a cover design (cover page) by using a soft "Shuffle Cover" button 1S1704. The present invention populates a design of every page or spread of the photobook 1S1702. The photobook 1S1702 is virtually flappable. The user may customize every page of the photobook 1S1702 by using image editing tools provided by the present invention. The user-device or a server may provide image editing tools to the user. Image editing may also be performed by the server as a part of image analysis. After book customizations are completed, the user can proceed to order the photobook by pressing a soft button "Place Order" 1S1706.

Figure 1T:
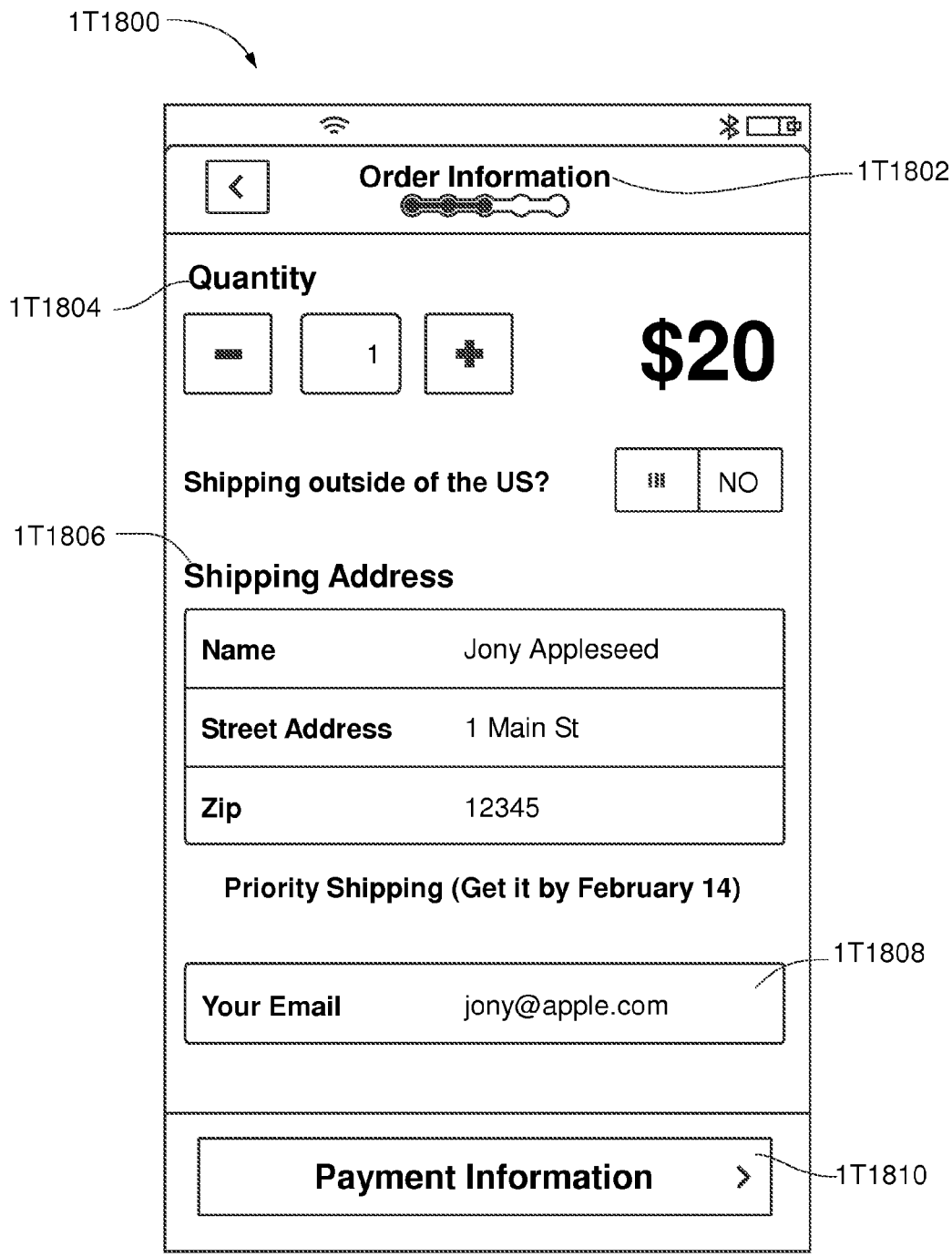
FIG. 1T is a diagram showing a method of ordering a media-based project at a mobile device, according to one embodiment of the invention.

FIG. 1T is a screenshot embodiment 1T1800 showing a method of ordering a project (photobook or book) at a mobile device. Once a user completes a customization of a photobook, an order information 1T1802 is displayed at the mobile device. The user can specify a quantity of the order at the quantity area 1T1804. Price information is also included with the quantity information. The user can enter a shipping address in the area 1T1806, and an email address in the area 1T1808. The user continues a processing of payment for the order by pressing a button payment information 1T1810. The button payment information 1T1810 directs the user to a payment-processing gateway to complete the order.

Figure 1U:
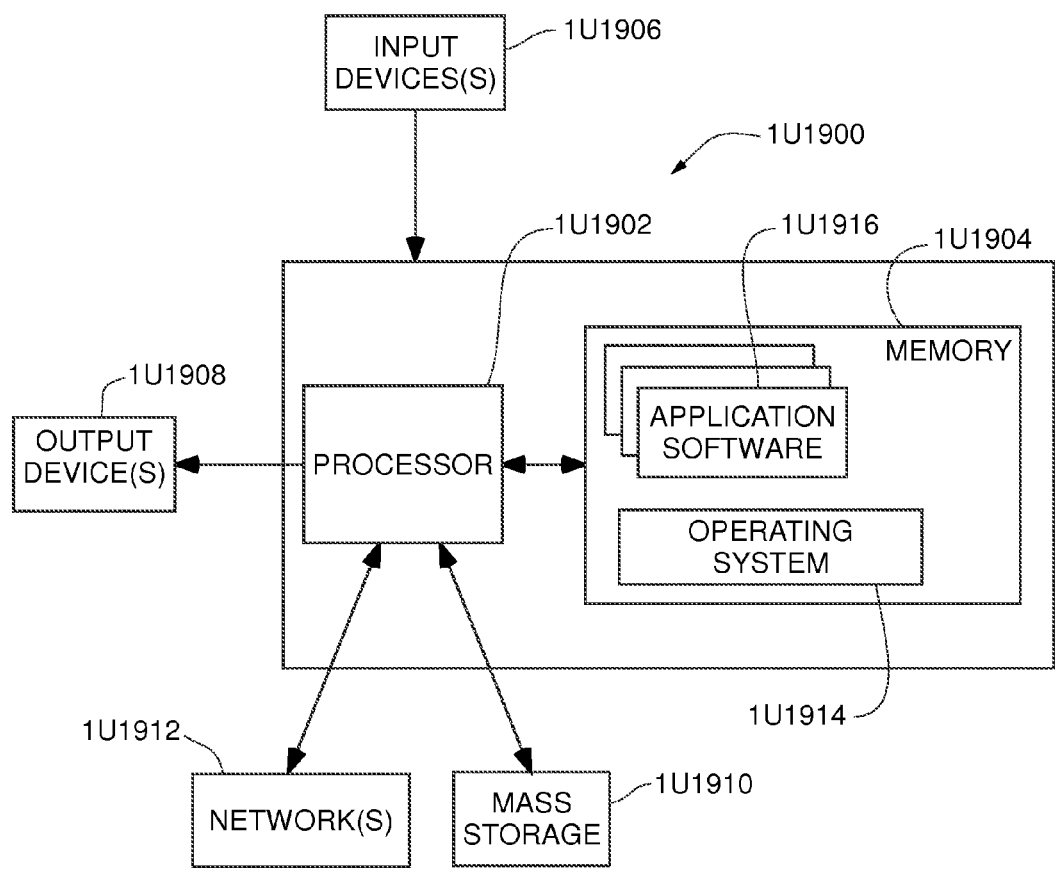
FIG. 1U is a schematic diagram of a user-device, within which the invention may be embodied, according to one embodiment of the invention.

FIG. 1U is an embodiment of a user-device wherein the invention may be practiced. A user-device comprises a processor 1U1902, an operating system 1U1914, an application software 1U1916, a memory 1U1904, at least one input device 1U1906, at least one output device 1U1908, a mass storage device 1U1910, and a network 1U1912. The network 1U1912 comprises a wired or wireless network to communicate to remote servers and databases via the Internet.

Figure 1V:
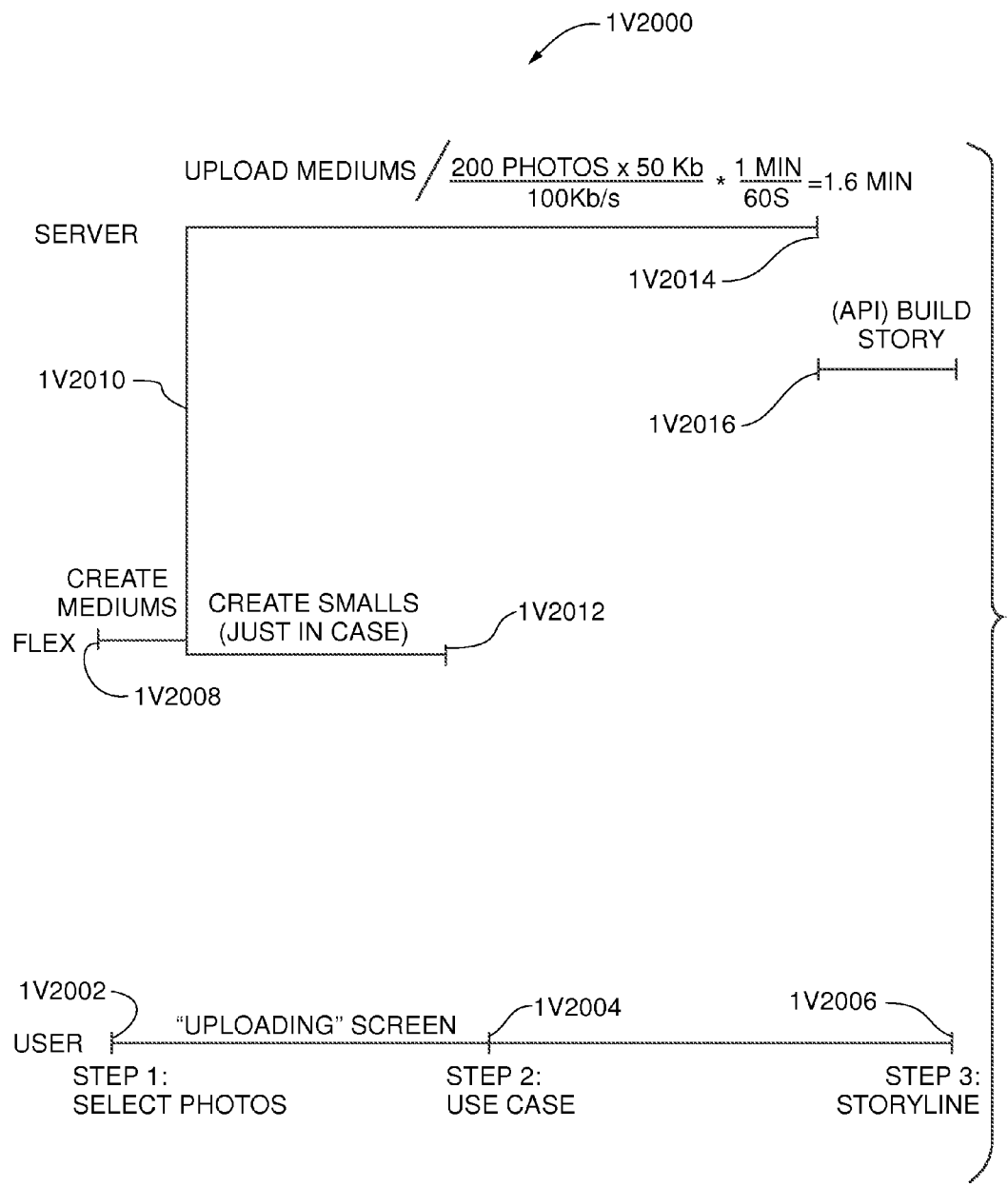
FIG. 1V is a timing diagram showing a timeline of image uploading, according to one embodiment of the invention.

FIG. 1V is a timing diagram 1V2000 showing a method of background uploading of media files. Steps in the embodiment 1V2000 are shown using timelines or progress bars. A user at step 1V2002 selects original photos or images for an upload. Once photos are selected, an uploading screen appears acknowledging the user that the upload is in progress. At step 1V2004, a use case is created to build a project. The use case is created by a server after performing a server-side image analysis. At step 1V2006, the user can further customize the project by adding a storyline or narrative of the project. A person of ordinary skill in the art of image uploading and editing can implement FLEX technology at step 1V2008. FLEX comprises photo-resizing libraries. In one embodiment, once original photos are selected, FLEX creates medium sized photos by resizing the original photos. However, FLEX may also create small sized photos from the original photos. Both the medium sized photos and the small sized photos are uploaded to the server at the step 1V2010. An upload of small sized photos completes at step 1V2012. An upload of the medium sized photos completes at step 1V2014. The small sized photos are uploaded faster than the medium sized photos. Once the upload of medium sized photos completes, at step 1V2016 the FLEX API builds a story or use case. Once a use case or story (by grouping of similar photos) is built, the user can add a storyline or narrative to the project. FLEX and the FLEX API are an exemplary technology that maybe used to implement the embodiment 1V2000 of the present invention. The methods of the present invention are not restrictive to FLEX and the FLEX API.

A use case may be built by feature or object identification of images, geo-location data, and meta-data. For example, when a plurality of images is selected by a user for building a book, images are grouped together by similarity of objects or features. For example, wedding pictures may be grouped together from a plurality of random pictures by identifying the features of wedding, such as a wedding cake or an altar. Facial recognition is another example of feature or object identification that allows a formation of a use case or grouping of pictures together by facial similarity. A use case of a book can allow the program to better prepare a template for the book, for example, a wedding book.

Mixbook Embodiments

Figure 1W:
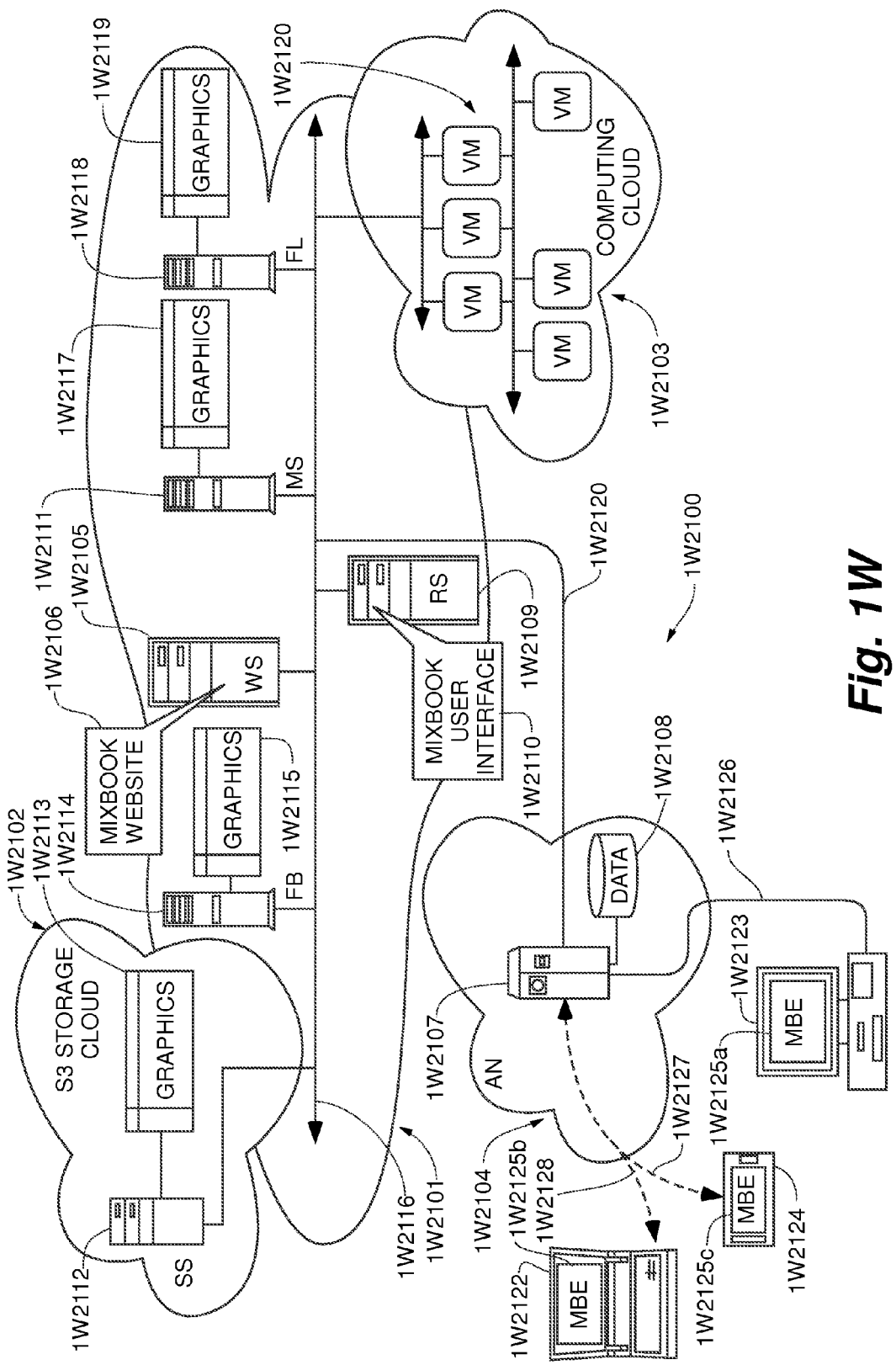
FIG. 1W is an architectural overview of a communications network supporting network-based graphics manipulation and production of media-based products, according to other embodiments of the present invention (these embodiments sometimes known as "MIXBOOK").

FIG. 1W is an architectural overview of a communications network 1W2100 supporting network-based graphics manipulation, and production of media-based products according to embodiments of the present invention (these embodiments sometimes known as "MIXBOOK"). Communications network 1W2100 includes a wide-area-network (WAN). WAN 1W2101 may be a private, corporate, or publicly accessible data network. WAN 1W2101 may be referred to as the Internet 1W2101. The Internet 1W2101 is further illustrated by way of a network backbone 1W2116, which represents all of the lines, equipment, and access points that make up the World Wide Web (WWW) as a whole including any connected sub-networks. Therefore, there are no geographic limits to practice of the present invention.

The Internet backbone 1W2116 supports a web server (WS) 1W2105. It is noted herein that all network-capable computing appliances such as physical computers, servers, and other computing machines discussed in this specification shall be assumed to contain, be coupled to, or otherwise have accessible thereto, one or more digital mediums adapted to contain the data and software required to support and enable the primary function or functions (in the case of multi-task machines) of the computing appliance.

WS 1W2105 is an electronic information server connected to the Internet 1W2101 and adapted to server information pages or web pages as they are known in the art. WS 1W2105 may be maintained by a third party that provides a website hosting service. In one embodiment a service provider providing the service of the present invention owns and maintains WS 1W2105. WS 1W2105 hosts a website 1W2106, through which users may access elements of the present invention. Website 1W2106 is adapted to provide authenticated access to users who create, publish, print, and purchase media-based products such as photo-books, photo-cards, photo-calendars, photo-posters, video-books, video-calendars, video-cards, and related products.

Communications network 1W2100 also includes an access network (AN) 1W2104, which may represent any data network adapted to provide access to the Internet network 1W2101. 1W2104 may be a public-switched-telephone-network (PSTN) or some other public or private telephony network. AN 1W2104 may be a local wireless network, a cellular time division multiple access (CDMA) network, a wireless fidelity (WiFi) network, or any other candidate access network through which one may access the Internet 1W2101.

A user may access WS 1W2105, more particularly MIX-BOOK website 1W2106, through the Internet access facility 1W2107 in access network (AN) 1W2104 and an Internet access line 1W2120. The Internet access facility 1W2107 may be maintained and operated by an Internet service provider (ISP) or by a wireless Internet service provider (WISP), whichever is appropriate for any particular Internet connection. Users who might access WS 1W2105 are represented herein as network-capable computing appliances, more particularly, a laptop computer 1W2122, a desktop computer 1W2123, and a smart telephone 1W2124. Each mentioned appliance may be assumed to be Internet-capable by way of one or more network browsing applications residing thereon and executable there from.

Desktop computer 1W2123 is connected to an Internet-connection server 1W2107 by way of an Internet access line 1W2126. Desktop computer 1W2123, once connected, may access website 1W2106 hosted on WS 1W2105. Desktop computer 1W2123 has one or more input devices (not illustrated) coupled thereto such as a keyboard, a mouse, and a microphone for (Speech-to-Text Commands). Smart phone 1W2124 may connect wirelessly via a wireless link 1W2127 to an Internet service provider (also represented by machine 1W2107) that establishes a wireless Internet connection like public WiFi for example. Smart phone 1W2124 may or may not include a keyboard input device. In one embodiment smartphone 1W2124 has a touch-screen display. Laptop 1W2122 is illustrated as connected wirelessly to the Internet 1W2101 via WISP 1W2107 using wireless link 1W2128. Laptop 1W2122 includes a keyboard and/or other input devices as may be appropriate.

Laptop 1W2122, desktop 1W2123, and smartphone 1W2124 each include an Internet browser application (not illustrated) for accessing and navigating network 1W2101. Backbone 1W2116 supports a runtime server (RS) 1W2109 adapted to host a MIXBOOK user-interface 1W2110. User interface 1W2110 is accessible to all website visitors for the purpose of creating, manipulating, and printing media-based products such as a photo collage book, for example. Users accessing website 1W2106 who are ready to create a product may be re-directed to RS 1W2109.

Each user authorized to create and publish a media-based product using the site may receive a small download containing a compact editing package known as the MIXBOOK editor ("MBE") in some embodiments. MBE 1W2125a is installed as a browser-based extension or plug-in in one embodiment on desktop computer 1W2123. Laptop 1W2122 has an instance of MBE 1W2125b installed as a browser-based extension or plug-in. Smartphone 1W2124 has an instance of MBE 1W2125c installed as a browser-based extension or plug-in. An instance of MBE may be customized for any computing appliance that may access the Internet and through which a user may see and edit content. Therefore, MBE instances 1W2125 (a-c), though the same basic extension or plug-in, may contain differences based on host requirements. In one embodiment of the present invention there are no software downloads required in order to practice the present invention. In this case the MIXBOOK editing SW may be server hosted only. In another embodiment, the MIXBOOK editing SW may be ported to a desktop application such as ADOBE AIR and thus be operated as a desktop application. In one embodiment the SW is included as an add-on feature to any suitable desktop application and may be installed on a computing host with that desktop application from a removable medium such as a CD ROM, for example.

Service provider facility 1W2107 includes a connected data repository 1W2108. Data repository 1W2108 contains all of the customer contact and billing information for the Internet service provider. One with skill in the art will appreciate many possible Internet connection schemes. It is preferred in most embodiments that users have a high speed Internet connection for the purpose of manipulating and editing graphics, which can be bandwidth intensive. The inventors provide one or more innovative solutions for saving bandwidth while editing images and image products online making the entire experience more efficient and easier for users practicing the invention.

The MIXBOOK website 1W2106 establishes a community-based portal and social interaction site that revolves around creating, editing, sharing publishing, printing, and purchasing media-based products created online by one or more user working in collaboration together. Users such as those operating appliances 1W2122-1W2124 connect online and navigate to WS 1W2105 to access website 1W2106. When any user determines to create a media-based product like a photo album, for example, the user is directed to an appropriate portal server like RS 1W2109 hosting MIXBOOK user interface (UI) 1W2110. UI 1W2110 is adapted to provide all of the assets needed to create and publish complete image and/or text-based products. Media-based products created through website 1W2106 include products containing images uploaded by one or more authorized users. Any work in progress or completed is termed a project. A project may be initiated by one user whereby other users are then invited by the initiating to join the creative experience in collaboration, and those users may contribute their own photos to the project. Such a project may be published for viewing by all or some of the community. Finished projects may be printed and distributed as "hard products" available for purchase by members of the community.

In one embodiment, a persistent storage of graphics uploaded by community members to be included into projects is obtained (leased) through a third-party storage provider. In this example, a simple storage service (S3) data storage cloud 1W2102 is illustrated and made available for use by a third-party service provider such as AMAZON. A storage server 1W2112 is illustrated within S3 cloud 1W2102 and has connection to the Internet backbone 1W2116. SS 1W2112 may be one of many servers including associated mass data repositories connected to SS 1W2112 such as repository 1W2113 contained within storage cloud 1W2102. In this logical representation all of the graphics (images or photos) that are uploaded to insert into projects are stored in a repository such as repository 1W2113 in storage cloud 1W2102. Repository 1W2113 may be an optical, magnetic, or some other type of data storage facility. In one embodiment, mass computations required for real-time and transparent editing and collaborating on multiple projects are performed by virtual machine instances 1W2120 in a computing cloud 1W2103. In another embodiment, the service host may maintain one or more powerful computing machines and storage devices for performing computations and for storing graphics for users of the service.

In use of the present invention a user operating one of computing appliances 1W2122-1W2124 connects online and accesses MIXBOOK website 1W2106 and logs into the site. If the user has already registered and created a project, a web page personalized to that user is served that includes all of that user's projects in the latest states of progress. The user may enter any project for which she or he has authorization to contribute to, and may review, edit, or otherwise work the project. Photos uploaded by the user to include into projects may be stored in cloud 1W2102 and served to the projects when needed by the system. Any computing such as editing, resizing, alterations, and so on may be handled in cloud 1W2103. A user may, through website 1W2106, authorize other users registered with the service of the invention to collaborate on a project initiated by that user. In one embodiment, a user having a project initiated may invite other potential users to the site so they may, with permissions, enter the site and collaborate with that user.

In one embodiment of the present invention, photos that are stored on the Internet can be represented in any online project provided the user has authorized access to those photos. For example, a user who has one or more accounts to third-party social interaction networks like FACEBOOK, MYSPACE, PHOTOBUCKET, FLICKR, or similar sites may use photos of registered friends that they are allowed to access in their own personal projects. These photos do not have to be uploaded to the service of the present invention. Rather, these photos can be accessed from their present storage locations anywhere on the Internet provided that the storage system is online.

The Internet backbone 1W2116 supports a FACEBOOK server (FB) 1W2114 coupled to a data repository 1W2115 for storing images and other graphics. The Internet backbone 1W2116 supports a MYSPACE server (MS) 1W2111 coupled to a data repository 1W2117 adapted to store images and other graphics. Backbone 1W2116 supports a FLICKR server (FL) 1W2118 coupled to a data repository 1W2119 adapted to store images and other graphics. Any of these images can be served to an active project by the respective servers directly from their storage locations. Any of these images that are altered during project work or collaboration may be subsequently saved to third-party S3 storage cloud 1W2102 in repository 1W2113 controlled by SS 1W2112.

In one embodiment of the present invention, MIXBOOK website 1W2106 includes or has working access to a SW print engine (not illustrated here) that is adapted to render any MIXBOOK project for professional printing. In one embodiment, printing is performed by a third-party provider who may also ship and/or distribute finished products for a price. In one embodiment, a user may access the service through Website 1W2106 and may initiate and complete a project that will be printed for that user for a static price for that particular product.

It is noted herein that a project created on MIXBOOK may be efficiently gathered for print in virtually any print format. Likewise, content originally laid out in one format or aspect ratio may be efficiently converted to another layout before printing in an automated process that incorporates the typical size and layout changes necessary to convert from one layout to another automatically. Furthermore, content assembled for a particular layout and product type may be automatically converted for print output in another layout and product type.

The disclosed embodiments improve upon the problems with the prior art by providing a system that allows for quick and easy creation of media-based projects over a communications network. The disclosed embodiments leverage the reduced costs of processing units in most servers and computers to provide various functions over a communications network to automate, either fully or partially, the process of creating a media-based project over the Internet. The disclosed embodiments automate the processes normally undertaken by users creating photo-based projects online, such as sorting through photos, removing the photos that are not adequate or properly focused, choosing the correct photos, grouping photos together by topic or location, ordering the photos by chronological order, and cropping or focusing photos on the relevant portions of the photos. Thus the disclosed embodiments reduce the amount of time required by users to create a photo-based project.

Further, the disclosed embodiments automate the corrections or modifications normally performed by users creating photo-based projects, such as correctly orienting photos, re-coloring photos or performing a color correction on the photos, removing red-eye from the eyes of photo subjects, and correcting the photos for brightness or contrast. This eliminates the requirement that the user must open a special program or app to perform the correction or modification, thereby removing the time-consuming and frustrating nature of these steps when performed manually. The disclosed embodiments are further beneficial because, due to their timesaving nature, they reduce the number of users that drop off or discontinue the photobook creation process before completing a purchase.

Auto-Creation of Projects Utilizing Use Case Data

Figure 2A:
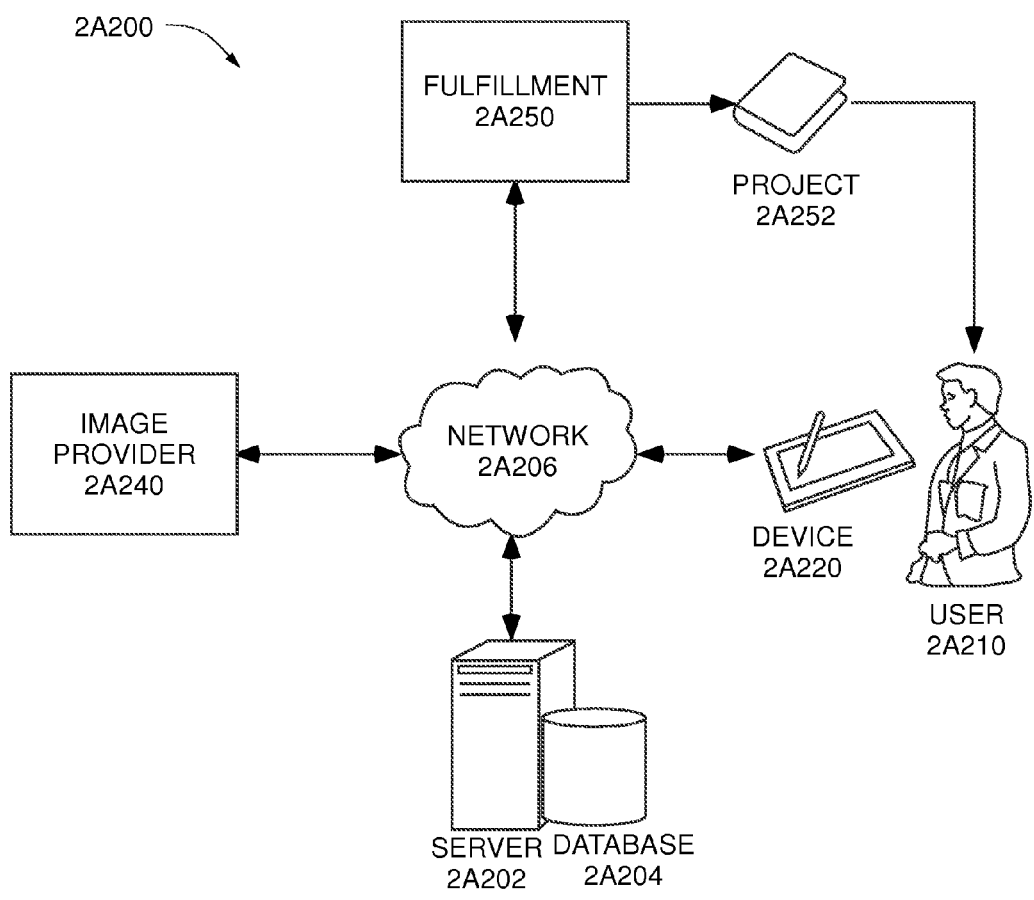
FIG. 2A is a block diagram illustrating a network architecture of a system for facilitating a creation of photo-based projects over a communications network, in accordance with one embodiment of the present invention.

FIG. 2A shows an illustration of a block diagram showing a network architecture of a system 2A200 and method for facilitating the creation of photo-based projects over a communications network in accordance with one embodiment. FIG. 2A shows various components coupled with network 2A206, which can be a circuit switched network, such as the Public Service Telephone Network (PSTN), or a packet switched network, such as the Internet or the World Wide Web, the global telephone network, a cellular network, a mobile communications network, or any combination of the above. A prominent element of FIG. 2A is the server 2A202 associated with a data repository or server-side database 2A204 and further coupled with network 2A206. Server 2A202 collects, processes and manages data from the users 2A210 and further manages the server-side database 2A204, which holds the master copy of data that is served to fulfillment entity 2A250 and client device 2A220. FIG. 2A further includes user 2A210 and his or her client computing device 2A220, which may be a desktop computer, a common computer terminal, or mobile computing devices such as smart phones, mobile phones, tablet computers, handheld computers, laptops, or the like.

FIG. 2A shows an embodiment of the present invention wherein networked client computing device 2A220 interacts with server 2A202 and server-side database 2A204 over the network 2A206. Server 2A202 may comprise one or more servers, workstations, desktop computers, computer terminals, workstations, mainframes, mobile computing devices, smart phones, mobile phones, handheld computers, laptops, or the like. Server 2A202 and client computing device 2A220 include program logic comprising computer source code, scripting language code, or interpreted language code that may be compiled to produce an executable file or computer instructions, or that may be interpreted at runtime, wherein the computer source code performs various functions of the present invention. Server 2A202 may include a software engine that executes applications as well as delivers applications, data, program code, and other information to networked computing devices, such as device 2A220. FIG. 2A further shows a database or repository 2A204, which may be a relational database comprising a Structured Query Language (SQL) database stored in a SQL server. The repository 2A204 serves data from a database, which is a repository for data used by server 2A202 and device 2A220 during the course of operation of the invention. Database 2A204 may be distributed over one or more nodes or locations that are connected via network 2A206. The database 2A204 may include user account records, user records, and multimedia records that include images, video, audio and like.

It should be noted that although FIG. 2A shows only one server 2A202, one database 2A204, one client device 2A220, and customer 2A210, the system of the present invention supports any number of servers, databases, client devices, and customers connected via network 2A206. Also note that server 2A202 is shown as a single and independent entity; in one embodiment, the functions of server 2A202 may be integrated with another entity, such as one image provider 2A240, fulfillment entity 2A250, device 2A220, and/or the database 2A204. Further, server 2A202 and its functionality, according to a preferred embodiment, can be realized in a centralized fashion in one computer system or in a distributed fashion wherein different elements are spread across several interconnected computer systems.

FIG. 2A further shows fulfillment party 2A250, which performs product fulfillment or order fulfillment services, i.e., the process of fulfilling the obligation of server 2A202 (or the entity represented by server 2A202) to send user 2A210 one or more photo-based project products 2A252 that the customer has ordered, purchased, or requested from the server 2A202 (or the entity represented by server 2A202). Fulfillment party 2A250 may receive orders for the photo-based project products, print the photo-based project products, bind the photo-based project products, package the products, and then ship the ordered products 2A252 to the end customer, such as user 2A210. In the course of a transaction, the server 2A202 may interface with fulfillment party 2A250 to effectuate the delivery of purchased products to the customers after payment has been effectuated. Note that although fulfillment party 2A250 is shown as a single and independent entity, in one embodiment of the present invention, the functions of fulfillment party 2A250 may be integrated with another entity, such as server 2A202. Further, the functionality of fulfillment party 2A250 may be realized in a centralized fashion in one computer system or in a distributed fashion wherein different elements are spread across several interconnected computer systems.

Figure 2B:
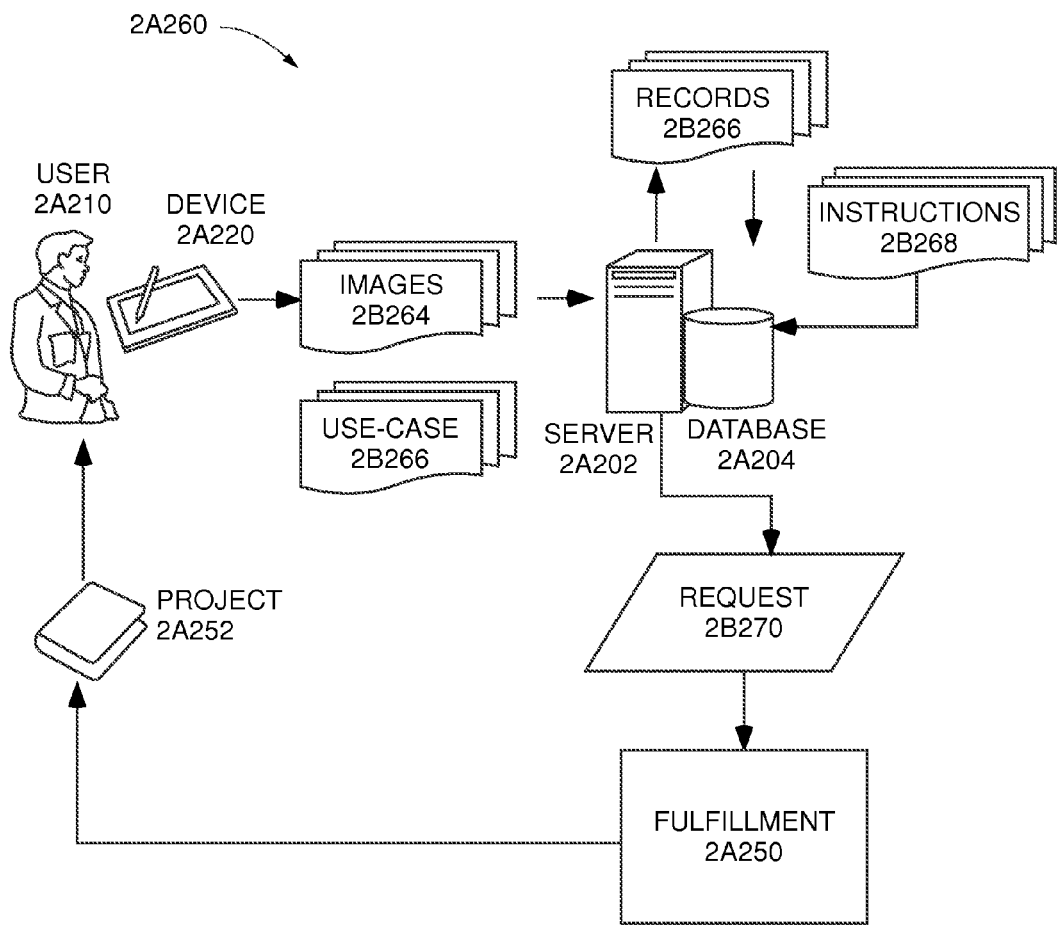
FIG. 2B is a block diagram illustrating a data flow of the system for facilitating the creation of photo-based projects over a communications network, in accordance with one embodiment of the present invention.
Figure 2C:
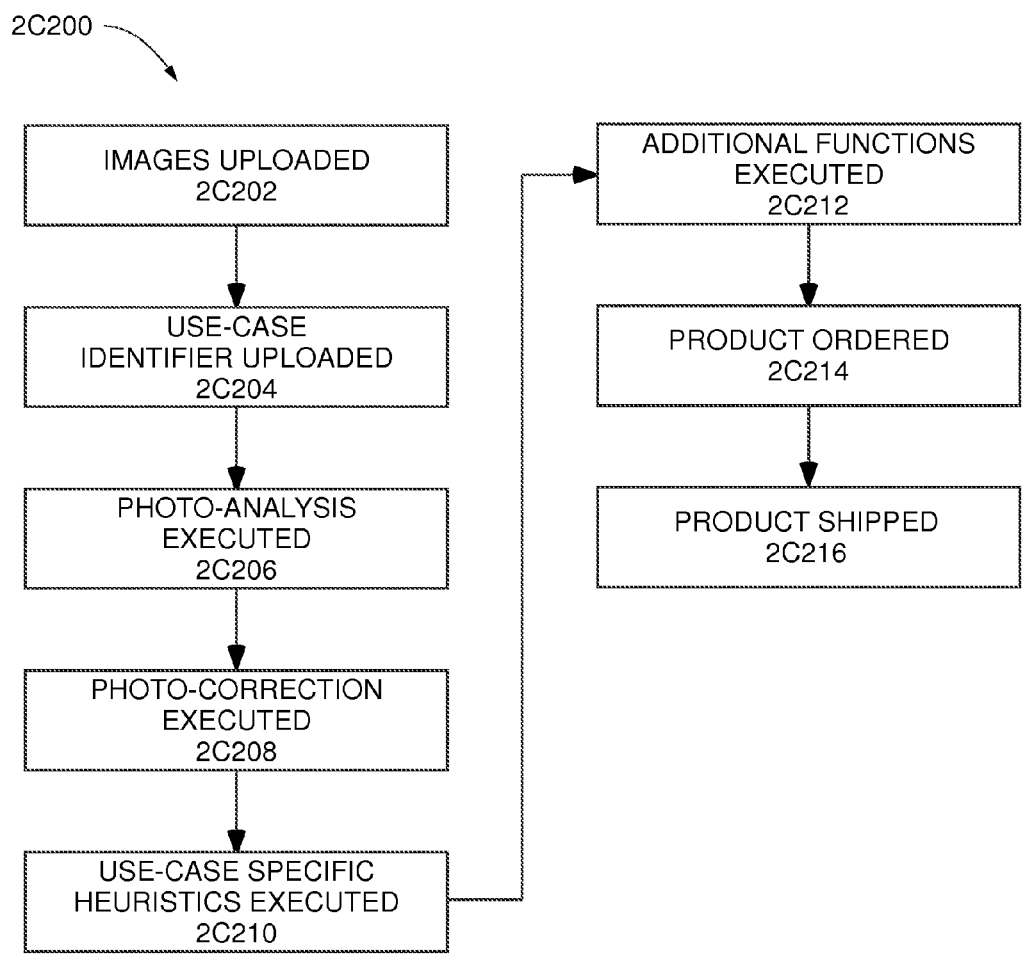
FIG. 2C is a flowchart depicting a general control flow of the process for facilitating access to a large data store over a communications network, according to an embodiment of the present invention.

FIGS. 2B to 2C depict, among other things, the data flow (2A260) and control flow (2C200) in the process for facilitating the creation of photo-based projects over a communications network 2A206, according to one embodiment. The process 2C200 of the disclosed embodiments begins with step 2C202, wherein the user 2A210 provides, via his or her device 2A220 over the network 2A206, at least a plurality of images or photos 2B264 to the server 2A202 for storage in the database 2A204. In one embodiment, the images or photos 2B264 are provided to server 2A202 via a graphical user interface executing on the device 2A220. In another embodiment, the images or photos 2B264 are provided to server 2A202 for storage in the database 2A204 via TCP/IP and/or HTTP over network 2A206. Subsequently, server 2A202 stores the images or photos 2B264 in the database 2A204 as records 2B266. In one embodiment, the records 2B266 are stored in association with an identity for user 2A210 or in association with a user record for user 2A210.

Next, in step 2C204, the user 2A210 provides, via his device 2A220 over the network 2A206, a use-case identifier 2B266 to the server 2A202 for storage in the database 2A204. In one embodiment, the use-case identifier 2B266 is provided to server 2A202 via a graphical user interface executing on the device 2A220. In another embodiment, the use-case identifier 2B266 is provided to server 2A202 for storage in the database 2A204 via TCP/IP and/or HTTP over network 2A206. Subsequently, server 2A202 stores the use-case identifier 2B266 in the database 2A204 in association with records 2B266. In one embodiment, the use-case identifier 2B266 is stored in association with an identity for user 2A210 or in association with a user record for user 2A210.

In the following step 2C206, various photo analysis processes may be executed on the images or photos 2B264 stored in the database 2A204 as records 2B266, at the direction of the user 2A210 via input provided via a graphical user interface executing on the device 2A220. The photo analysis processes comprise identifying similar images, identifying faces in the images, identifying objects in the images, identifying undesirable images, and identifying relevant portions of the images. The identification of faces and objects may be accomplished via object recognition and face recognition libraries. The identification of similar images may be accomplished via an analysis and comparison of color, focus, brightness, faces, objects and the like in each image, as described in greater detail below. The identification of undesirable images may be accomplished by identifying images that are out of focus or contain too little light for a proper exposure. For blurry photos, edge detection may be used to detect any sharp edges, if any. The identification of the relevant portions of an image may be accomplished by identifying the relevant portions of an image, such as faces and objects that may have been recognized. By applying saliency filters, a bounding box may be drawn around a focus of an image. Thus, if the relevant faces or objects are located on the sides of the image, the image may be zoomed or cropped to highlight the identified relevant area. The photo analysis processes may further include identifying images with an incorrect orientation, identifying images with incorrect color, brightness or contrast, and/or identifying images with red-eye.

In the following step 2C208, various photo correction processes may be executed on the images or photos 2B264 stored in the database 2A204 as records 2B266, at the direction of the user 2A210 via input provided via a graphical user interface executing on the device 2A220. The photo correction processes comprise: orienting images that have been identified as having an incorrect orientation to an appropriate orientation, adjusting images that have been identified as having an incorrect color, brightness or contrast to the correct color, brightness or contrast, and removing red-eye from images that have been identified as having red-eye.

In the following step 2C210, various use-case specific heuristics may be executed on the images or photos 2B264 stored in the database 2A204 as records 2B266, based on results of said photo analysis, at the direction of the user 2A210 via input provided via a graphical user interface executing on the device 2A220. The use-case specific heuristics comprise: grouping images that have previously been found to be similar, grouping images having identical or similar faces (based on the faces that were previously identified), grouping images having identical objects (based on the objects that were previously identified), removing undesirable images (based on the images that were previously identified as undesirable), and cropping images to highlight relevant portions of said images (based on the relevant portions of images that were previously identified).

In executing the use-case specific heuristics, heuristics that correspond to the use-case identifier 2B266 are utilized. Different use-cases may require different heuristics. For example, a use-case identifier 2B266 that identifies a wedding would result in heuristics that: group images having the faces of the bride and groom (based on the faces that were previously identified), group images having the wedding cake or the altar (based on the objects that were previously identified), and crop images to highlight portions of said images having the faces of the bride and groom (based on the relevant portions of images that were previously identified). Instructions 2B268 in database 2A204 may instruct server 2A202 on which heuristics correspond to each potential use-case identifier 2B266 provided by user 2A210.

As an example, with regard to grouping images having the faces of the bride and groom (based on the faces that were previously identified), using face detection, identifiers may be applied to each face to determine, for example, that person A shows up in 85% of the photos, person B shows up in 73% of the photos, and person C shows up in 20% of the photos. Therefore, person A and B are most likely the bride and groom.

In the following step 2C212, various additional functions may be executed on the images or photos 2B264 stored in the database 2A204 as records 2B266, at the direction of the user 2A210 via input provided via a graphical user interface executing on the device 2A220. The additional functions may comprise: reading embedded date or location metadata from the images, performing a lookup of additional location data based on the embedded location metadata, and generating text boxes to be printed below said images upon creation of the photo-based project 2A252. The additional functions may also include ordering the images or photos 2B264 stored in the database 2A204 in chronological order, based on the time the images were taken or created.

In one example of the execution of the process of step 2C212, the server 2A202 reads an image in EXIF format, a standard that specifies the formats for images and ancillary tags used by digital cameras (including smartphones), scanners and other systems handling image files recorded by digital cameras. The EXIF format may store date and time information of the image, camera settings of the image, thumbnails of the image, descriptions of the image, and copyright information for the image. In this example, the server 2A202 may read the location for the image from the file and generate a text box reflecting said location to be printed below said image upon creation of the photo-based project 2A252. In another example, the server 2A202 may read the location for the image from the file (in a GPS coordinate format), perform a lookup to find a corresponding text string that matches the GPS coordinate, and generate a text box having said text string to be printed below said image upon creation of the photo-based project 2A252. In this example, the server 2A202 may read the date and time for the images from their files and place the images or photos 2B264 in chronological order, based on the time the images were taken or created.

In the following step 2C214, the creation process is concluded and the resulting photo-based project product is ordered, at the direction of the user 2A210 via input provided via a graphical user interface executing on the device 2A220. In this step, the server 2A202 sends a request 2B270 to the fulfillment party 2A250 for the photo-based project product 2A252. In the following step 2C216, the fulfillment party 2A250 receives the request 2B270 for the photo-based project product 2A252, prints the photo-based project product, binds the photo-based project product, packages the product, and then ships the ordered product 2A252 to the end customer, such as user 2A210.

Figure 2D:
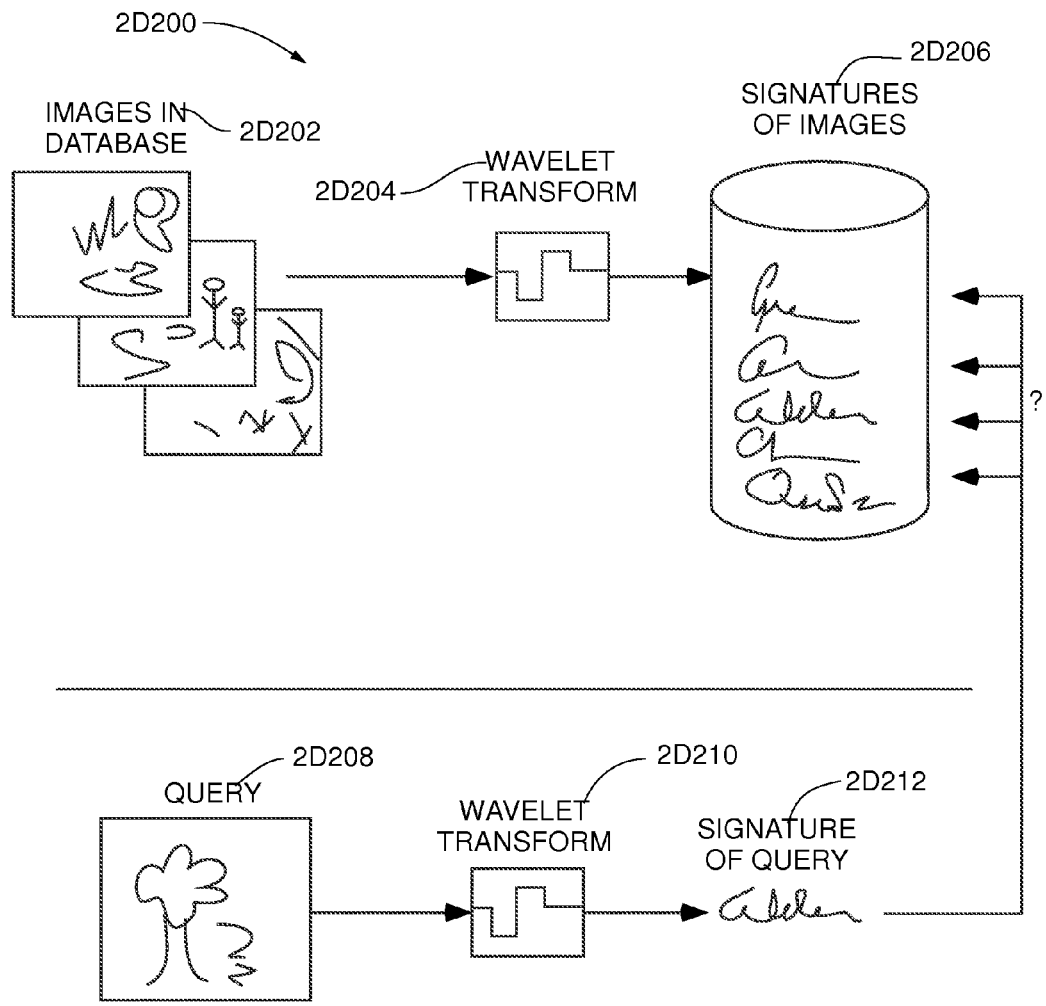
FIG. 2D is an illustrative flowchart of an image analysis process, according to one embodiment of the present invention.

FIG. 2D shows an illustrative image analysis or photo processing process according to one embodiment of the invention. The image analysis process shown in FIG. 2D is illustrative only, and is not intended to be limiting. Various other image analysis processes, some of which are described later, are also within the scope of the present invention. This image analysis process describes an image similarity detection process, as illustrative of the image analysis processes that are useable with the present invention.

In one illustrative image analysis process shown in FIG. 2D, the process 2D200 examines the images for similarity by expressing a query to the image database 2D202 (all of the images) by requesting images that are similar to one of the images (query image 2D208). The process considers basic shape and color information of the photo when looking through the database for potential matches of similar photos. Several factors make this matching process difficult. The query image is typically different from the target image, so the retrieval method must allow for some distortions. Since these are natural photos taken in natural environments, the photos may suffer artifacts such as color shift, poor resolution, dithering effects, and mis-registration. Furthermore, it is important to perform the retrieval fast enough to not hamper user experience of the media-product creation process.

When the images are first received by the server, a wavelet transform 2D204 is performed on every image in the image database 2D202. By collecting just the few largest coefficients from this transform, the process distills a small "signature" for each of the images. These signatures are saved in a signature database 2D206 so that it is computationally efficient to compare them all to each other.

When the process 2D200 requires photo(s) of similarity to a given query image 2D208, the process performs a wavelet transform 2D210 on the query image 2D208 to produce a signature 2D212 for the given query image 2D208. This query signature 2D212 is compared to the signatures of the database images 2D206, and the best matches are retrieved by the process 2D200 for use in automatically creating, organizing, and presenting the media-based project to the user.

The wavelet transform is used to analyze functions at different levels of detail; it is somewhat similar to the Fourier transform, but encodes both frequency and spatial information. By saving the few largest wavelet coefficients for an image (and throwing away all of the smaller coefficients), it is possible to recover a fairly accurate representation of the image. This property may be exploited for efficiency gains to optimize image similarity comparisons. For example, a wavelet transformed image ("signature") that incorporates 400 coefficients would require about 3% as much disk space as the original image. In one embodiment, it is possible to take a wavelet transform and keep just a few (for example, 20) coefficients for each color channel and distill from them a small "signature" for each image. Because the signature is so small, it permits very fast searching in the database.

Additional Mixbook Embodiments

Figure 2E:
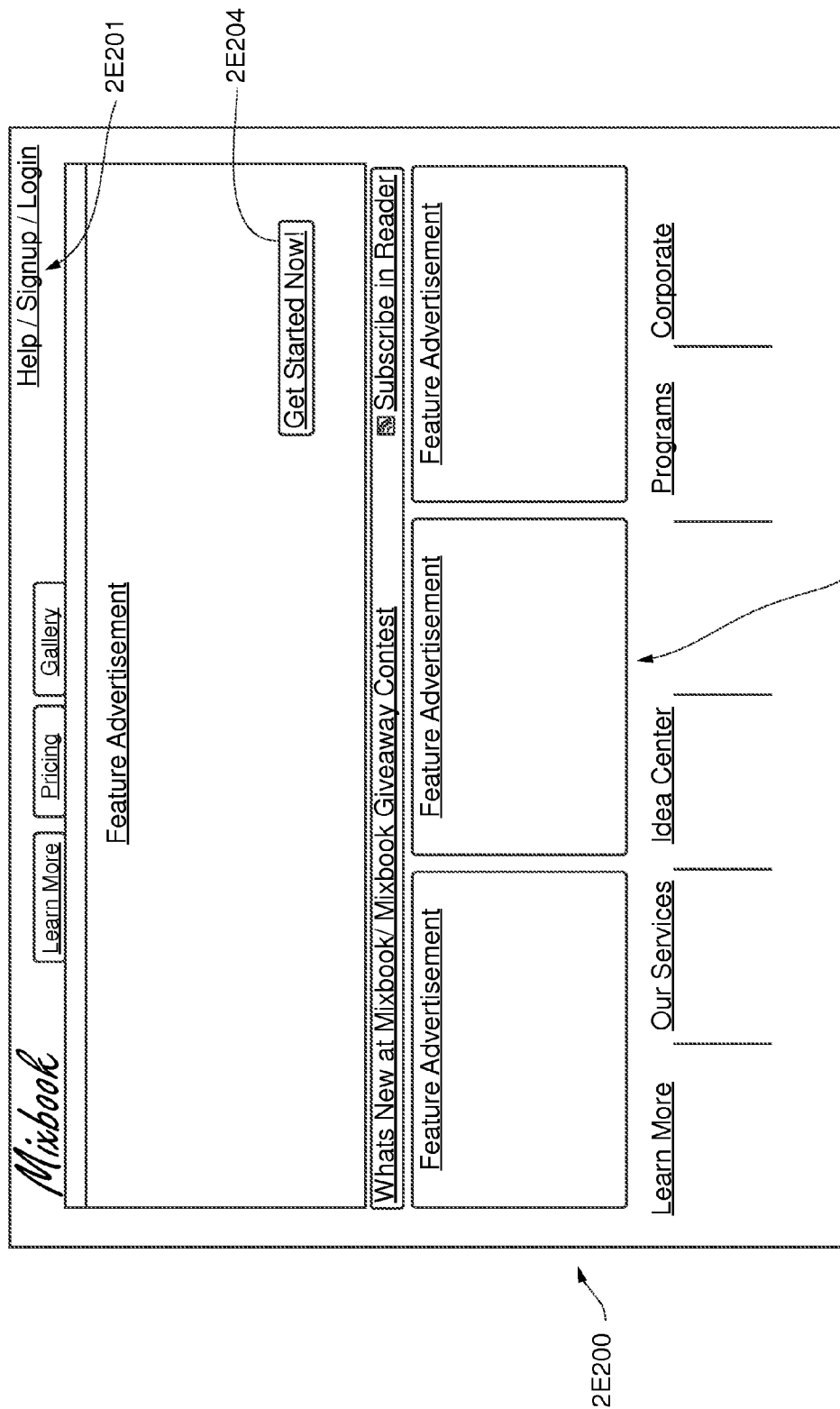
FIG. 2E is an exemplary screen shot of an introduction page of the website of FIG. 1W, according to an embodiment of the present invention.
Figure 3:
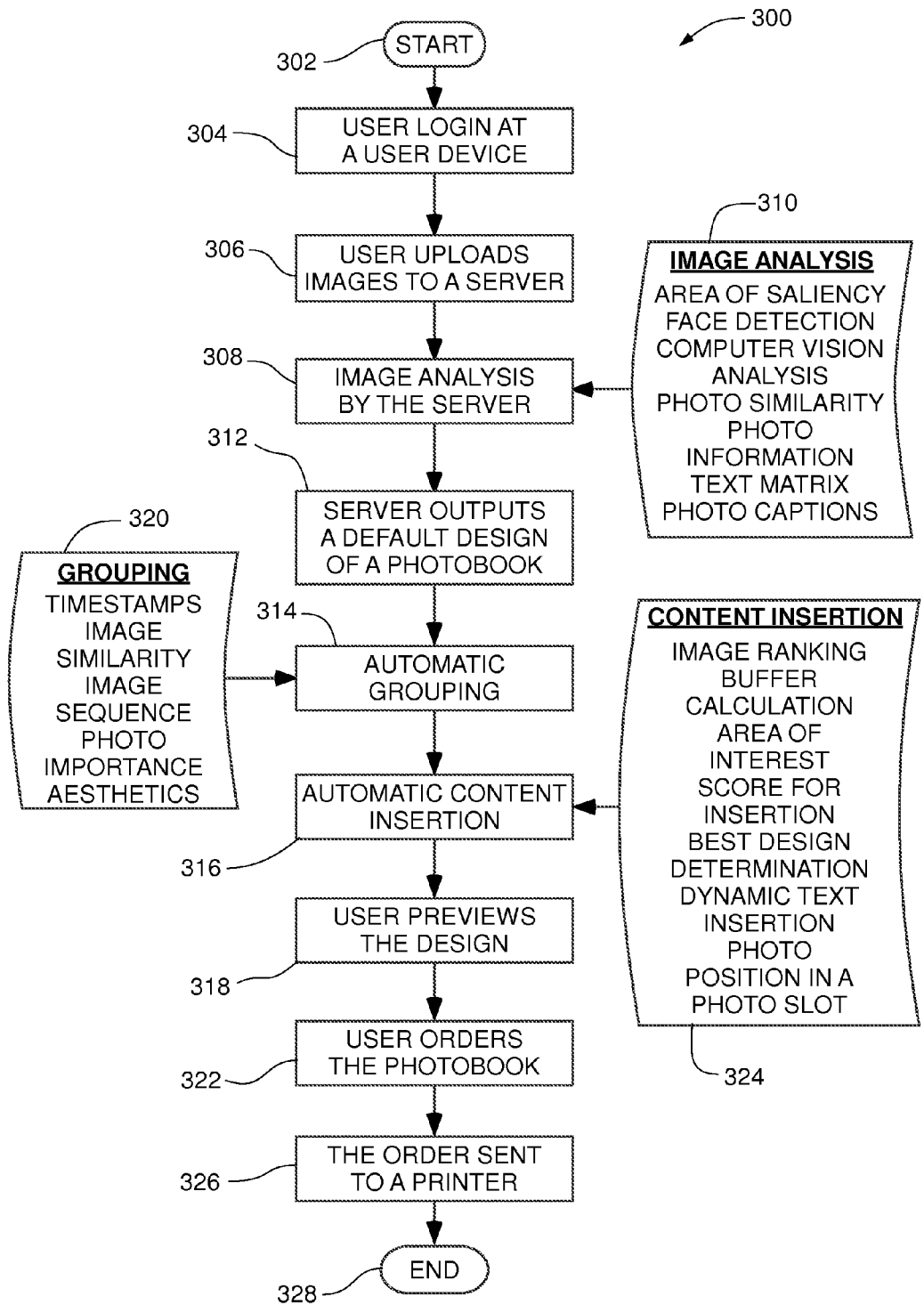
Figure 4:
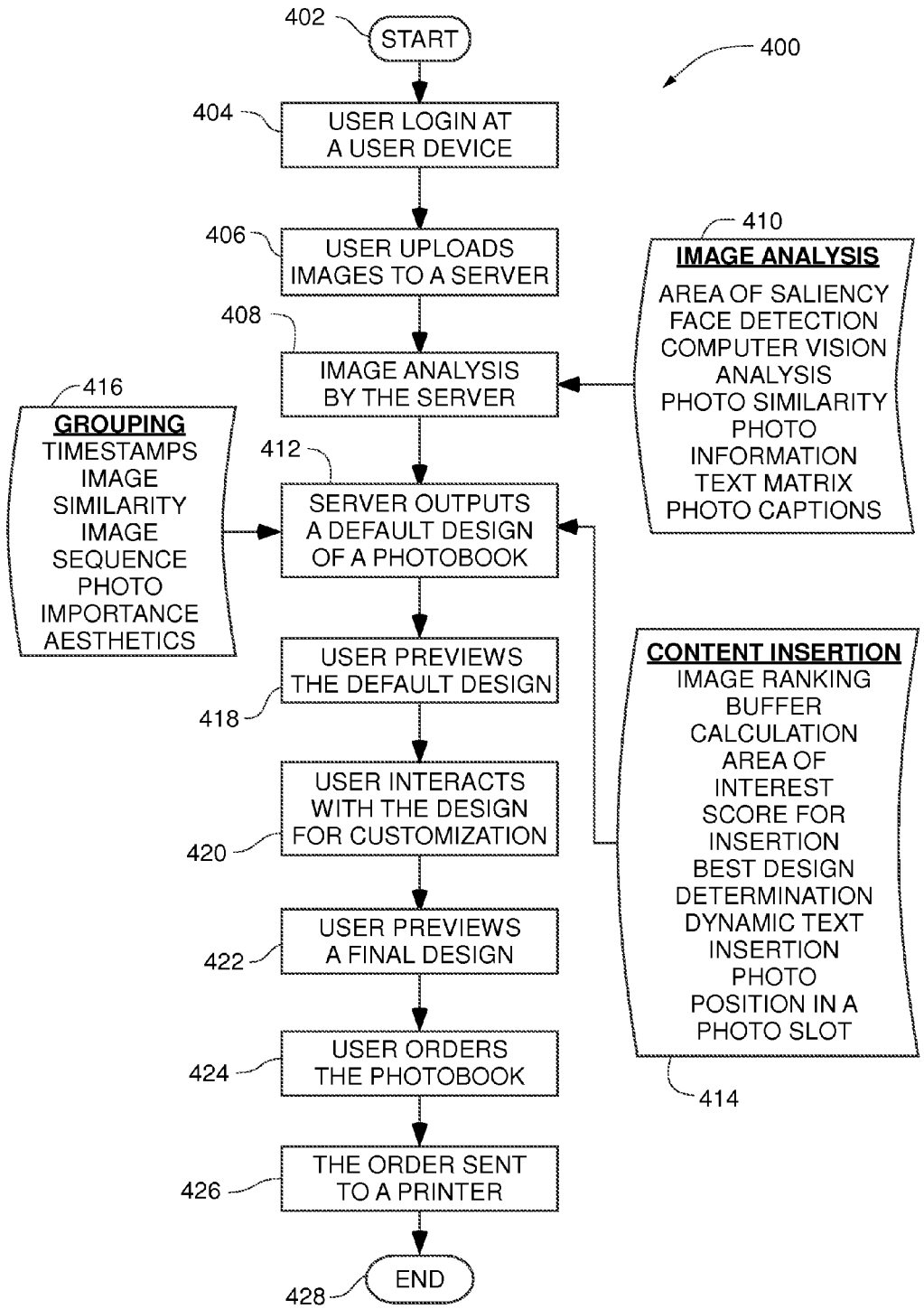
Figure 5:
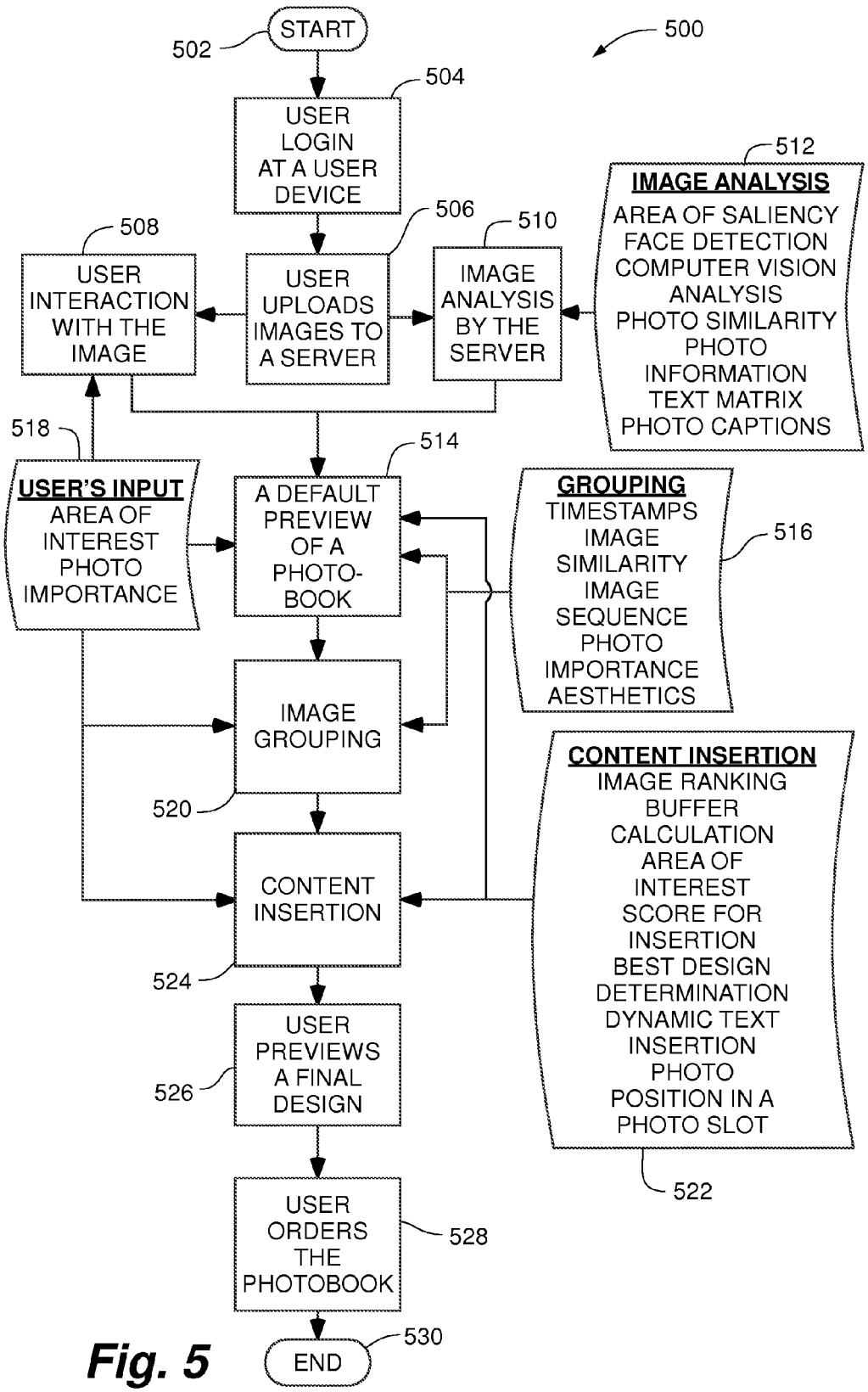

FIG. 2E is an exemplary screen shot of an introduction page 2E200 of website 1W2106 of FIG. 1W according to an embodiment of the present invention. Introduction page 2E200 includes interactive indicia 2E201, which includes an option for retrieving help, signing up for service, and for logging into the service. On the same title bar containing the interactive indicia 2E201 for signing up or signing into the process, there are the navigation options Learn More; Pricing; and Gallery. The option "learn more" leads to additional information about the services provided, such as product quality, use cases, etc. The pricing option brings up one or more complete pricing structures for the available products that can be created and printed. The option Gallery is an option that provides access to completed projects authorized for public viewing.

Page 2E200 contains more than one feature advertisement 2E203. Each feature advertisement may comment or provide some input, access to, or information about a feature of the service or fact about the providing company. In the first feature advertisement (center top) there is an interactive option 2E204 for getting started now. Invocation of this interactive link may launch a registration or sign-up process followed by an opportunity to begin a MIXBOOK project. Hyperlinked information is provided on introduction page 2E200 under categories such as Learn More, Our Services, Idea Center, Programs, and Corporate.

In one embodiment, page 2E200 includes an option "try it now", which may be replace option 2E204. Invoking such an option may take the "guest" to a MIXBOOK EDITOR without requiring them to login or have an account with the site. Transparent to the user, the system creates a temporary account for them. If the new guest user attempts to save any work on the site they are asked to register as a user.

Automatic Insertion of Content into Projects

FIG. 3 is a flowchart 300 of an embodiment showing an automatic insertion of content into a design. Content may comprise photos or images, text, and user inputs from a user. At step 302, a user starts a process of automatic insertion of content by using a user-device. The user logs in at the user device at step 304. After log-in, the user enters a workspace, an editor, or a graphical user interface (GUI) at the user device. The user at step 306 selects images or photos from the user device and uploads them to a server. At step 308, the server performs an image analysis on the uploaded images. After the images are analyzed, the server derives automatic image information from the uploaded images. As shown in the list 310, automatic image information is derived by using computer algorithms that include, but are not limited to, one or more of detecting areas of saliency, face detection, computer vision analysis, photo similarity detection, and analyzing photo information, text matrix, photo captions, and so on. Automatic image information is also derived from image meta-data. After using the automatic image information derived by image analysis, the server at step 312 outputs a default design preview (an automated design) of a photobook. The design preview at step 312 also comprises a layout that is the basis for the design.

At step 314, the server performs automatic content grouping of the uploaded images. For automatic content grouping, the server utilizes, but is not limited to, one or more of the information in the list 320. The list 320 comprises timestamps, image similarities, image sequences, photo importance, aesthetics, and so on. At step 316, the server automatically inserts content into the design of the photo project by using, but not limited to, one or more of the items (computer algorithms) in the list 324. The list 324 comprises image ranking, buffer calculation, areas of interest in an image, scores for insertion, best design determination, dynamic text insertion, photo position in a photo slot, and so on.

The user previews the design at step 318. The preview at step 318 is populated after completing the automatic image information extraction of one or more of the items in the list 310, after step 314 of automatic content grouping, and after step 316 of automatic content insertion. The preview at step 318 is thus automatically populated by the server by using one or more of the items (computer algorithms) as shown by the lists 310, 320, and 324. After the user previews the design, the user can order the photobook at step 322. At step 326, the order is sent to a printer. The printer may be a third party printer, a social printer, or any industrial printer that is adapted to print photos on a photo quality paper. The ordered photobook may be printed on a preferred size of a photo paper. The ordered photobook may be a shippable product to the user. The printer may be further adapted to print a shipping label comprising the order information, and other relevant information. The process ends at step 328.

FIG. 4 is a flowchart 400 of an alternative embodiment showing a first insertion based on automatic image information and a second insertion based on observed image information of content into a design of a photo project. At step 402, the process starts at a user-device. The user logs in at the user device at step 404. After the log-in, the user enters a workspace, an editor, or a graphical user interface (GUI) at the user device. The user at step 406 selects images or photos from the user device and uploads them to a server. At step 408, the server performs an image analysis on the uploaded images. After the images are analyzed, the server derives automatic image information from the uploaded images. As shown in the list 410, automatic image information is derived by using computer algorithms that are relevant to areas of saliency, face detection, computer vision analysis, photo similarities, photo information, text matrix, and photo captions. Automatic image information is also derived from image meta-data. After using the automatic image information derived by image analysis, the server at step 412 outputs a default design preview of a photobook.

The default design generated at step 412 is based in part on step 416 of automatic content grouping and step 414 of automatic content insertion. At step 416, the server performs automatic content grouping of the uploaded images. For automatic content grouping, the server utilizes the information comprising timestamps, image similarities, image sequences, photo importance, and aesthetics. At step 414, the server automatically inserts content into the design of the photo project by using items (computer algorithms) comprising image ranking, buffer calculation, areas of interest in an image, scores for insertion, best design determination, dynamic text insertion, and photo position in a photo slot.

The default design at step 412 is based on a combination of computer algorithms in lists 410, 414, and 416. The user previews the default design created by the server at the user device at step 418. Furthermore, the user customizes the design at step 420 by adding user interactions or user inputs. User interactions or user inputs comprise area of interest selection, photo importance determination, and so on. User interactions or user inputs are performed manually by the user. By observing and monitoring the user interactions at the GUI of the user device, the system is able to collect observed image information, which the system can use to improve on the automatic image information obtained by the system from image analysis. The system can monitor for such user interactions as zooming, panning, swapping photos, adding captions to photos, and so on. After the customization by the user, a final recommended design based on the automatic image information and the observed image information is generated by the system, and can be previewed by the user at step 422. The user can then perform additional customizations to the final recommended design, and then order the photobook at step 424. At step 426, the order is sent to a printer as described previously. The process ends at step 428.

FIG. 5 is a flowchart 500 of an alternative embodiment showing an insertion of content based on automatic and observed image information. At step 502, the process starts at a user-device. The user logs in at the user device at step 504. After the log-in, the user enters a workspace, an editor, or a graphical user interface (GUI) at the user device. The user at step 506 selects images or photos from the user device and uploads them to a server.

At step 510, the server performs an image analysis on the uploaded images. After the images are analyzed, the server derives automatic image information from the uploaded images. As shown in the list 512, automatic image information is derived by using computer algorithms that are relevant to areas of saliency, face detection, computer vision analysis, photo similarities, photo information, text matrix, photo captions, and so on. Automatic image information may also be derived from image meta-data. While the user is uploading original images to the server, the user can interact with a layout and a design of a photobook, and thus contribute to creating user inputs or user interactions with the design. At step 508, the user interacts with the images that are already uploaded to the server. User interactions are also called manual interactions, manually observed information, user inputs, or user's behavioral observation. As shown in the list 518, user interactions comprise one or more of, but are not limited to, areas of interest in a photo, photo importance, panning, zooming, switching photos, and so on. Not every possible user interaction is shown in list 518 for simplicity of explanation. User inputs may also be called tweaks, and give rise to observed image information. By using user's manual inputs or user interactions (observed image information) along with the automatic image information derived though image analysis by the server, a default preview of the design (an automated design) is generated at step 514. The automated design is subject to manual edit by the user at any time before an order to print is placed and confirmed.

At step 520, automatic content grouping of images is performed by using both observed image information from the user and automatic image information from the server. Any errors made by the server in automatic content grouping is manually corrected by the user at step 520. For automatic content grouping, the server utilizes one or more of, but is not limited to, the items or information in the list 516. The list 516 comprises timestamps, image similarities, image sequences, photo importance, aesthetics, and so on. User inputs at step 520 come from, but are not limited to, one or more items on the list 518. At step 524, manual tweaks are performed to further customize content. The server automatically inserts content into the design of the photo project by using, but is not limited to, one or more of the items (computer algorithms) in the list 522. The list 522 comprises image ranking, buffer calculation, areas of interest in an image, scores for insertion, best design determination, dynamic text insertion, photo position in a photo slot, and so on. Manual tweaks come from the list 518, but are not limited to the items shown.

After performing manual tweaks at steps 520 and 524, the user previews a final recommended design of the photo project at step 526. When the user is happy with the final recommended design, the user can order a photobook at step 528. The order may then be sent to a printer as previously described. The process completes at step 530.

Figure 6A:
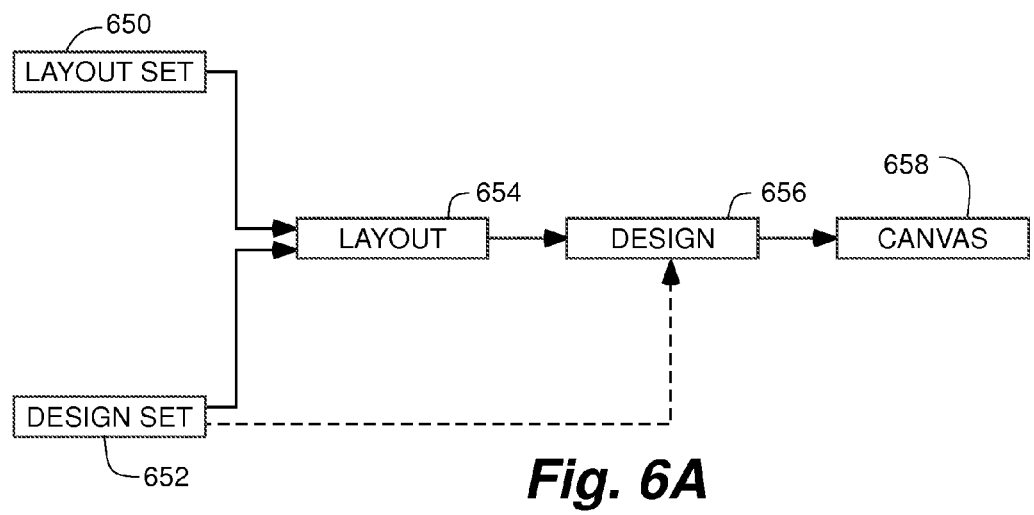
FIG. 6A illustrates a diagram showing a relationship between a canvas, a design, a layout, a designset, and a layoutset, according to an embodiment of the present invention.

FIG. 6A illustrates a diagram showing a relationship between a canvas, a design, a layout, a designset, and a layoutset, according to an embodiment of the present invention. A designset is linked to one layoutset. From one layoutset, there are many layouts. Each one of those layouts is then used to build one design for said designset. For example, if a layout set has 100 layouts, then a designset built from it will have 100 designs. A layoutset 650 gives rise to a layout 654, which itself gives rise to a design 656. The design 656 inherits from both a layout 654, and indirectly its layoutset 650. The design 656 is also selected from a designset 652. Each design 656 specifies a style and formatting of content in a layout 654 from which it depends, while each layout 654 specifies a location of photo slots and/or text slots without reference to styling. Each designset 652 is always tied to a layoutset 650 through its layout 654. Finally, the design 656 gives rise to a canvas 658 through an addition of content by a user, automatically by the server, or both. This inter-relationship of a canvas, a design, and a layout ensures system flexibility and efficiency whenever designs have to be modified.

Figure 6B:
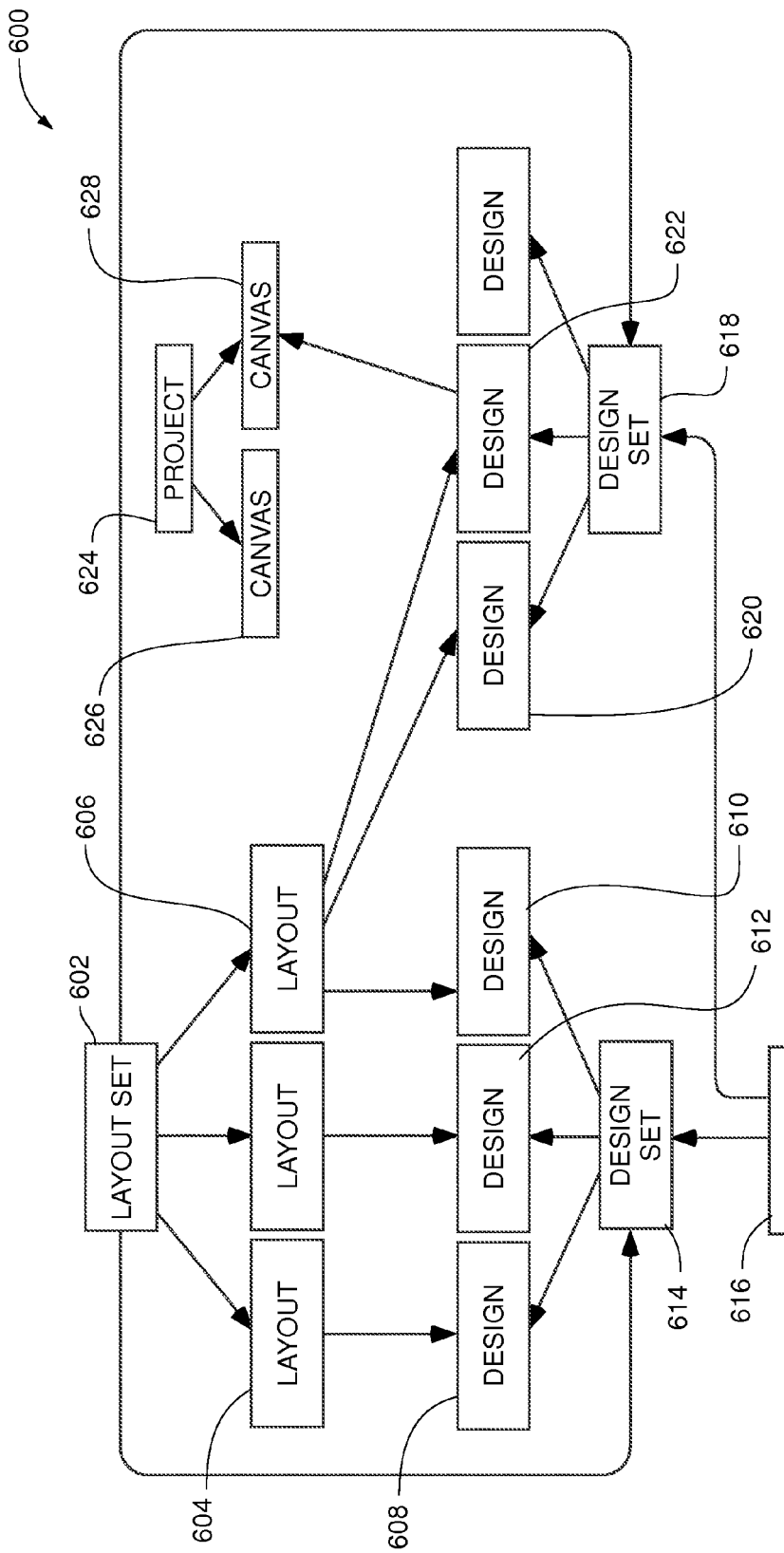
FIG. 6B illustrates a diagram showing an interrelationship of a theme, a layout, and a design, according to an embodiment of the present invention.
Figure 7:
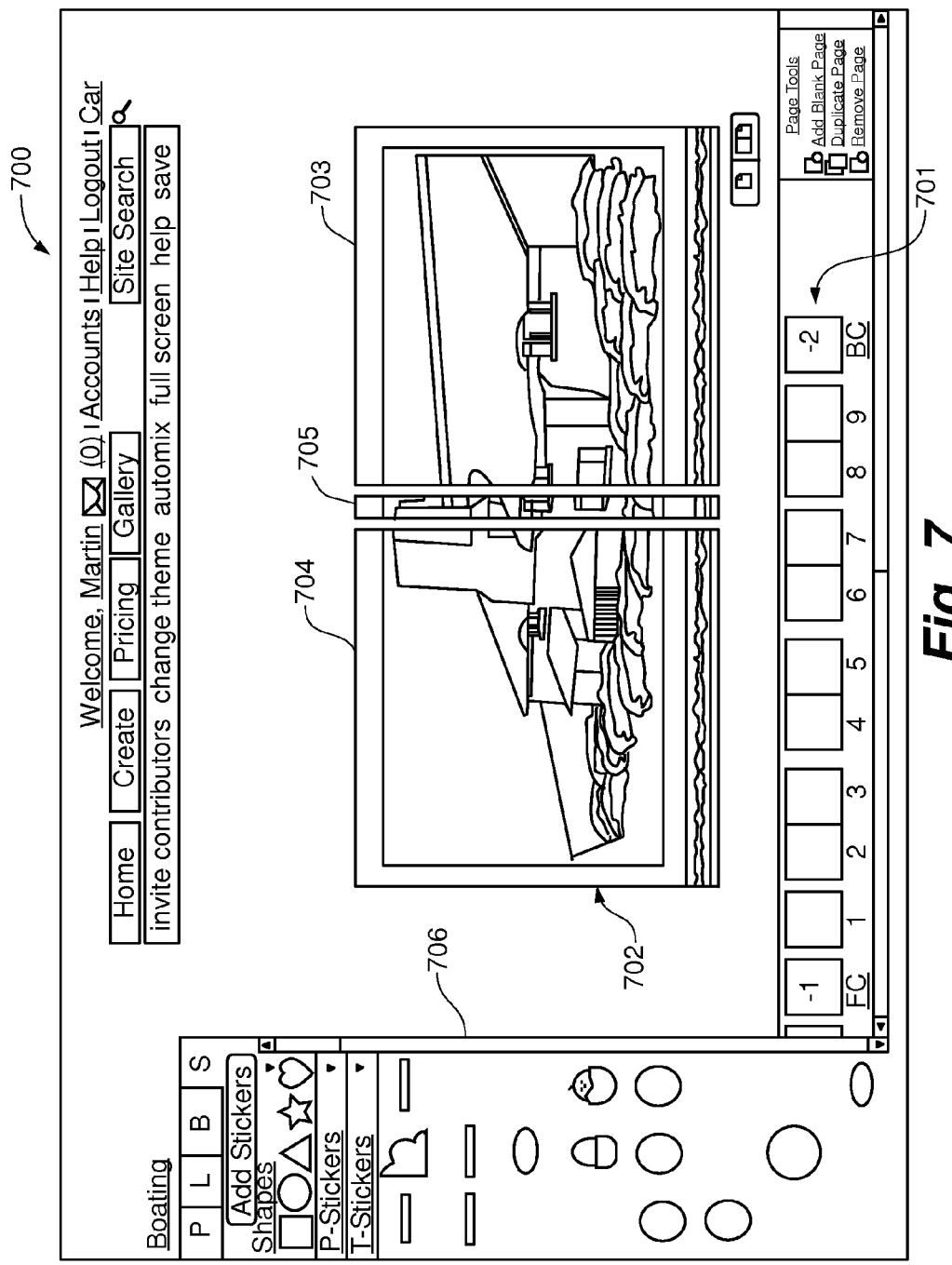
Figure 8:
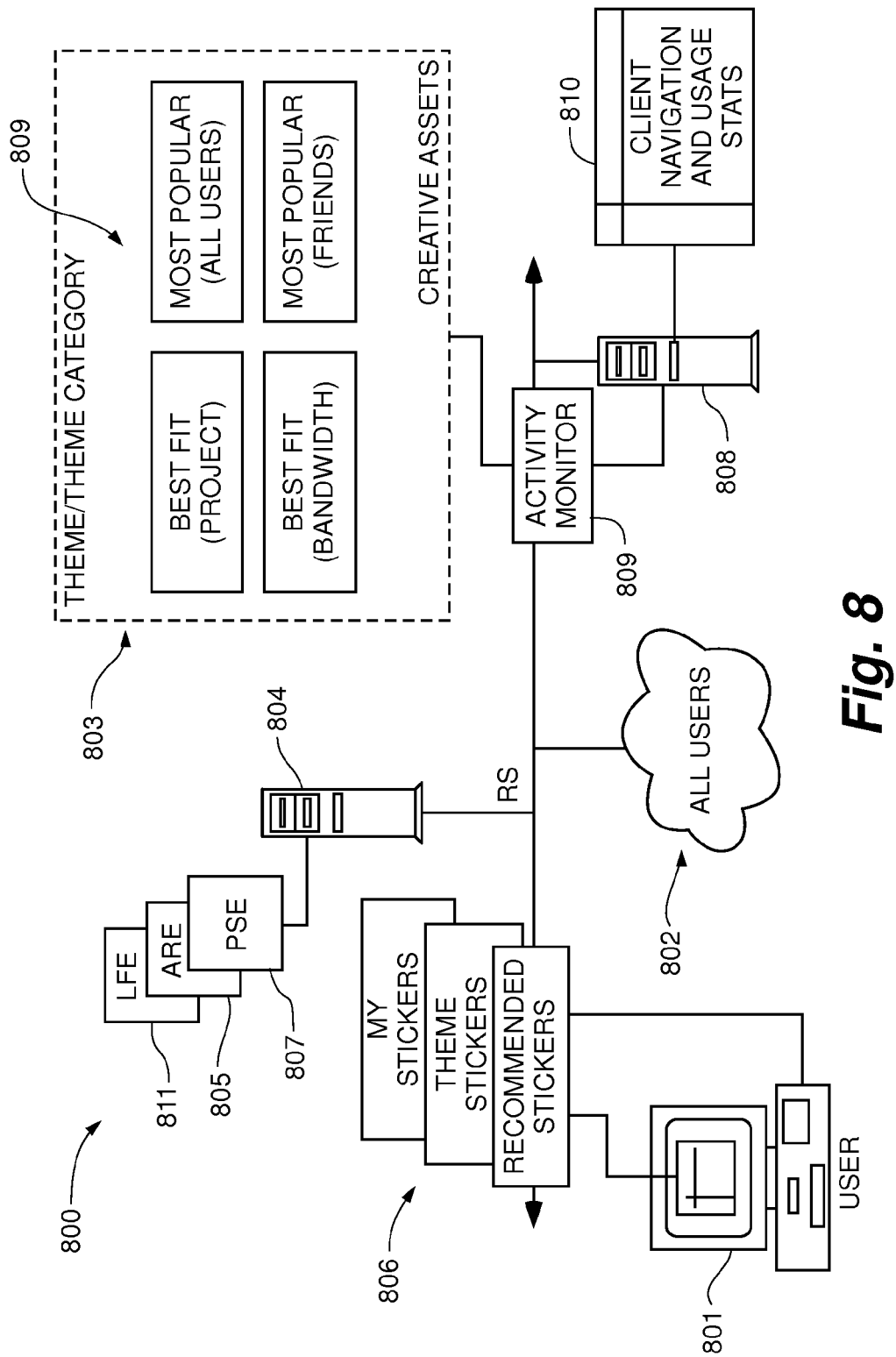
Figure 9:
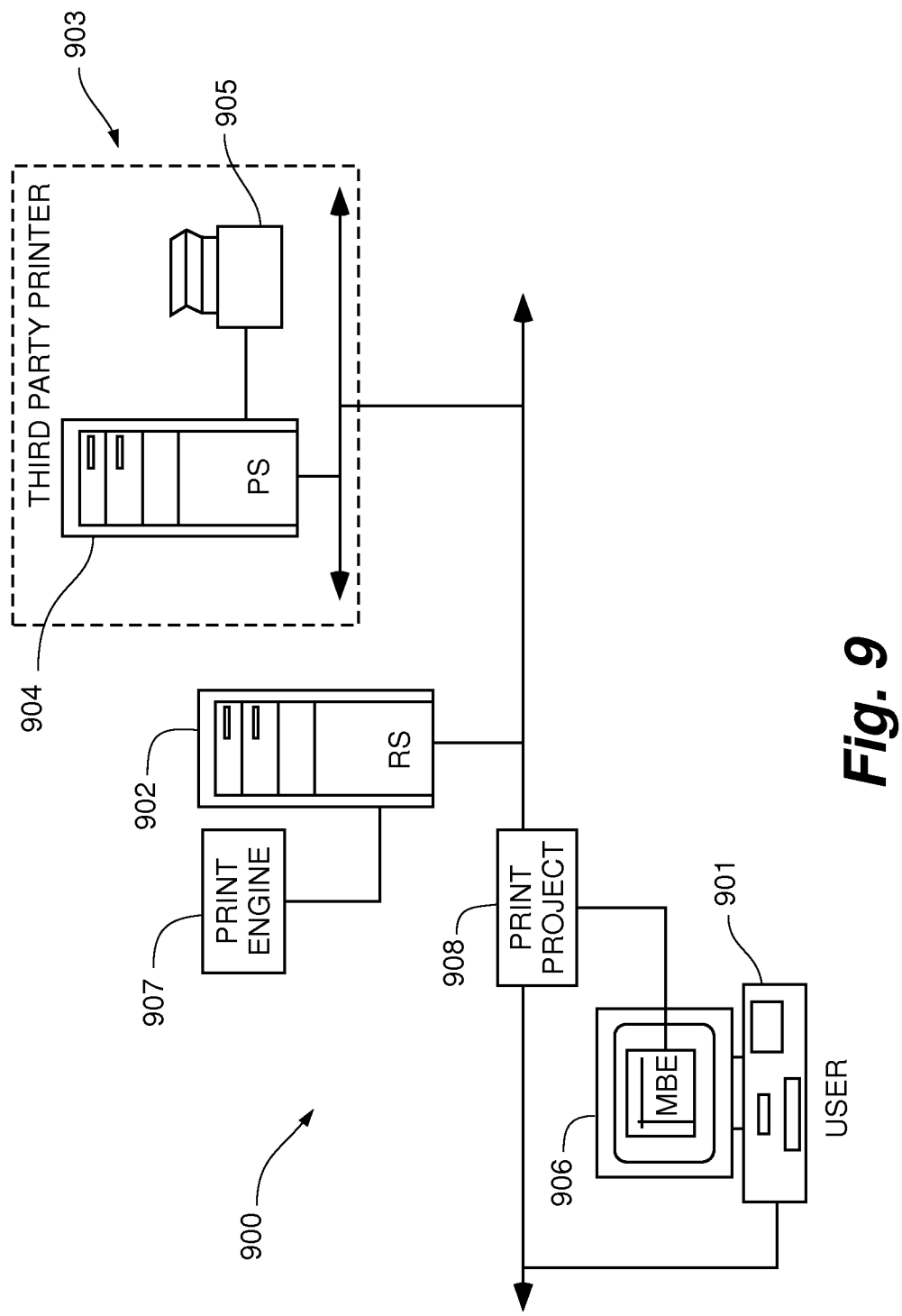
Figure 10:
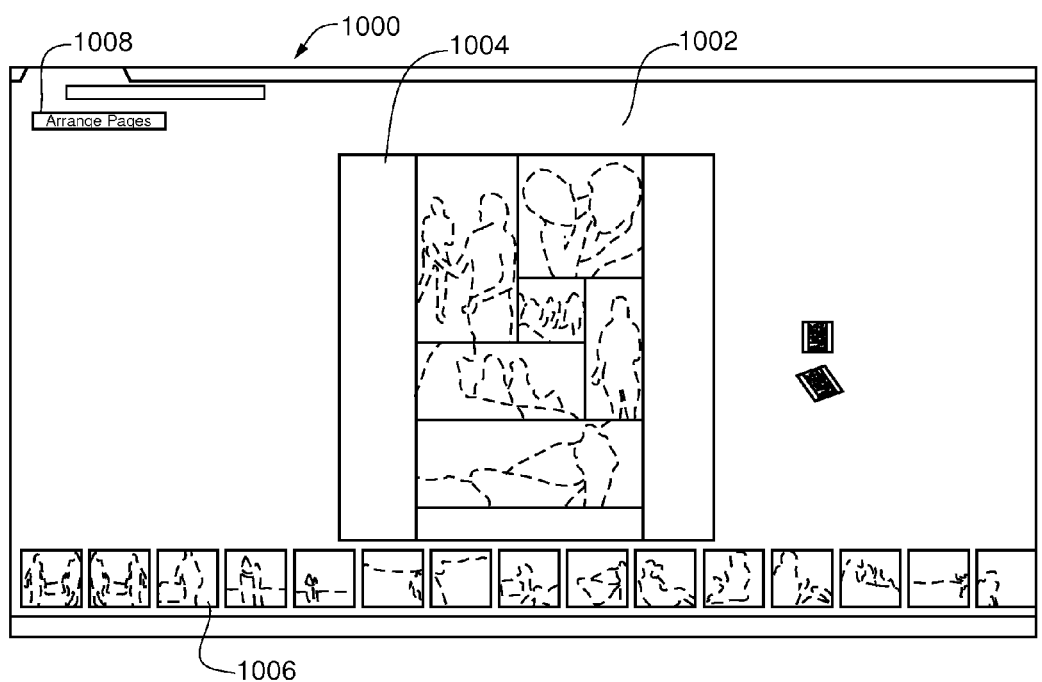

FIG. 6B illustrates a diagram 600 showing an inter-relationship of a theme, a layout, and a design, as well as their corresponding sets. To repeat, a designset is linked to one layoutset. From one layoutset, there are many layouts. Each one of those layouts is then used to build one design for said designset. For example, if a layoutset has 100 layouts, then a designset built from it will have 100 designs. As described previously, a user selects images to upload and build a photobook. Once the images are selected and upload begins, the user can select a theme 616. The theme 616 corresponds to designsets 614 and 618. Each designset is a collection of designs. For example, the designset 614 comprises designs 608, 610, and 612. Similarly, the designset 618 comprises designs 620, 622, and another design not numbered. Each design in turn depends on a layout. For example, the design 608 depends on a layout 604. Each layout depends on a layoutset. For example, the layout 604 depends on a layoutset 602. A layout can give rise to many designs. For example, layout 606 can give rise to designs 620, 622, and another design (not numbered). A design, in turn, may be presented in a canvas. A canvas represents how a design will be printed on paper. Finally, a project 624 can be represented by a plurality of one or more canvases, such as canvas 626 and canvas 628 in this example. For instance, the design 622 is reflected on canvas 628. Each layoutset serves as a basis for many designsets, and each layout serves as a basis for many designs. A theme 616 is consistent with a plurality of layouts as well as a plurality of designs that depend from the layouts, thereby maintaining an inter-relationship between a theme, a layout, and a design. Thus, this inter-relationship offers greater control for a responsive design update and for auto-flow/auto-fill algorithms, thereby saving time and labor in creating a photobook.

Other Exemplary Embodiments of the Present Invention

FIG. 7 is an exemplary screenshot of an editing interface 700 displaying a photo-spread including a front cover, back cover, and spine according to an embodiment of the present invention. Interface 700 has a storyboard display 701 that includes all of the pages of the photobook being created. The inventors provide a unique paradigm for relating items across multiple pages including special pages, in this case, the front cover 703, the back cover 704, and the spine of the book 705. When a user edits a spread that contains more than one page, the photos, shapes and stickers can be "overflowed" from one page to other pages within the spread. When the items are overflowing, they are linked together such that when an item changes on one page, its linked item gets updated reflectively on the other page.

FIG. 8 is a block diagram illustrating an asset recommendation system according to an embodiment of the present invention. In one embodiment of the present invention, asset recommendations are made to a user who is editing a current project using the MIXBOOK collage editor. System architecture 800 includes a user 801 that is currently online with runtime server 804 running an asset recommendation engine (ARE) 805. The system of the invention has access to all of the assets that have been designed by system designers, users whom may be registered as asset contributors, and any other user contributions to the system. Creative assets 803 include all of the stickers, shapes, backgrounds, layouts, photos, and any other accessible imagery.

Finally, FIG. 9 is an architectural diagram illustrating a printing network 900 according to an embodiment of the present invention. Printing network 900 includes a user 901 connected online to a runtime server 902. Runtime server 902 is analogous to runtime servers previously described in this specification. Runtime server 902 includes a digital medium coupled thereto and adapted to contain all of the SW and data required to enable server function.

When user 901 is editing a project using a MIXBOOK editor (MBE) such as MBE 906, for example, the user is connected in session with server 902. As such, the user may decide to print a finished project such as a photobook by invoking a printing option such as print project option 908 illustrated in exploded view. Such an action invokes a printing engine 907 that is responsible for rendering the user's project in a ready state for printing according to a final end product selected by the user.

The printing engine sends output files for printing to a third-party printing service 903. Printing service 903 represents any online printing service. Third-party printer 903 includes a printing server 904 and a connected printer 905 representing printing capability. Printing engine 907 is a flash based that is enhanced to produce high resolution output files to print. Print engine 907 is a single print engine that is involved from the point of creating a project to the point of printing out the project.

Page and Spread Re-Arrangement Embodiments

FIG. 10 is an embodiment 1000 showing a printable photobook with a cover in a finished form. In an editing interface or workspace or editor (GUI) 1002, a photobook is displayed with a cover or cover page 1004. The cover may be a hard cover with a random or organized selection of some of the photos contained in the photobook. A user can select (add or delete) one or more photos from the cover. The totality of photos in the photo book may be displayed to the user to customize the cover. In customizing the cover, the user can select a photo 1006 and add the selected photo 1006 to the cover page 1004, by dragging and dropping. After the user is satisfied with the design of the cover, the user can click on the soft button "Arrange Pages" 1008 to customize each page or each spread one by one. Other methods to add photos to the cover and to the photobook are also within the scope of the present invention.

Figure 11:
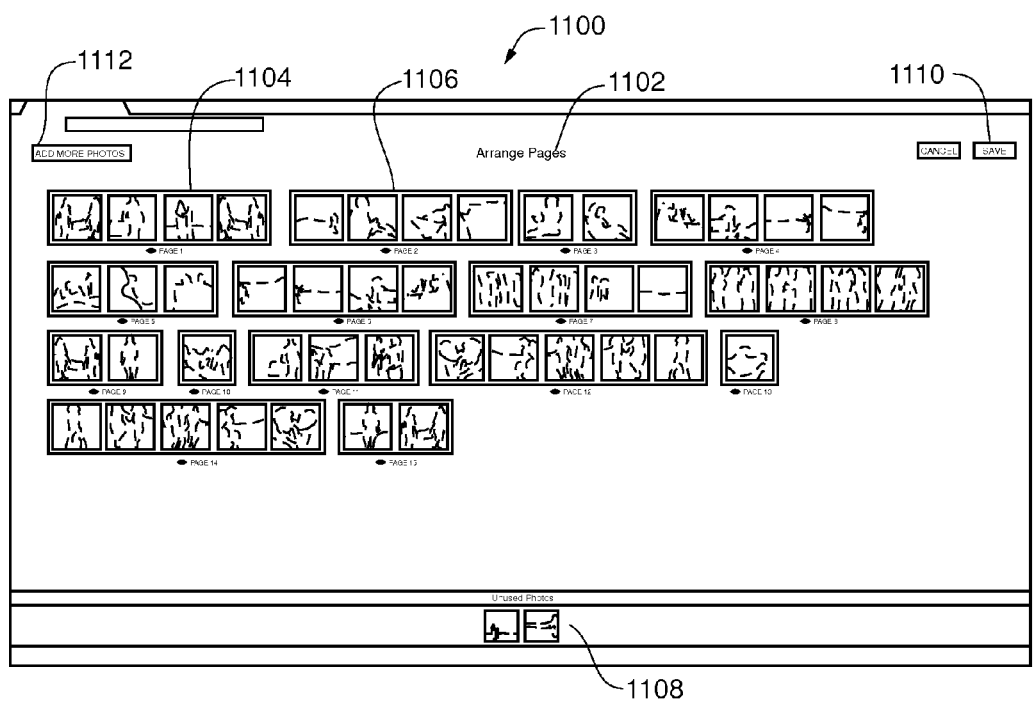
FIG. 11 is a diagram displaying pages or spreads of a photobook, according to one embodiment of the invention.

FIG. 11 is an embodiment 1100 displaying pages or spreads of a photobook. A first spread 1104 comprising photos and a second spread 1106 comprising photos is shown. The display of the embodiment 1100 or the arrangement of spreads as shown may be termed as a grid preview. A soft "save" button 1110 saves the arranged or customized pages and spreads as a soft copy of the entire project. Unused photos or an entire spread may be saved in a photo storage area 1108. The user can add additional photos to the photo editing area by pressing a soft button "Add More Photos" 1112, which takes the user to a location in which additional photos may be uploaded. Once the additional photos are added to the photo editing area, the user can press a soft button "Arrange Pages" 1102 to initiate an arrangement of pages and/or spreads with the additional photos, returning the user to this screen 1100.

Figure 12:
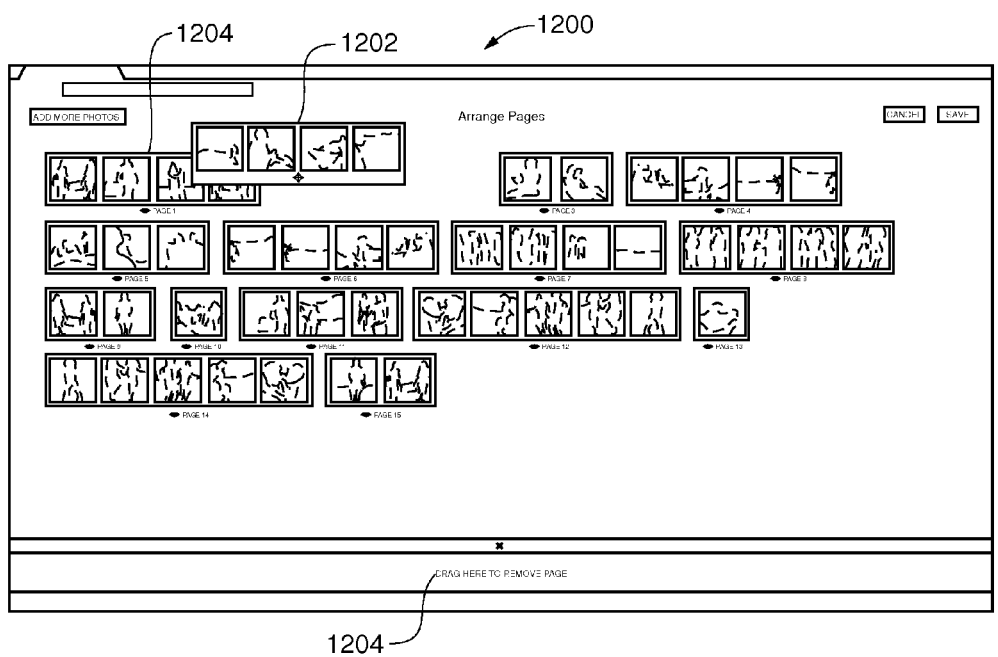
FIG. 12 is a diagram showing a dragging of a spread, according to one embodiment of the invention.

FIG. 12 is an embodiment 1200 showing a dragging of a spread. Two opposing pages can be referred to as a spread, and hence, the terms "pages" and "spread" may be used interchangeably, if the context requires it. A spread 1202 is dragged by using an input device of a computer, such as, a mouse, finger, stylus, and the like. The dragged spread 1202 is brought close to an adjacent spread 1204. The dragged spread 1202 is movable anywhere in the photo editor or workspace. The dragged spread 1202 may be dropped in between any other two spreads, or before the adjacent first spread 1204, or even after a last spread. The dragged spread 1202 may also be dropped in the temporary storage area 1204. A spread or a photo that is stored in the storage area 1204 may be used anytime later in the photobook customization process.

Figure 13:
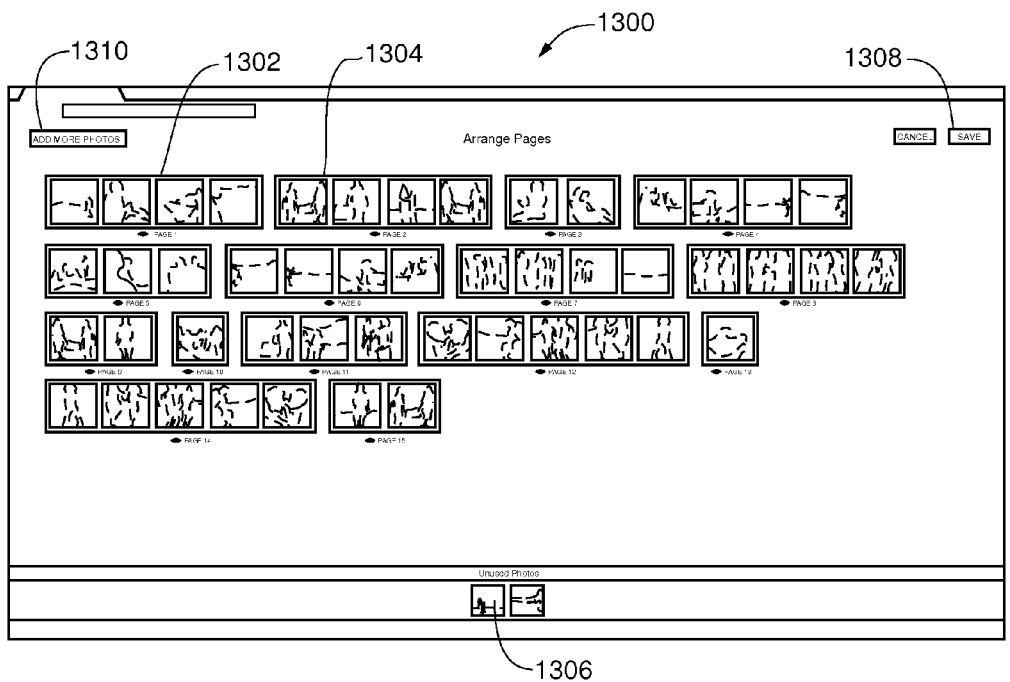
FIG. 13 is a diagram showing a swap of two spreads in a photobook, according to one embodiment of the invention.

FIG. 13 is an embodiment 1300 showing a swap of two adjacent spreads in a photobook. A swap of two adjacent spreads causes the location of the two spreads to switch. If the two spreads are not adjacent, then dropping the actively moved spread causes the other spreads to re-arrange. In the embodiment 1200, it is shown how one spread is movable in the photo editing area. In the embodiment 1300, it is shown how two spreads switch their locations after a swap. A swap is performed by dragging and dropping one spread adjacent to another spread. In the embodiment 1100, the spreads 1104 and 1106 are in original or auto-generated locations. In the embodiment 1200, the spread 1202 is being dragged. In the embodiment 1300, the spread 1302 is dropped before the spread 1304. Therefore, the embodiments 1100, 1200 and 1300, show how two spreads are swapped, or within the same meaning, how the locations of two spreads are swapped or moved or reshuffled. The user has an option to add more photos in the photo storage area or the editor by clicking on a soft button "Add More Photos" 1310. The project can be saved for later retrieval by clicking on the soft button "Save" 1308. An unused photo 1306 is stored in a photo storage area. The photo storage area can be anywhere in the editor or workspace, as a matter of design choice.

Figure 14:
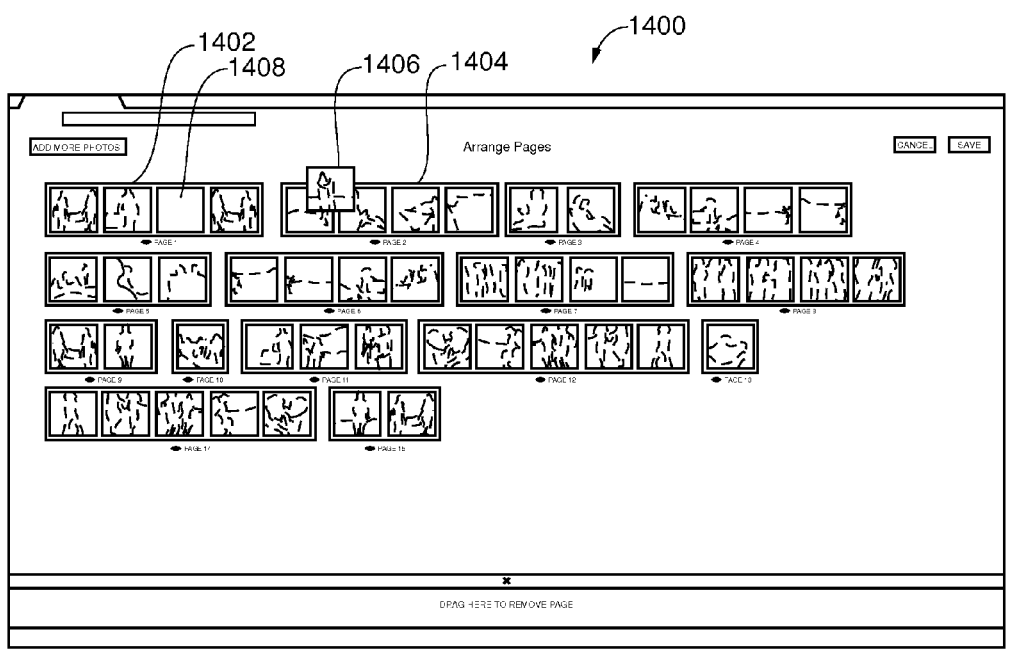
FIG. 14 is a diagram showing a pre-movement of a photo from one spread to another spread, according to one embodiment of the invention.

FIG. 14 is an embodiment 1400 showing a pre-movement of a photo from one spread to another spread. A user desires to move a photo 1406 from a first spread 1402 to a second spread 1404. The photo 1406 is movable by a drag of a mouse, a finger, a stylus, and the like. When the photo 1406 is moved, a placeholder (gap) 1408 is shown in the form of a shade to indicate where the photo 1406 was previously occupied. If the photo 1406 is not correctly dropped to a different location, the photo 1406 will automatically drop to its initial placeholder 1408, with no change in the location of the photo 1406 after a post-drag. In the embodiment 1400, the photo 1406 is dragged, by detaching the photo 1406 from the spread 1402, with the intention to merge the photo 1406 to the spread 1404.

Figure 15:
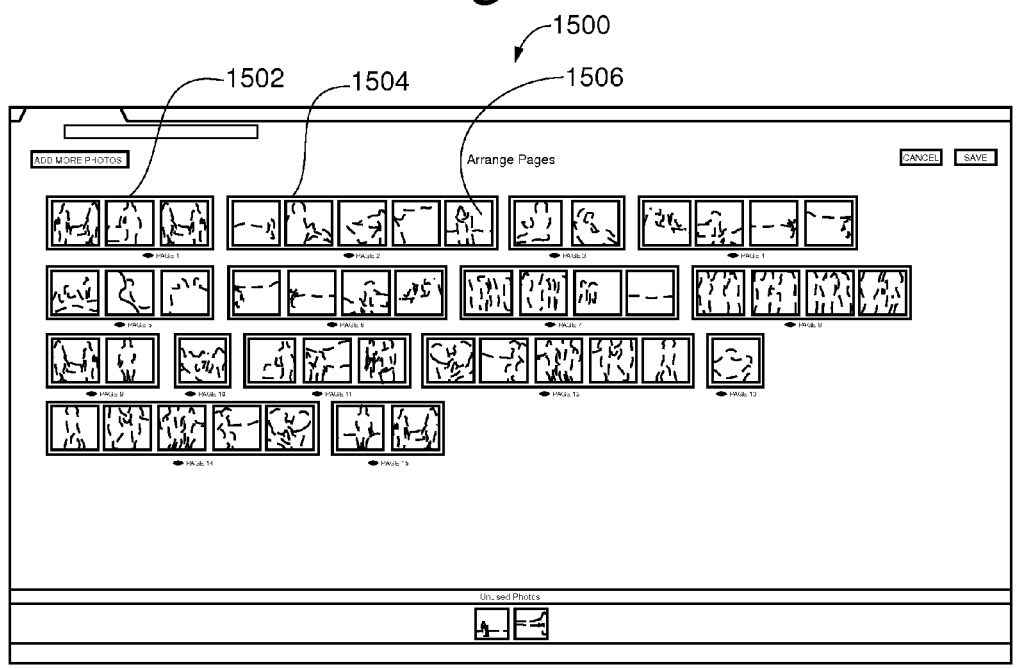
FIG. 15 is a diagram showing a post-movement of a photo from one spread to anther spread, according to one embodiment of the invention.

FIG. 15 is an embodiment 1500 showing a post-movement of a photo from one spread to anther spread. A photo 1506 is moved from a spread 1502 to a spread 1504. A pre-movement is shown by the embodiment 1400. The photo 1506 displays a post-movement of the same picture from the spread 1502 to the spread 1504.

Figure 16:
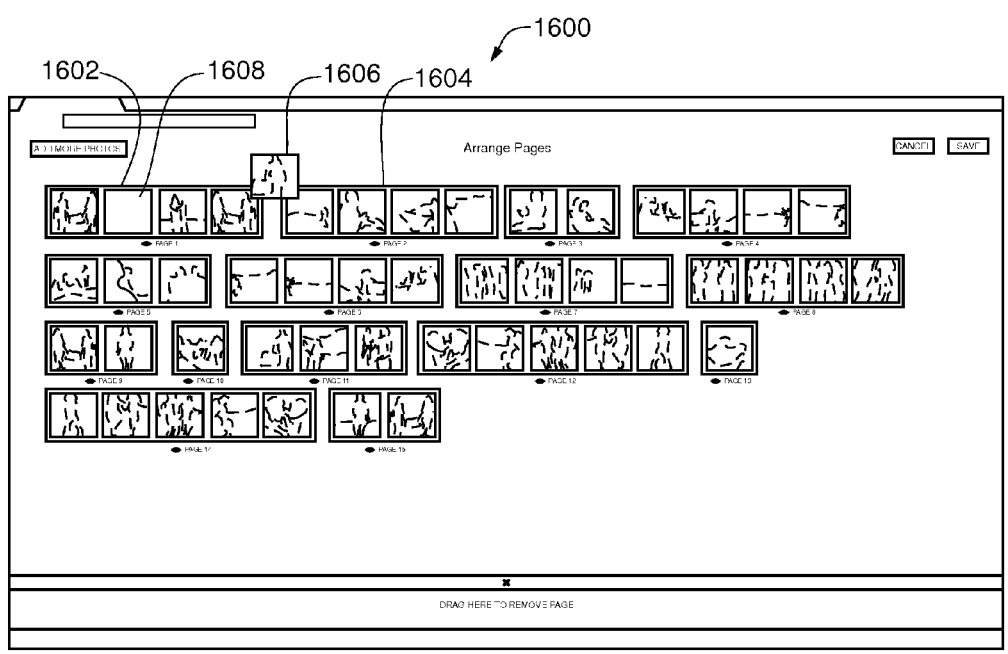
FIG. 16 is a diagram showing a new spread pre-creation by detaching a photo from an existing spread, according to one embodiment of the invention.

FIG. 16 is an embodiment 1600 showing a new spread pre-creation by detaching a photo from an existing spread. A photo 1606 is dragged from a spread 1602, and the dragged photo 1606 is dragged to middle of the spread 1602 and an adjacent spread 1604. After the photo 1606 is detached from the spread 1602 by dragging, a placeholder 1608 is displayed at the spread 1602 to indicate the original location (placeholder or gap) of the photo 1606.

Figure 17:
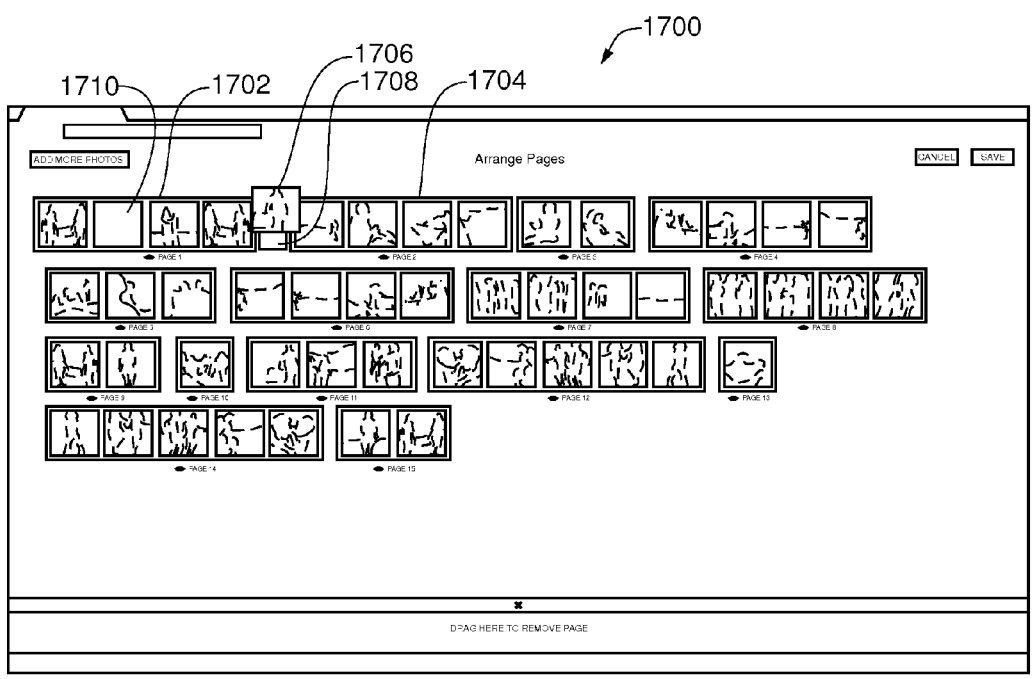
FIG. 17 is a diagram showing a new spread in-creation by detaching a photo from an existing spread, according to one embodiment of the invention.

FIG. 17 is an embodiment 1700 showing a new spread in-creation by detaching a photo from an existing spread. When a photo 1706 is about to be dropped between a spread 1702 and a spread 1704, an indication of a new spread creation is shown by a display of a new placeholder 1708. The old placeholder 1710 of the photo 1706 is displayed until the photo 1706 is actually dropped or released to the new placeholder 1708. The new placeholder 1708 is also a placeholder for a new spread. After the photo 1706 is dropped to the new placeholder 1708, the old placeholder 1710 disappears.

Figure 18:
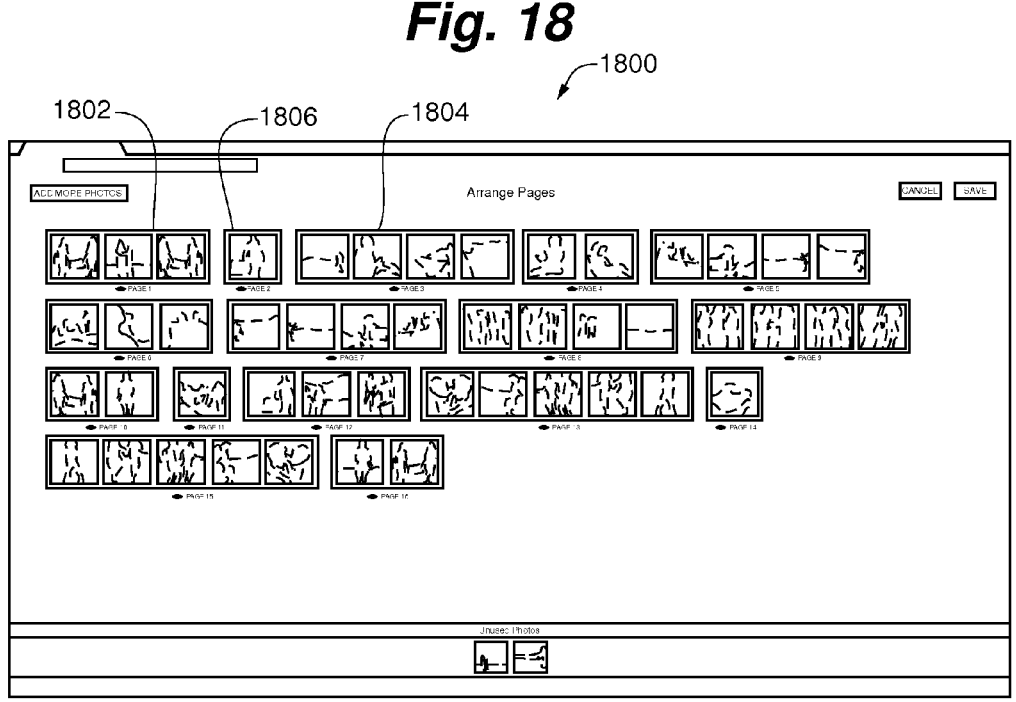
FIG. 18 is a diagram showing a new spread post-creation by detaching a photo from an existing spread, according to one embodiment of the invention.

FIG. 18 is an embodiment 1800 showing a new spread post-creation by detaching a photo from an existing spread. A photo 1806 is now on its own, newly-created spread, meaning a new spread having the one photo that was previously detached from an existing spread. When the photo 1806 is dropped between two spreads 1802 and 1804, creating now the new spread 1806 with a single photo, the adjacent spreads 1802 and 1804 will shift to the left or right, as appropriate, to adjust and accommodate a space for the new spread 1806 between the original spreads 1802 and 1804.

Undo and Redo Embodiments

Figure 19:
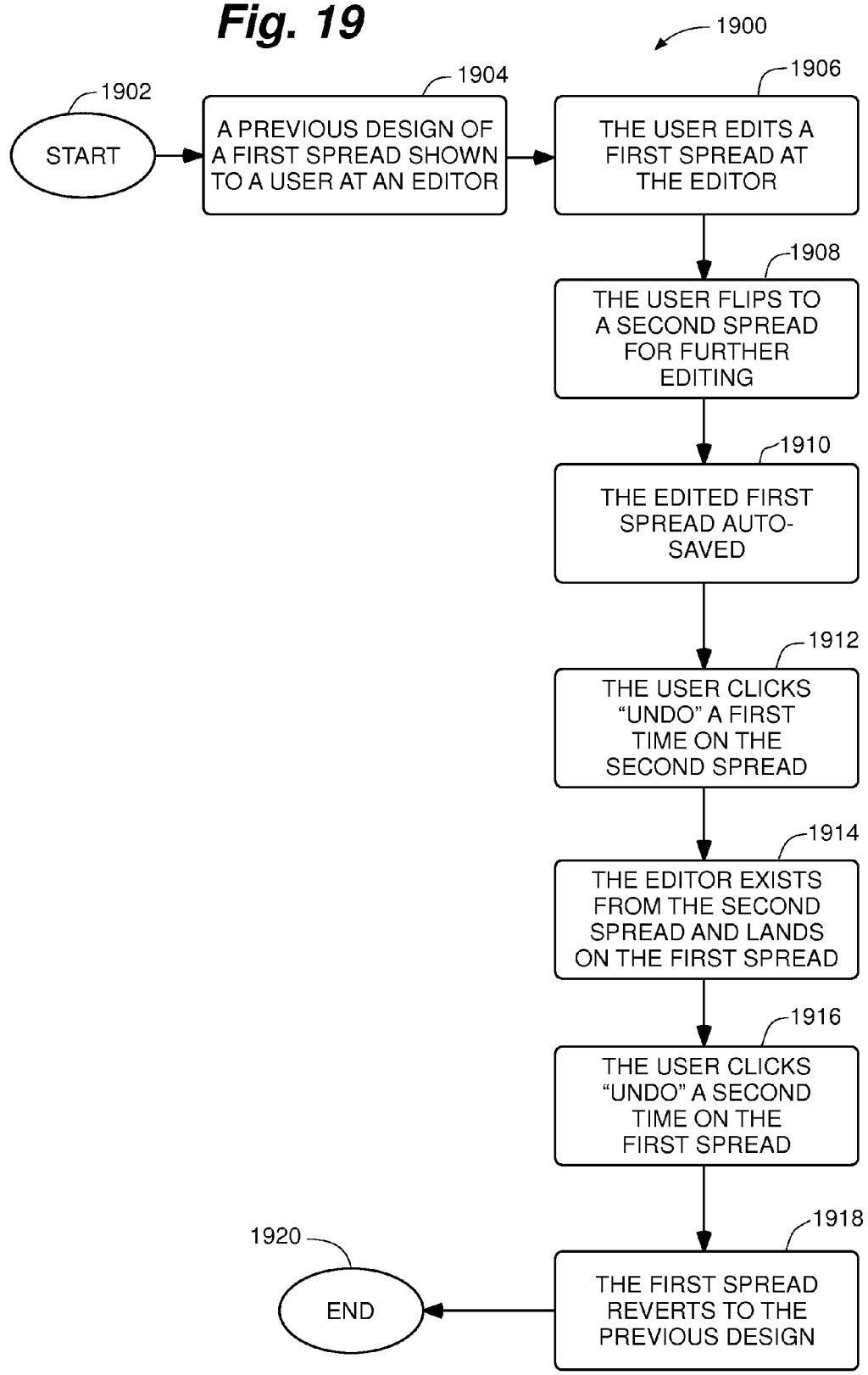
FIG. 19 is a flowchart showing a reverse operation of an edit function in a media project, according to one embodiment of the invention.

FIG. 19 is an embodiment 1900 showing a functionality of a reverse or UNDO feature, according to one embodiment of the present invention. The UNDO feature reverses an altered design to a previous design. The previous design may be a default design or a previously saved design. A default design may be a pre-set design that is prepared by a computer algorithm of the present invention, for example, a use case or image heuristics. In the embodiment 1900, step 1902 starts an implementation process of UNDO or reversal function. At step 1904, a previous design of a first view is shown to a user at an editor. At step 1906, the user edits or alters the existing design of the first view and converts the first view to a new design. The new design may comprise changes in layout, theme, size and location of media files or photos within the view. After a new design is implemented in the first view, at step 1908, the user flips or turns a page to a second view for editing the second view. At step 1910, the first view is auto-saved by saving the changes or alterations made by the user. While the editor is on the second view, at step 1912, the user clicks "UNDO" soft button on the second view. The "UNDO" soft button may or may not have alphabetic characters, and may comprise just a symbol or arrow to connote UNDO. At step 1914, after clicking the "UNDO" soft button for a first time, the editor exits from the second view and lands on the first view. On the first view, there is also an "UNDO" soft button, as displayed at the editor. At step 1916, the user clicks "UNDO" button again on the first view. After a second click, meaning after a total of two cumulative clicks, at step 1918, the first view reverts to the previous design, the previous design as shown in step 1904. The process ends at step 1920, thus, completing a reversal function of edit by performing two clicks of the UNDO button.

In other embodiments, a total of three cumulative clicks may be implemented for the reversal function of the present invention. The additional third click may be used as a confirmation click before exiting from the second view and landing on the first view. A confirmation click may ask the user to click the "UNDO" button one more time. Here, "click" may refer to "undo" or any type of reversal initiation process that is initiated by a computer mouse or digital pen. A computer mouse is one illustrative type of input method, which can also be replaced by a touch gesture of a touch-screen monitor, or even keystroke.

Figure 20:
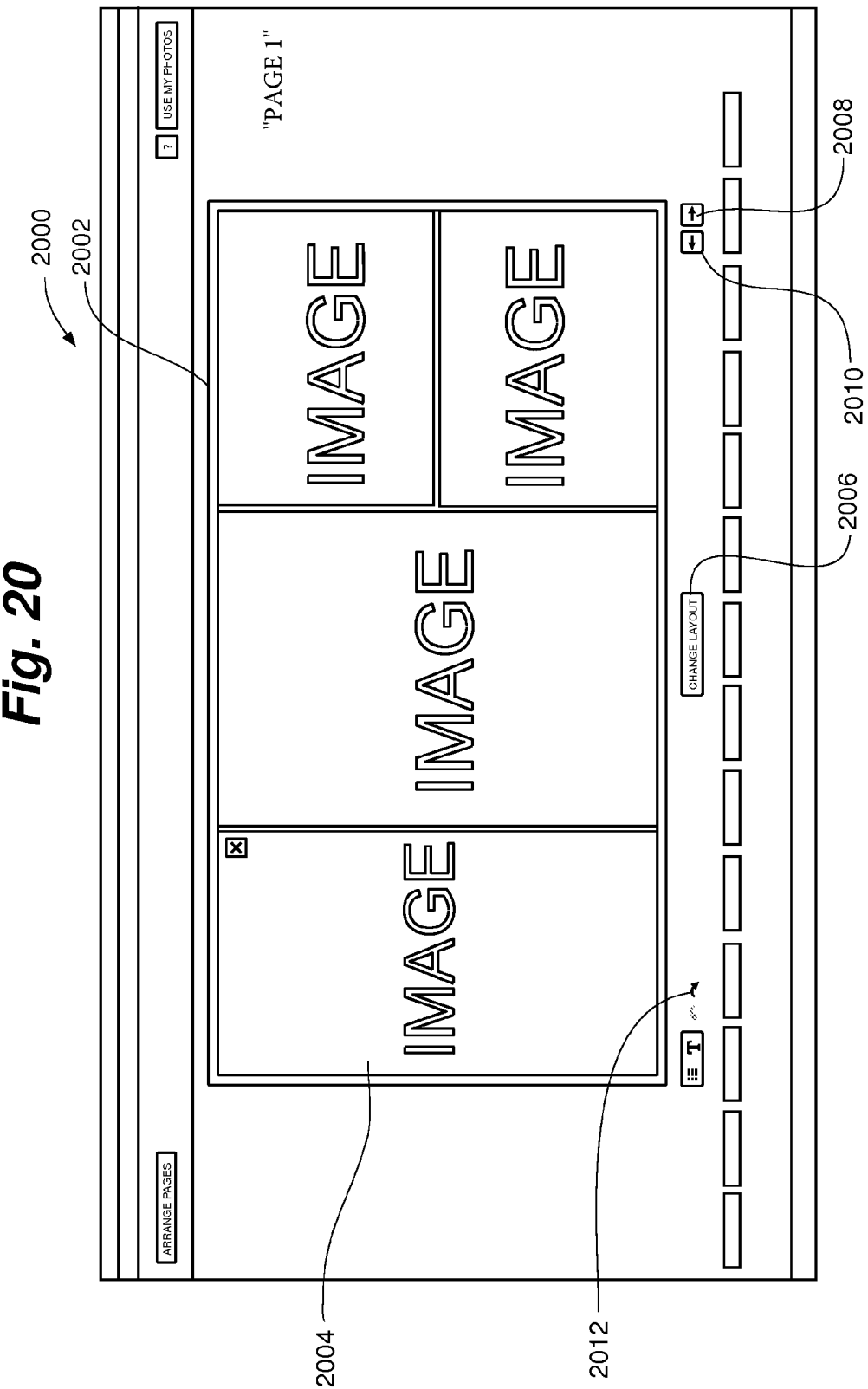
FIG. 20 is a diagram showing a first view, or first page, with an existing or previous design before edit by the user, according to one embodiment of the invention.

FIG. 20 is a screenshot embodiment 2000 showing a previously made view (or design of a spread) of a photo-book, as displayed on the editor. A previously made design 2002 (a design of a spread) comprises a plurality of photos, in which a photo 2004 is grouped with other photos. The photo 2004 and other photos in the group as shown may be grouped together in accordance to a use case or image heuristics. The layout of the group, meaning a group of photos as shown, can be changed by clicking "Change Layout" soft button 2006. A layout change may alter size, position, and focus (zoom) of any or all photos. Furthermore, a user can manually alter a layout, thereby, over-riding automatic layout change. This manual over-ride may be called manual customization. The user may take the editor to a next view by clicking a forward arrow 2008. The user can also take the editor to a previous view (if any) or a cover page by clicking a backward arrow 2010. In the design of a view 2002, a user can use a REDO arrow 2012 to "undo" the "UNDO" of the view. This REDO recapture may be explained in others words as, "oops, I changed my mind about the UNDO, and I want the most recent UNDO canceled."

Figure 21:
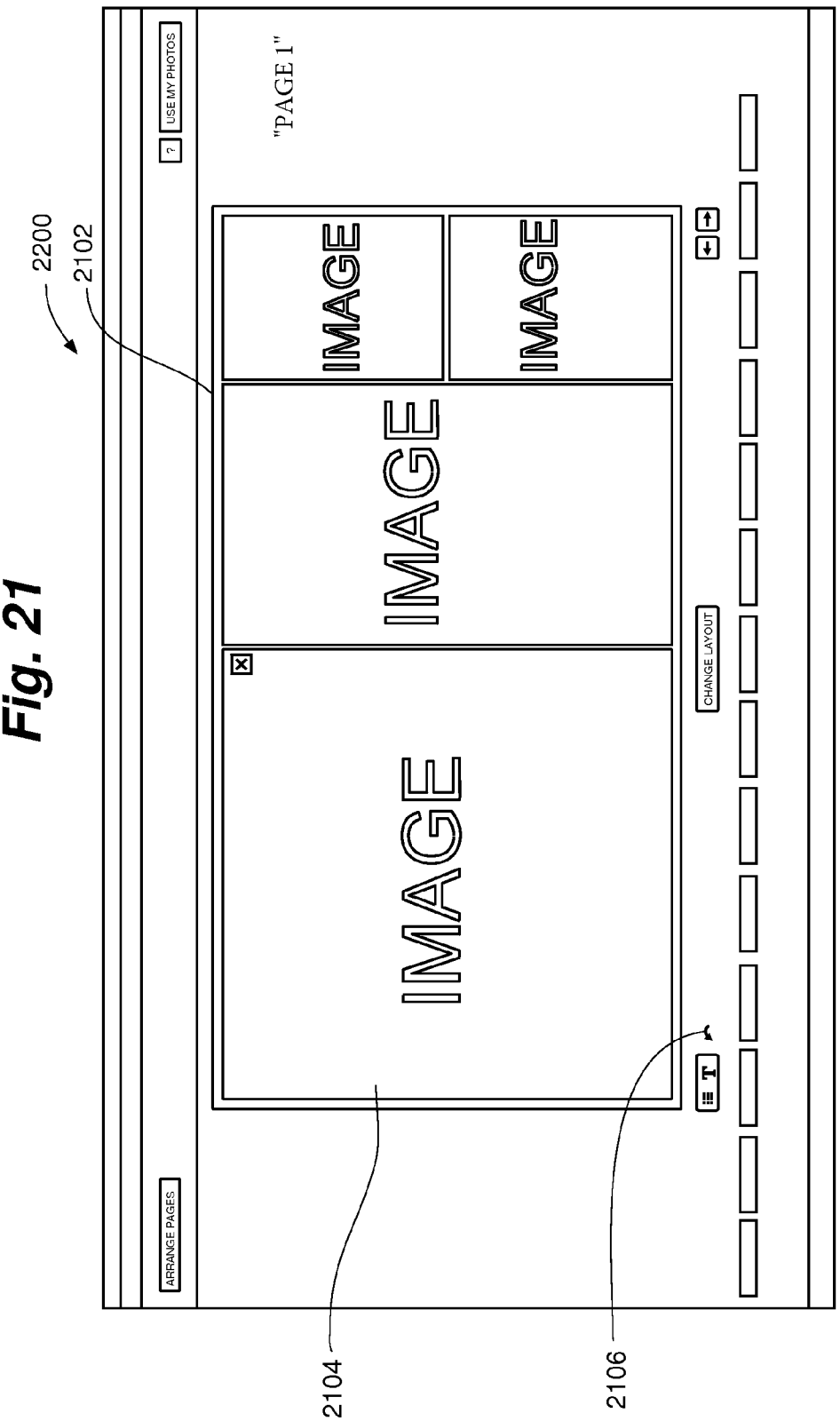
FIG. 21 is a diagram showing an edited view of the first view, or first page, after the user has changed the existing design, according to one embodiment of the invention.

FIG. 21 is a screenshot embodiment 2100 showing a changing layout or changing design of a view in a photo-book, as displayed on the editor. A design 2102 of a spread comprises a picture 2104 and other pictures as shown. The photo 2104 of embodiment 2100 corresponds to the photo 2004 of the embodiment 2000, showing how a layout change also changes size and position of a same picture. By pressing or clicking an UNDO arrow 2106, the present invention will revert the embodiment 2100 to the embodiment 2000. This reversal of layout or design in a view is when the user is working on the same view, without exiting from the view. While a user is working on the same view, a single click of UNDO will reverse all past changes, edits, or customizations. The UNDO feature may be explained in other words as, "I do not like this newly made design, and I want my old design back."

Figure 22:
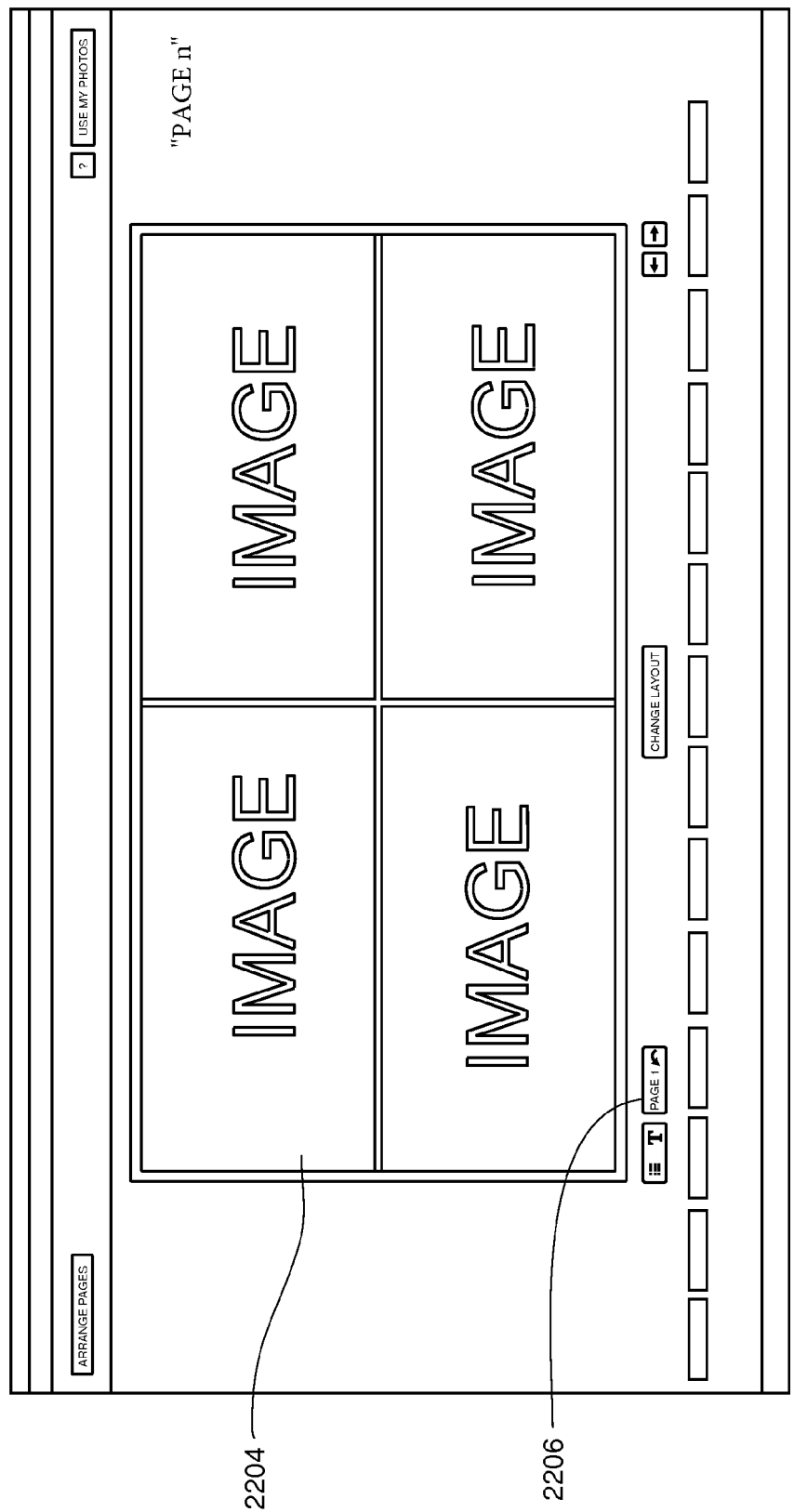
FIG. 22 is a diagram showing a reverse or undo feature on another view, located on another page or another view of the project, which includes an indicator showing that the view will change to the previous view when clicked, according to one embodiment of the invention.

FIG. 22 is a screenshot embodiment 2200 as shown after the user exits from the embodiment 2100 by clicking a forward arrow button on the embodiment 2100, and thereby, landing on the embodiment 2200, or otherwise navigates to another view of the project. While the editor displays the embodiment 2200, the user can click on the undo button 2206 to exit from the embodiment 2200 and to land on the embodiment 2100. Upon exiting from the embodiment 2200 and with a subsequent press of the UNDO button at the embodiment 2100, the editor will revert the embodiment 2100 to the embodiment 2000.

In another embodiment, the functionality of UNDO can be applied to computer program code (software) whenever there are multiple views of a project. These multiple views comprise pages, spreads, and even three-dimensional (3D) views. A first click of UNDO moves the editor to a previous view before actually doing the undo, or before actually reverting to a previously unaltered state of design. For example, the present invention can be applied to a 3D editing software to change views from one view of a 3D object to another view of the 3D object.

Embodiments 1900 to 2200 can be applied to views of a spread in a photobook as well as views of a three dimensional (3D) object in a three dimensional (3D) editing interface, or for other applications and use cases. In the case of a 3D editing interface, the first undo would first switch the user back to a previous view of the 3D editing interface that displays the last edit performed by the user, and the user would be required to click UNDO a second time to confirm the UNDO and perform the reverse operation. Other examples and use cases of the invention are also possible, and would be apparent to one of ordinary skill in the art from this disclosure. Any application which has multiple views could benefit from this invention.

In another embodiment, the user can repeatedly click on the UNDO button, and the editor will reverse each layout or design change of a view. If there is nothing left to UNDO or alter on the same view, now with a subsequent UNDO press, the editor will exit from the view and will land on previously edited view, and with each subsequent UNDO press, the editor will reverse layout or design changes on that previous view until there is no more view or alteration left to UNDO.

In another embodiment, the UNDO feature will cause each finitely altered design or altered layout to finitely revert to a previous design or layout, either within a same view or a previous view, first by automatically switching design or layout within the same view, and second by exiting from the view and landing on to a previous view. Conversely, a REDO button will recapture each alteration that were reverted by UNDO button.

Although specific arrangements and specific movements were described in relation to the figures, it should be understood by one of ordinary skill in the art that these specific movements are merely illustrative, and examples of embodiments in which the present invention may be implemented, and are not intended to be exhaustive or limiting the manner in which the invention may be implemented. The photos, pages, and spreads may be moved about in various combinations, sub-combinations, orders, sequences, sub-sequences, and so on. One of ordinary skill will recognize that various combinations of movements, which are illustrated here, would be within the scope of the inventive embodiments.

Drop Areas/Zones and Drop Targets

FIGS. 23 to 30 describe a method of editing content of a photo-based product by using drop zones and drop targets. A drop zone, also known as a drop area, is a location on a GUI where a photo may be dropped for adding a photo count on a spread, swapping photos, removing a photo from the spread, or creating a new spread via drag and drop of a photo. A drop target is a photo slot in which a photo is received after the photo is dropped onto. A drop target may also be an entire spread.

Figure 23:
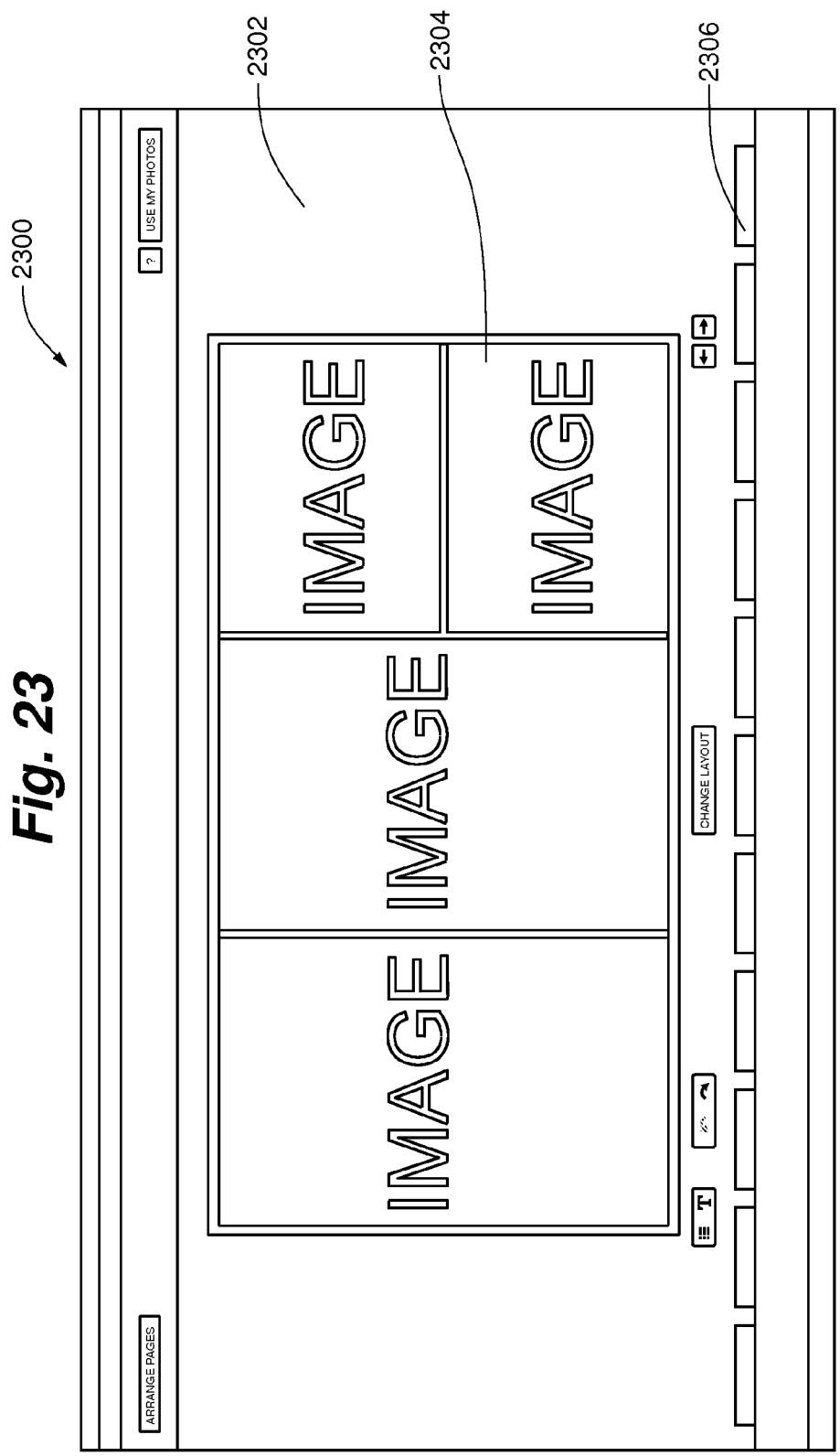
FIG. 23 is a diagram showing a default editor on a user device, according to one embodiment of the invention.

FIG. 23 is an embodiment 2300 showing a default editor on a user device. A default editor comprises a photo editor 2302 comprising a spread, said spread comprising a photo slot 2304, and a photo tray 2306. The photo slot 2304 is also a drop area or drop zone or drop target. A drop area or drop zone or drop target is capable of receiving a target photo. Use case specific arrangement of uploaded photos are displayed on the editor. In one embodiment, a drop area or drop zone may comprise a photo slot. In another embodiment, a drop area or drop zone may not comprise a photo slot, but is capable of receiving a target photo, such that the target photo may be used on a spread or the target photo may be deleted from the spread. In another embodiment, a drop zone or drop area is capable of receiving and storing a plurality of photos. In one embodiment, a drop target is a photo slot on a spread that receives a target photo. In another embodiment, a drop target is an entire spread or new spread. The photo tray 2306 is an area where photos (additional photos) may be stored for later use for creating a photo product. The photo tray may also be interchangeably called a photo bar.

Figure 24:
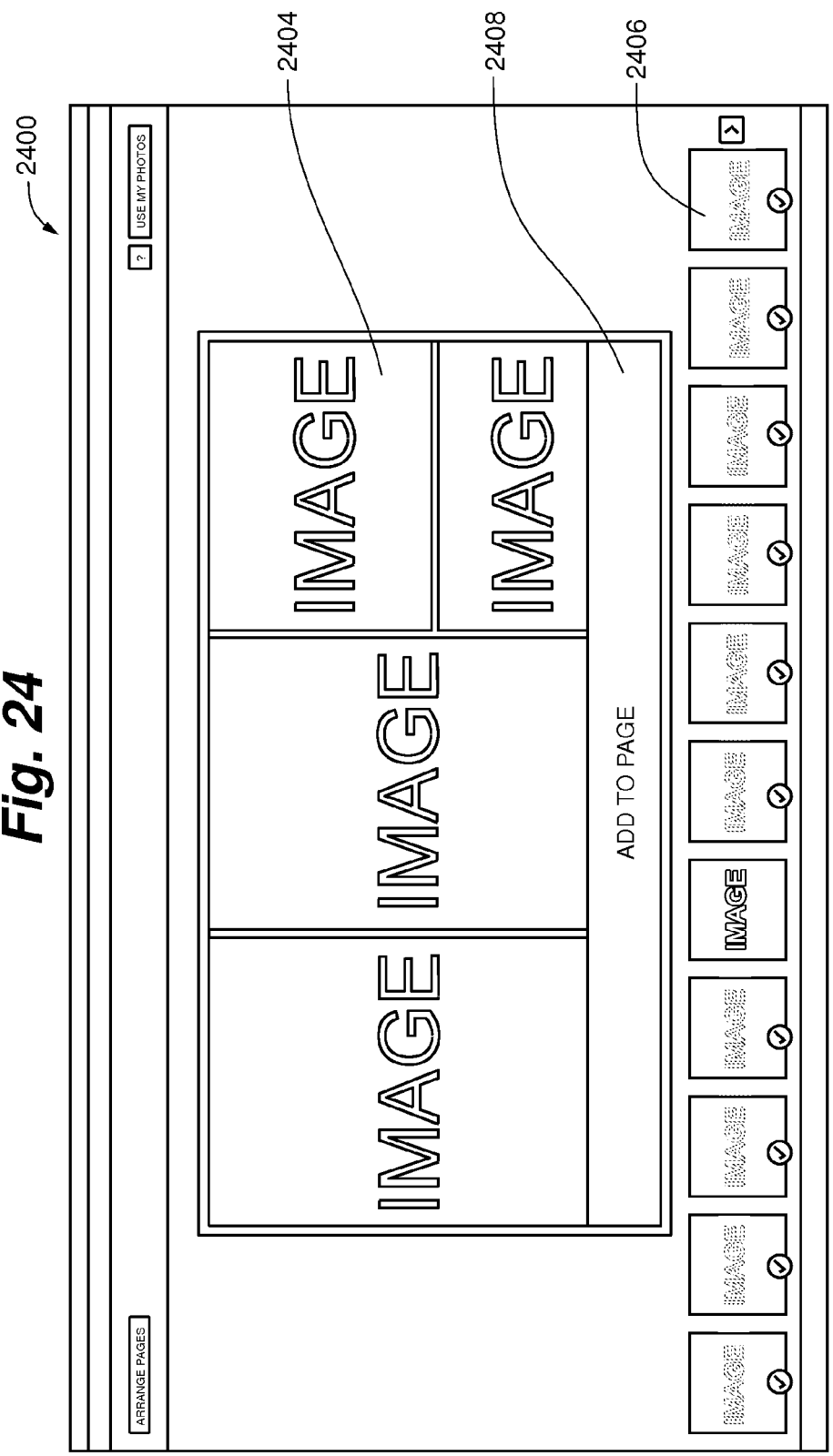
FIG. 24 is a diagram showing a drop area on the editor after a photo tray has been selected, according to one embodiment of the invention.

FIG. 24 is an embodiment 2400 showing a drop area or drop zone on an editor. When a mouse (input device) is over a photo 2406 of the photo tray (photo bar), a drop area 2408 (drop zone) appears on a spread 2404. The drop area may be colored in a selected color, to stand out from the rest of the GUI, either for visual pleasure, for easy identification, and/or for a more intuitive user experience. The drop area may be labeled as "Add to Page" in some embodiments, depending on the functionality of the drop area.

Figure 25:
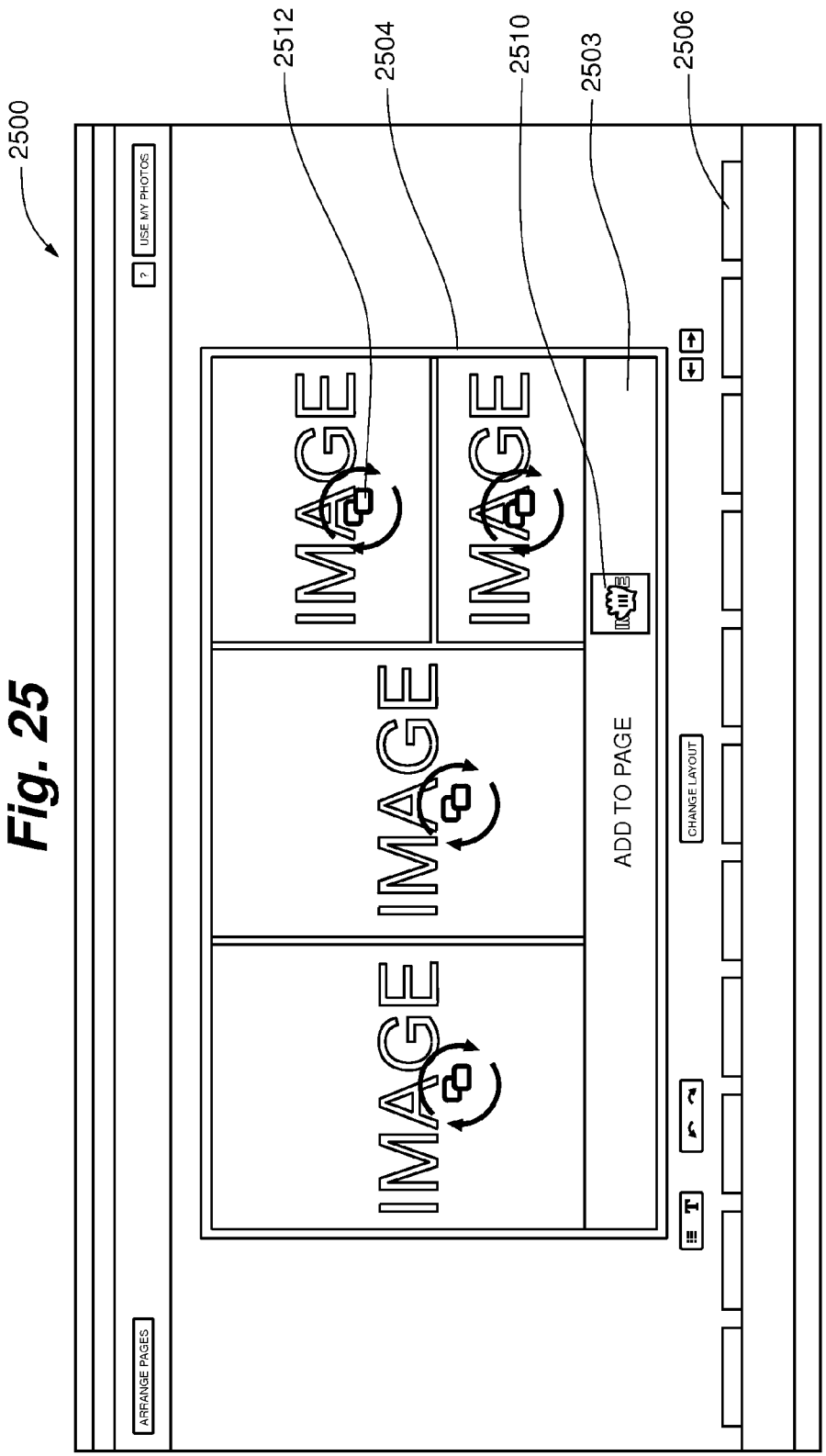
FIG. 25 is a diagram showing an activation of the drop area on the editor after a photo is dragged by a user over the spread, according to one embodiment of the invention.

FIG. 25 is an embodiment 2500 showing an area expansion of the drop zone/area. When a photo 2510 is dragged from a photo tray 2506 and brought to the drop zone 2503, the drop zone 2503 expands on a spread 2504. In addition, the editor displays a swap indictor 2512 on each photo of the spread. The swap indicator indicates what would occur when the photo is dropped therein; that is, the new photo would replace an old photo when the new photo is dragged to and released over the old photo. In some embodiments, the swap indicator is visual. However, the functionality of swap may be performed without a swap indicator being visually present on the editor.

Figure 26:
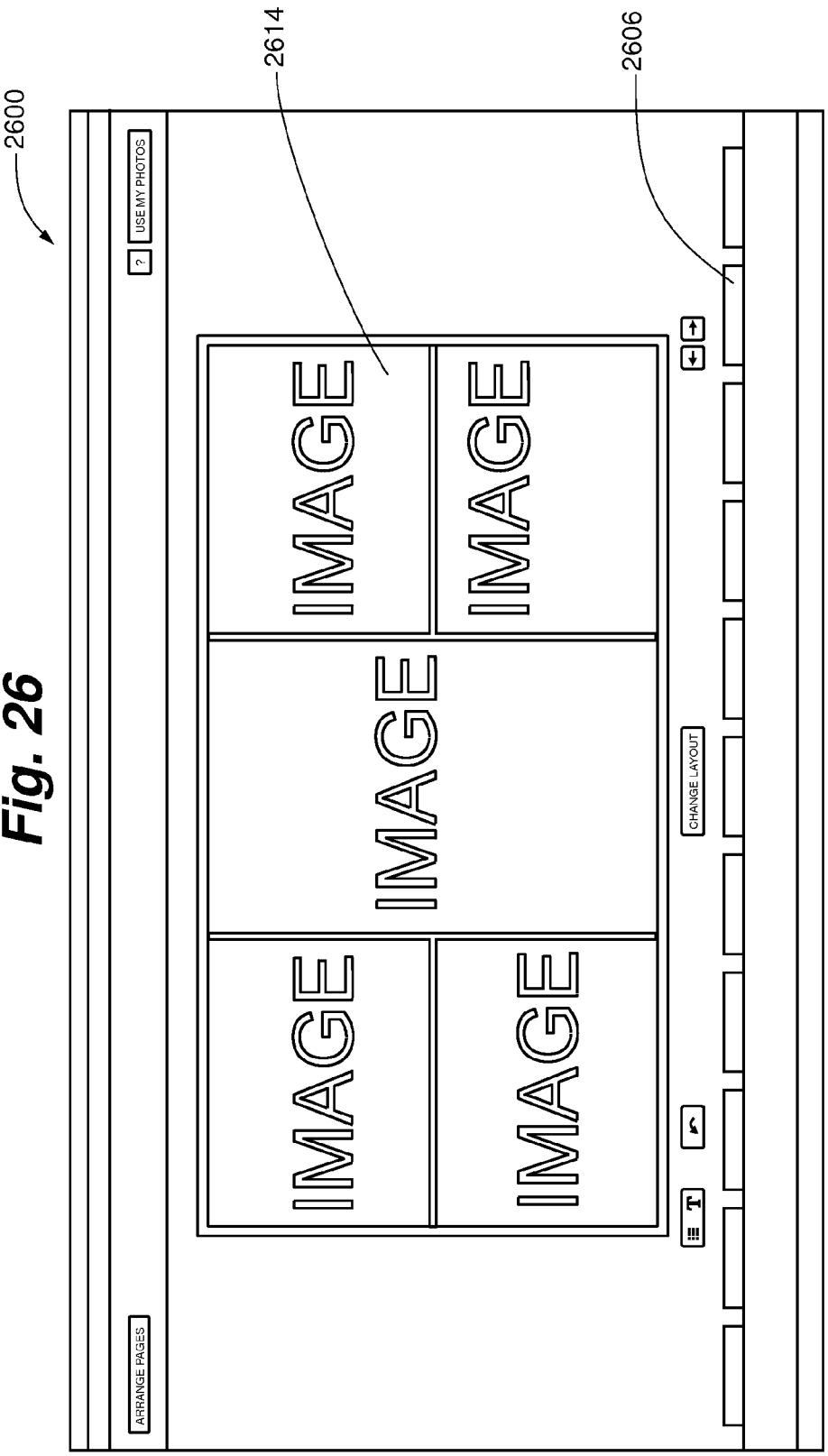
FIG. 26 is a diagram showing a photo count increase on a spread after a user drops the photo into the drop area on the editor, according to one embodiment of the invention.

FIG. 26 is an embodiment 2600 showing the photo count increasing on the spread after the photo has been dropped into the "Add to Page" drop area/zone. After a photo 2614 is dragged from a photo tray 2606 and released (dropped) to a drop area/zone, the photo 2614 is added to the spread. This increases the photo count of the spread. A spread can have only one photo or a plurality of photos. Once photo count of the spread is increased, all photos on the spread will automatically rearrange in an aesthetically pleasant manner. Photo arrangement can be based on pre-set rules. In some embodiments, described above, the automatic photo arrangement and re-arrangement is based on photo analysis, use-case identifiers, user identification, automatic image analysis, observed user behaviors, and so on, as described in more detail in the above description. Automatic photo arrangement can alter design and/or layout. Additionally, a user can manually alter the layout and/or design after the editor has automatically updated the layout and/or the design.

In one embodiment, a drop area of a photo can be a colored area, such as a green bar, or any other color selected by the designer of the GUI. A drop area may be marked "Add to Page." When a user releases a photo on the green bar, the photo is added to the spread (photo count increases), instead of replacing an existing photo that is on the spread (photo count remains same). If instead the new photo had been dragged over and released onto an existing photo of the spread, then the new photo would have replaced the existing photo, instead of adding the new photo to the spread. When the new photo is added, old photos on the spread are automatically re-arranged in an aesthetically pleasing manner. Automatic rearrangement of photos on the spread may cause a change in layout and in design of the spread. Each photo slot on a spread may comprise location coordinates. A photo being dragged may comprise moving/changing coordinates of the photo. Pre-set rules may offer a best fitting drop target (photo slot) by matching the coordinates of a photo slot on the spread with the coordinates of the moving photo.

In one embodiment, there are photo slots covering up an entire spread. If a user wants to drop a photo onto the spread to add to photo count of the spread, it may be difficult to find an area where to drop the photos. To alleviate this difficulty, in one embodiment, a margin around the spread is specified. If the user drags a photo over this margin, the step of dragging will highlight the entire spread to signify the spread as a drop target. This happens even if the spread is filled with multiple photos. In another embodiment, there could be a time delay, by which a drop target switches from spread to photo slot. In another embodiment, a margin extends around each of the photo slots so that a target photo needs to be well within the center of a photo slot to drop the photo onto the photo slot. If a target photo is on the border between two images, an entire spread may be selected as a drop target. A target photo is a photo that is dragged and released.

In another embodiment, a drop area can make itself visible when the user initiates a drag of a photo from the photo tray. This drop area would add the photo to the spread and prevent the user from having to find a place to drop it in the spread area.

Figure 27:
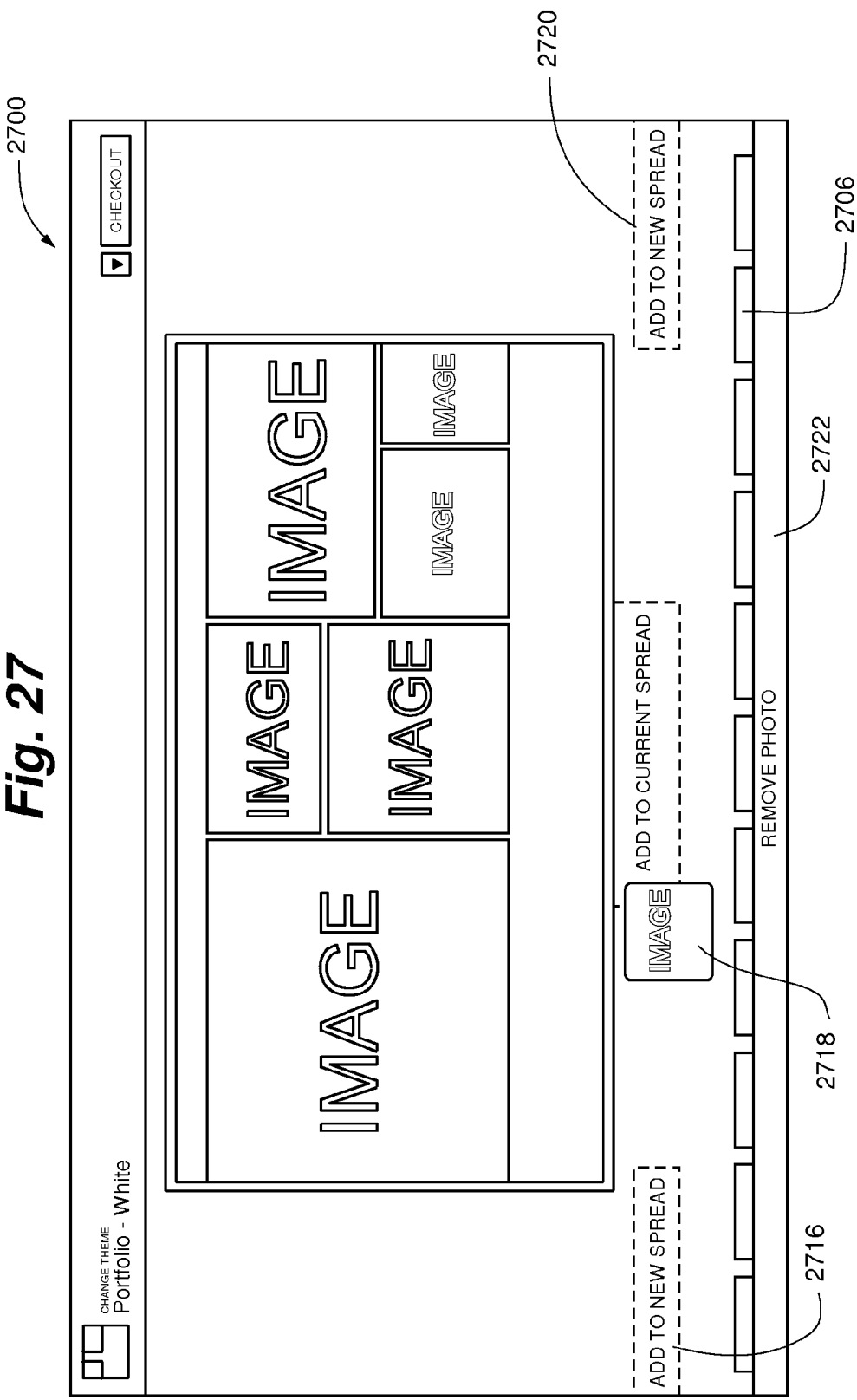
FIG. 27 is a diagram showing multiple drop areas, according to another embodiment of the invention.

FIG. 27 is an embodiment 2700 showing multiple drop zones or areas. From a photo tray 2706, a photo may be dragged and dropped to a drop area 2718 to visibly add the photo to a current spread on the editor. The photo may also be dropped to other drop areas, such as, a drop area 2716 adds the photo to a new left-side spread and a drop area 2720 adds the photo to a new right-side spread. In addition, drop zone 2722 may be used to remove a photo from the current spread.

Figure 28:
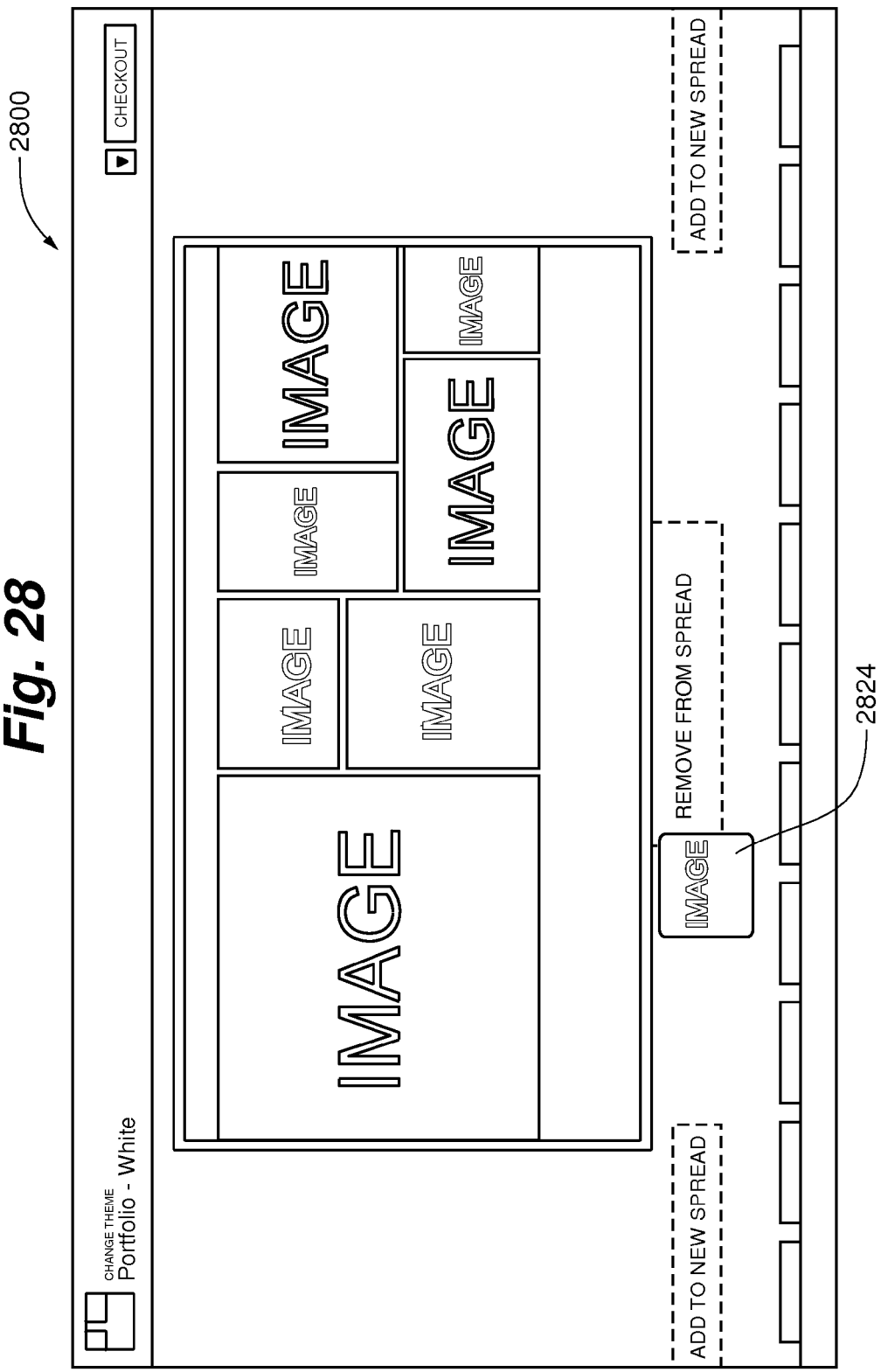
FIG. 28 is a diagram showing a drop area to remove a photo from a spread, according to one embodiment of the invention.

FIG. 28 is an embodiment 2800 showing another type of drop area. A photo may be intuitively dragged from a spread to remove the photo from the spread. This can be done in an intuitive and visible manner as the user drags the photo out from the spread. The dragged photo can be dropped at a drop zone 2824 to indicate to the editor that the photo should be removed from the spread. This provides a more intuitive and user-friendly experience than other alternatives. Alternatively, the photo may be dragged back onto the photo tray or photo bar to indicate that it should be removed from the spread. Other intuitively positioned and intelligently labeled drop zones for deleting photos from an editor are also within the scope of the present embodiment.

FIG. 29 is an embodiment 2900 showing another type of drop area. A user can drag a photo from a spread, and drop it onto a drop area 2926 to add the photo to a new right-side spread. The user can drop any picture from the photo tray onto the drop area 2926. The user can also drop a photo removed from the spread to the drop area 2926, to add the same photo to the new right-side spread. When the user drops either a photo from the photo tray or a photo removed from the current spread, and drops it on the drop area 2926, a new spread is created to the right of the current spread, and the photo added to that new spread automatically. An analogous action would be performed had the photo been dragged and dropped to a left-side drop area, thereby creating a new spread to the left of the current spread.

FIG. 30 is an alternative embodiment 3000 showing multiple types of drop areas. A target photo may be selected from a photo tray 3006. A target photo may also be selected from a current spread 3004. A target photo may be dragged and released to multiple drop areas. A target photo may be released to a drop area 3030 to assign the target photo to a new left side spread. A target photo may be released to a drop area 3034 to assign the target photo to a new right side spread. A photo from the photo tray 3006 may be dragged and released to a drop area 3032 to add the photo to the current spread 3004. An old photo may be swapped by a newly dragged photo by dragging the new photo and releasing it onto a swap area 3036.

In one embodiment, if the user wants to remove a photo (target photo) from a current spread, the user can drag the target photo to a drop zone that will be made visible as the user drags the target photo. In another embodiment, if a user wants to move a dragged photo (target photo) to an entirely new page, the user can drag the target photo using this option; a new page drop zone on the right side of the book means a new page will be added immediately after the current one; and a new page drop zone on the left side, means the action will add a new spread with said photo right before the current spread. In order to allow a user to add a target photo to a spread, in another embodiment, there is a button above the spread to add the target photo. If the user wants to create a new spread to the left or right side of the current spread, there are drop areas where the user drops the actual photo to create a new spread.

Other Exemplary Embodiments for Illustrative Purposes

The language in the examples or elaborations below are context-specific embodiments, and should not be construed to limit the broader spirit of the present invention.

To help a user in creating a photo book, the present invention automatically inserts content into an automatically selected design for the user. Automatic insertion of content greatly helps in auto-flow/auto-fill algorithms and in design updates, without a need to re-start designing a book from scratch each time when a user wants to update to a new design. Content refer to photos, text and inputs from the user (user inputs, user interactions, behavioral observations, etc.).

Content is analyzed along with a selected layout and a selected design of a book. Content analysis uses (A) image information automatically derived by the system ("automatic image information"); and (B) image information derived though user's interactions or behavioral observations ("observed image information"), as discussed in greater detail below. Based on the information from (A) and (B), the system performs: (C) automatic photo grouping; and (D) automatic content insertion into designs.

A) Automatic Image Information (Image Information Derived by the System)

A.1) Photos

For photos, the invention will analyze images to determine:

Saliency: Saliency is a most relevant part of an image as determined by image analysis or user's behavioral observations. By using saliency detection, the invention can store the areas of the photo that are of interest. These areas can utilize progressive reduction algorithm for saliency boxes. A saliency box is calculated by generating a saliency map, and searching an area that has a highest interest score. A searching box is adaptive. When a saliency area is small relative to a photo, the system relaxes the threshold to allow more contents in the area. When the saliency is large, the threshold is more strict.

Face: By using face detection, the system recognizes where faces are situated in a photo.

Computer Vision Analysis: The system applies image analysis to detect qualities of photos; the qualities include, such as, darkness, blurriness, colorfulness, simplicity, brightness, contrast, balance of light intensity over a photo, and harmony of color interaction.

Photo Similarities: Visual similarity of a photo relative to other photos.

Photo Information: This includes file name of a photo, dimensions (width and height), time of photo capture, make and model of the camera used in photography, aperture, shutter speed, exposure compensation, ISO, flash, focal length, and GPS location.

A.2) Text

For text, the system looks at:

Text Metrics: The system calculates space occupied by text in a textbox area. This includes width and height of the text at a given size. This way, the system can position the text with no cutoff by adjusting text size and other factors, such as, font.

Captions for photos: Captions can be provided with photos, either through an API or other format. Captions can be mined through image analysis and computer vision. For example, the system can run photos in a design page through an analyzer that predicts that a photo bears the Eiffel Tower, and puts a label "Eiffel Tower" alongside the photo on the page.

B) Observed Image Information

Information Derived Through User's Interactions

As a user interacts with selected photos in a design, the invention monitors the behavior of the user and learns about the content through the user's actions on photos. Here are some ways the invention learns the user's interests:

Photo Areas of Interest: By tracking the users' zooming and panning behavior, the invention can understand what areas of photos are more important over the computer vision algorithms that the present invention may use. For example, if the user takes a photo that is 400×300 pixels in size and pans/zooms the photo in a photo slot so that the bottom left quarter of the photo is showing in the photo slot, the invention learns that the bottom left 200×150 of the image holds importance to the user. The invention can further subtract off a buffer adjustment to the resulting subsection of the photo. By subtracting away from the resulting 200×150 part of the photo, the invention can make a best guess of an actual area of interest of the photo. This buffer adjustment can be calculated in the same way as when the invention seeks to add a buffer adjustment on top of the area of interest of a photo.

Photo Importance: If a user swaps photos on a page, the invention can use this information to understand photo importance/hierarchy on a design page.

C) Automatic Photo Grouping

Once photos are selected, the invention automatically arranges the photos into pages/spreads. If photos are more related to each other, they are more likely to be grouped together.

C.1) Multidimensional Grouping

For photos to be related to each other in a photo set, they may have to be either taken at a close time-range, or appear to be similar. The invention checks photo's timestamps and measures similarities between photo pairs to decide if photos should belong to a same page/spread or not.

Timestamps: Most of the modern cameras provide timestamp information. When photos are taken in an event, they are naturally close to each other by time. The invention applies algorithms to cluster the photos together by timestamps, and thus separate the photos into logical events.

Similarity: Timestamps alone may not always produce best results for grouping. The invention further groups photos by image similarities to place related photos together in a layout/design. For example, a user can take different sceneries within a close time range. By detecting similarities of photos, the invention can arrange the photos together by photo similarities or separate them into two groups of different sceneries.

Multiple cameras: When family or group photos are taken by multiple cameras, their timestamps may not be accurately aligned. For example, when people are traveling internationally, smartphone cameras are often automatically adjusted to a local time, while regular cameras are not often auto-adjusted to the time change: this may create several hours of time difference between the two camera types. The invention solves this misalignment in time difference: when multiple cameras are detected in a photo set, correct orders of all included photos ordered correctly. The invention assumes that a time offset is consistent for the photos from the same camera, and that different cameras may have different time offsets. Photos are sorted by timestamps for each camera.

The invention calculates a matching score as follows: for every photo, the invention searches nearby photos from a set of photos, and calculates photo similarities and time difference. A higher matching score is obtained if photos are similar and their timestamps are closer to each other. Summation of all individual photo matching scores is a score of the sequence in which the photos may be grouped. When all sequence scores are calculated, the invention picks the highest scored sequence. If the user has a third set of photos, the invention will repeat this process by treating the first two photo sets as already paired. The same calculation is used when multiple cameras are involved.

Photos without timestamps: Timestamps can be lost or not be available in some cases. In such cases, the invention sorts photos by natural orders, such as filenames, or uploading orders. Then, the invention progressively groups them by photo similarities until the photos form into book pages. The invention calculates similarity scores among all possible pairs of photos and then sorts these scores. Highly similar photos are grouped together first. The invention continues with the grouping process until a target group cluster numbers are achieved. During this process, the invention may need to evaluate similarities between two groups containing multiple photos. Group similarity is an average of all possible similar pairs of photos in photo sets.

Photo importance: Best photos are selected by its own group for highlighting purposes.

C.2) Aesthetic Rules for Grouping

Photo grouping is designed to create a pleasant-looking spread. Internet users like to focus on important photos in creating their books. Embedded in computer algorithms, the invention allows most attractive photos to be as a single spread in a group. The invention also adjusts spread counts by a number of photos. When there are fewer photos, the invention stretches the number of the groups to make the book appear having more pages. When there are many photos, the invention compresses the number of groups to not exceed the number of maximum pages available in a photobook.

D) Automatic Insertion of Content into Designs

Once content is accumulated from a server (automatic image information) and user's inputs (observed image information), the present invention utilizes a set of algorithms to lay the content onto a page. The algorithm(s) will utilize the following components described below:

D.1) Photo Level Ranking

By analyzing the information derived from a server (automatic image information) and user's inputs (observed image information), the invention determines how to place/position photos in a design so that a placement of the photos are in correct spots, and are panned/zoomed to optimal locations. Photos are scored with photo quality based on computer vision analysis. Computer vision analysis may be facial recognition-related analysis or not related to facial recognition. Some photo/image heuristics that can be employed to calculate photo/image importance or image scores are:

Using identity and count of faces in photos to increase or decrease importance of a photo: Face recognition is used to identify faces in different photos. Each unique face is grouped together. Faces with higher frequency connote higher importance for that individual (subject) since they (faces) are more popular in a photo set. In some cases, the invention recognizes faces and give extra importance to main characters of a the photo set, i.e., a bride and a groom.

Reducing scores of photos for blurriness or undesirable traits (too dark or over exposed).

Using camera settings to determine the environment in which photos were taken.

Detecting artistic photography techniques, such as, lens flare or motion blur.

Using photo brightness, contrast and other photo characteristics.

Using machine learning to recognize important/relevant objects in photos, such as cars, pets, houses, and similar things that might indicate photo importance.

When a face is detected, face properties are evaluated. For example, if a person's face is smiling, a photo score is higher. Attributes, such as, size, position or clarity of a face affect a score of the photo. The invention combines attributes non-linearly to give a quality evaluation to a face.

A saliency box performs a target analysis on a photo. For example, within a saliency box, if there is a face, more importance is given to the face as the face is within the area of interest in the photo.

Scene detection, such as, landscape detection, mountain detection, indoor/outdoor detection, and naturalness or man-made detection can affect photo scores.

Using face detection related scoring, for example, when faces are detected from a photo, the invention combines size, location, smile confidence, orientation, clarity, and exposure to determine a facial quality score.

Combing all relevant scores to generate a final photo quality score.

D.2) Buffer Calculations for Best Fitting Content into Photo Boxes

The invention can draw a box around important parts of a photo. How a photo gets positioned inside a photo box can change based on the size of a relevant photo box that is available in a layout or design. For example, when face detection and saliency detection detect a person's face and body in a photo, the invention positions the photo at a photo box in a manner that the areas around the person's face and body are shown. This would be a case if the photo slot is large and if there is more real estate on a design page. This is implemented by employing a buffer over/above the box where the invention determines an area of interest in the photo.

In some cases, when a photo slot is as large as a page, the buffer around the area of importance of a photo may extend out to either a top, a bottom, a left, or a right edge of the photo. If a photo slot is very small, the buffer around an area of interest might be small or non-existent.

D.3) Area of Interest in a Photo

An area of interest in a photo is calculated by combining several computer vision processing techniques to build a box that includes all important parts of the photo (automatic image information), together with information from user interactions (observed image information). Computer vision processing techniques include, but are not limited to, face detection, face recognition, saliency detection (saliency boxes), user specified areas of interest, and so on.

D.4) Scoring for Inserting Photos into Layouts

A design contains multiple photo slots. Each photo slot may be modeled as a rectangle or square. The visible part of a rectangle is a focal box of a photo slot. A photo is processed for saliency and face detection, and each detected area is labeled and represented on the photo as a rectangle with a location on the photo.

- For a photo slot to match a photo, the invention first zooms the photo so that the most of the saliency and face boxes are shown with a minimization of photo cut-off. Photo positioning with a photo slot is calculated at this step. Positioning strives to minimize the area that is cropped. If cropping is unavoidable, the area of interest is either centered to a saliency box, or best positioned to faces. Face cropping may be minimized to a smaller area. A matching score is a combination of photo area cut-off, saliency area cut-off, and face area cut-off. Each cut-off area has its own importance, where faces may have highest importance.
- For each design to match a set of photos, photo permutation is a factorial of a photo set size or a number of photo slots. These calculations may be costly if there are many photos to match up with an equal number of photo slots. The invention performs a depth first search with limited branching to traverse possible matching patterns. For each permutation of photos, the invention combines individual matching scores together to get a score related to permutation. The depth search algorithm decides a best score selection and thus generate a best fitting for this design set, and this score can also be used to compare a matching fit with other design sets.

D.5) Determining a Best Design for Contents

In a case of an auto-flow algorithm, the invention may need to insert content derived from a user into design pages. In order to this, below is an implementation of the heuristic:
- The invention selects designsets for a theme.
- The invention finds best possible designs from the designset that can fit with contents (photos and text).
- Using ranking algorithms and other heuristics, the invention determines a best fitting design from the designset.

D.6) Dynamic Text Insertion Across Platforms

Software clients render text differently than photos. Text often behave differently when trying to create books that are editable across multiple software clients. Text entered into a book through a browser might render as two lines of text. However, for example, when it is rendered on a specific user device, such as, a native APPLE IPAD client, text could show up in three or more lines.

To alleviate this problem, when a user adds text to a page, the text is passed into a text processing engine that breaks it up into text lines. Each text line contains a string of text, its coordinates and size on the page. When the text is rendered on a different client, the client is responsible for slightly compressing character spacing for any text that exceeds the size of the line. By utilizing text metrics, the text to be inserted into textboxes on a design page will fit without requiring the text to cut off. The algorithm works as follows:
- The textbox has a default size. Say, for example, size 16.
- Check if the given text fits into the textbox, and check how it fits if it has to stretch to multiple lines.
- If it does not fit, decrease the text size and see if the text fits (with size 15). If it still does not fit, decrease the size again until it fits.
- If the system has to decrease the text size beyond a minimum threshold, say for example size 10, then it may be concluded that the text does not fit at all.

D.7) Positioning Photos in Photo Slots with Focal Boxes

A design may have content that are overlapping other content. This can happen for many reasons, but most likely will be for stylistics reasons. When an element is overlapping a photo slot, the photo may be repositioned in a photo slot so that the point of focus stays away from the overlapping elements and thus keeps an adequate margin from these items. This is implemented by utilizing focal boxes. A focal box is defined on a layout or design as a rectangular area within a photo slot that is considered as "visible" or "unobstructed." In other words, it is the area on a design where the photo can be seen clearly. If a photo slot is completely uncovered, then this area would simply be the dimensions of the photo slot itself. A focal area can be represented by any shape, not just a box, as long as it is a continuous shape. Accordingly, the invention ensures that the photo is placed inside the focal box of the photo slot.

CONCLUSIONS

One of ordinary skill in the art knows that the use cases, structures, schematics, and flow diagrams may be performed in other orders or combinations, but the inventive concept of the present invention remains without departing from the broader spirit of the invention. Every embodiment may be unique, and methods/steps may be either shortened or lengthened, overlapped with the other activities, postponed, delayed, and continued after a time gap, such that every user is accommodated to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system, and executes various computer software applications, components, programs, codes, libraries, objects, modules, etc. indicated collectively by reference numerals in FIG. 1U to perform the personalization techniques described above.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A method of creating and editing a media-rich project on a user-device having a graphical user interface (GUI), comprising:
    displaying to a user on an editor of said user device a photo arrangement of at least one first photo on a spread of the media-rich project, wherein said photo arrangement embodies a first layout of said spread, wherein said photo arrangement comprises a photo count of one or more existing photos;
    responsive to the user dragging a second photo from a photo tray towards the spread, causing said editor to graphically display a first drop area that stands out from a rest of the GUI where said second photo can be dropped and that indicates a location where said second photo can be dropped to be added to the spread, said location being distinct from locations of any existing photos in the GUI, wherein when said second photo is hovered over said first drop area, said first drop area stands out from the rest of the GUI and is graphically emphasized; and
    responsive to the user dropping said second photo on said first drop area:
        causing said spread to receive said second photo on said editor and automatically adding the second photo to the spread to increase said photo count on said spread by one; and
        automatically re-arranging said second photo on said spread to produce a second layout of said spread based on one or more pre-set rules.

2. The method of claim 1, further comprising:
    responsive to the user dragging a third photo from said photo tray and dropping said third photo onto said second photo, causing a replacement of said second photo by said third photo.

3. The method of claim 1, further comprising:
    configuring a drop target of a fourth photo on said spread, wherein said fourth photo is dragged by the user, wherein said drop target is configured with respect to the location of said fourth photo from which said fourth photo is dropped, wherein said drop target is a pre-designated photo slot on said spread or undesignated photo slot on said spread, wherein said location of said fourth photo before dropping is anywhere on the spread; and
    responsive to the user dragging said fourth photo and dropping said fourth photo onto said spread, said drop target is determined by a time delay allowing said user to wait until said drop target is auto-selected by said pre-set rules of said editor.

4. The method of claim 3, wherein said fourth photo is selected from said photo tray.

5. The method of claim 3, wherein said fourth photo is selected from within said spread.

6. The method of claim 3, wherein said drop target of said fourth photo is further determined by location coordinates of said fourth photo over said spread before being dropped, proximity of said fourth photo with a second photo slot, or a pre-calculated photo slot based on pre-set rules.

7. The method of claim 1, further comprising:
    instructing a printer to print said media-rich project in response to a print-order of said user.

8. The method of claim 1, wherein the first drop area is colored in a selected color to stand out from the rest of the GUI.

9. A non-transitory physical storage medium storing executable instructions, which when executed by a hardware processor, causes the hardware processor to perform a process of creating and editing a media-rich project on a graphical user interface (GUI), the instructions causing the hardware processor to perform steps comprising:

displaying to a user on an editor of said GUI a photo arrangement of at least one first photo on a spread of the media-rich project, wherein said photo arrangement embodies a first layout of said spread, wherein said photo arrangement comprises a photo count of one or more existing photos;

responsive to the user dragging a second photo from a photo tray, causing said editor to graphically display a first drop area where said second photo can be dropped that stands out from a rest of the GUI and indicates to the user that when the photo is dropped on the first drop area it will be automatically added to the media-rich project, wherein when said second photo is hovered over said first drop area, said first drop area stands out from the rest of the GUI and is graphically emphasized, wherein said first drop area indicates a location where said second photo can be dropped to be added to the spread, said location being distinct from locations of any existing photos in the GUI; and responsive to the user dropping said second photo on said first drop area, causing said spread to receive said second photo on said editor and automatically adding the second photo to the spread to increase said photo count on said spread, and automatically re-arranging said second photo on said spread to produce a second layout of said spread based on one or more pre-set rules.

10. The non-transitory physical storage medium of claim 9, further comprising instructions causing the hardware processor to perform steps comprising:

responsive to the user dragging a third photo from said photo tray and dropping said third photo onto said second photo, causing a replacement of said second photo by said third photo.

11. The non-transitory physical storage medium of claim 9, further comprising instructions causing the hardware processor to perform steps comprising:

configuring a drop target of a fourth photo on said spread, wherein said fourth photo is dragged by the user, wherein said drop target is configured with respect to the location of said fourth photo from which said fourth photo is dropped, wherein said drop target is a pre-designated photo slot on said spread or undesignated photo slot on said spread, wherein said location of said fourth photo before dropping is anywhere on the spread; and responsive to the user dragging said fourth photo and dropping said fourth photo onto said spread, said drop target is determined by a time delay allowing said user to wait until said drop target is auto-selected by said pre-set rules of said editor.

12. The non-transitory physical storage medium of claim 11, wherein said fourth photo is selected from said photo tray.

13. The non-transitory physical storage medium of claim 11, wherein said fourth photo is selected from within said spread.

14. The non-transitory physical storage medium of claim 11, wherein said drop target of said fourth photo is further determined by location coordinates of said fourth photo over said spread before being dropped, proximity of said fourth photo with a second photo slot, or a pre-calculated photo slot based on pre-set rules.

15. The non-transitory physical storage medium of claim 9, further comprising instructions causing the hardware processor to perform steps comprising:

instructing a printer to print said media-rich project responsive to a print-order from the user.

16. A computing appliance for creating and editing a media-rich project on a graphical user interface (GUI), the computing appliance comprising a hardware processor, a non-transitory physical storage medium, and a plurality of program codes embodied on said non-transitory physical storage medium, said plurality of program codes when executed causes said hardware processor to execute a process comprising steps to perform:

displaying to a user on an editor of said user device a photo arrangement of at least one first photo on a spread of the media-rich project, wherein said photo arrangement embodies a first layout of said spread having a photo count of one or more existing photos;

responsive to the user dragging a second photo, causing said editor to graphically display a first drop area where said second photo can be dropped that stands out from a rest of the GUI and indicates to the user that when the second photo is dropped on the first drop area it will be automatically added to the media-rich project, wherein when said second photo is hovered over said first drop area, said first drop area stands out from the rest of the GUI and is graphically emphasized, wherein said first drop area indicates a location where said second photo can be dropped to be added to the spread, said location being distinct from locations of any existing photos in the GUI;

responsive to the user dropping said second photo on said first drop area, causing said spread to receive said second photo on said editor and automatically adding the second photo to the spread, thereby increasing said photo count on said spread;

re-arranging automatically said spread comprising said second photo to produce a second layout of said spread based on one or more pre-set rules; and responsive to receiving a print order from the user, printing said spread of the media-rich project.

17. The computing appliance of claim 16, further comprising instructions causing the hardware processor to perform steps comprising:

responsive to the user dragging a third photo from a photo tray and dropping said third photo onto said second photo, causing a replacement of said second photo by said third photo.

18. The computing appliance of claim 16, wherein the media-rich project is selected from the group consisting of a photobook, a photocalendar, and a photocard.

19. The computing appliance of claim 16, wherein said second photo is selected from a photo tray.

20. The computing appliance of claim 16, wherein said first drop area is further determined by location coordinates of said second photo over said spread before being dropped, proximity of said second photo with a second photo slot, or a pre-calculated photo slot based on pre-set rules.

* * * * *